US012603857B1

(12) United States Patent
Gutzeit

(10) Patent No.: US 12,603,857 B1
(45) Date of Patent: Apr. 14, 2026

(54) COMMUNICATION PLATFORM

(71) Applicant: LeapXpert Limited, Causeway Bay (HK)

(72) Inventor: Dmitry Gutzeit, New York, NY (US)

(73) Assignee: LeapXpert Limited, Causeway Bay (HK)

( * ) Notice: Subject to any disclaimer, the term of this patent is extended or adjusted under 35 U.S.C. 154(b) by 0 days.

(21) Appl. No.: 19/061,580

(22) Filed: Feb. 24, 2025

(51) Int. Cl.
H04L 51/52 (2022.01)
H04L 51/21 (2022.01)

(52) U.S. Cl.
CPC .............. H04L 51/52 (2022.05); H04L 51/21 (2022.05)

(58) Field of Classification Search
CPC ..... H04L 51/52; H04L 12/1813; H04L 41/26; H04L 41/5039; H04L 41/02; H04L 51/216; H04L 51/21; H04L 51/18; H04L 9/40; H04L 65/401; H04M 3/42; G06F 40/20; G06F 16/27; G06F 21/62; G06F 21/55
USPC ......................................................... 709/224
See application file for complete search history.

(56) References Cited

U.S. PATENT DOCUMENTS 8,396,890 B2 * 3/2013 Lim ...................... H04L 67/303
707/781
8,544,058 B2 * 9/2013 Lim ...................... H04L 51/234
713/169
9,419,951 B1 * 8/2016 Felsher ................. H04L 9/3249
10,469,354 B2 * 11/2019 Sun ...................... G06F 16/9538
10,498,629 B2 * 12/2019 Sun ...................... G06F 16/9536
10,529,017 B1 * 1/2020 Gianakopoulos .. G06Q 10/0637
11,297,030 B2 * 4/2022 Oliner ................. G06F 16/9535
11,521,603 B2 * 12/2022 Sun ...................... G06F 40/216
11,720,962 B2 * 8/2023 Kamkar ................. G06Q 40/03
705/38
11,928,730 B1 * 3/2024 Feng ..................... G06Q 40/03
2010/0312691 A1 * 12/2010 Johnson, Jr. .......... G06Q 40/03
705/38
2015/0312188 A1 * 10/2015 White .................. H04L 51/046
709/204
2016/0019402 A1 * 1/2016 Khandelwal ......... H04L 67/306
726/26
2018/0124159 A1 * 5/2018 Sun .................... G06Q 30/0201
2020/0076841 A1 * 3/2020 Hajimirsadeghi ... G06N 3/0895
(Continued)

*Primary Examiner* — Sargon N Nano
(74) *Attorney, Agent, or Firm* — MORRISON & FOERSTER LLP

(57) ABSTRACT

Described herein are exemplary devices, apparatuses, systems, methods, and non-transitory storage media for sharing machine-learning-generated insights on a communication platform. An exemplary method comprises receiving at least a portion of a conversation between the user and one or more conversation participants; generating, using one or more machine-learning models, an insight based on the conversation between the user and the one or more conversation participants; causing display, within a user interface of the communication platform associated with the user, the insight; receiving a user request to share the insight with a contact on the communication platform, wherein the contact is not the one or more conversation participants; and causing display, within a user interface of the communication platform associated with the contact, the insight without displaying messages of the conversation.

16 Claims, 33 Drawing Sheets

(56) References Cited

U.S. PATENT DOCUMENTS

| | | | | |
|---|---|---|---|---|
| 2022/0138697 | A1* | 5/2022 | Neckermann | G06N 5/02 |
| | | | | 709/204 |
| 2022/0210514 | A1* | 6/2022 | McBeth | H04N 21/44226 |
| 2022/0231870 | A1* | 7/2022 | Christian | H04L 12/189 |
| 2022/0383417 | A1* | 12/2022 | Cummings | G06Q 40/06 |
| 2024/0152704 | A1* | 5/2024 | Desai | G06F 40/35 |
| 2024/0273438 | A1* | 8/2024 | Brenner | G06Q 10/0635 |

* cited by examiner

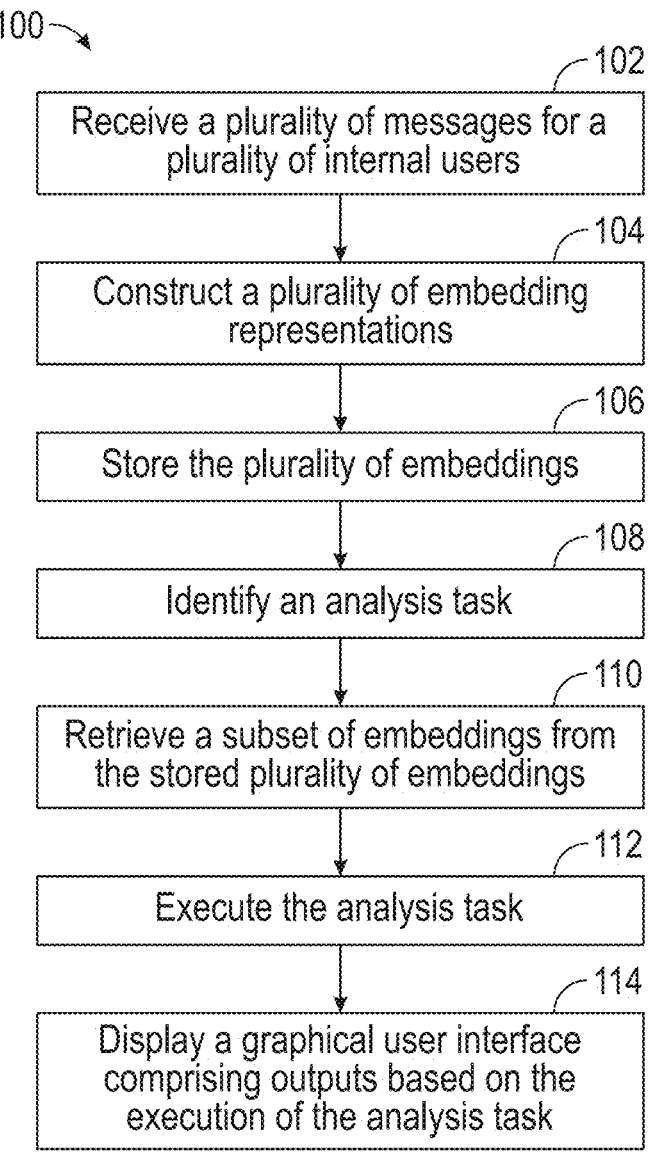

100

102
Receive a plurality of messages for a plurality of internal users

104
Construct a plurality of embedding representations

106
Store the plurality of embeddings

108
Identify an analysis task

110
Retrieve a subset of embeddings from the stored plurality of embeddings

112
Execute the analysis task

114
Display a graphical user interface comprising outputs based on the execution of the analysis task

FIG. 1

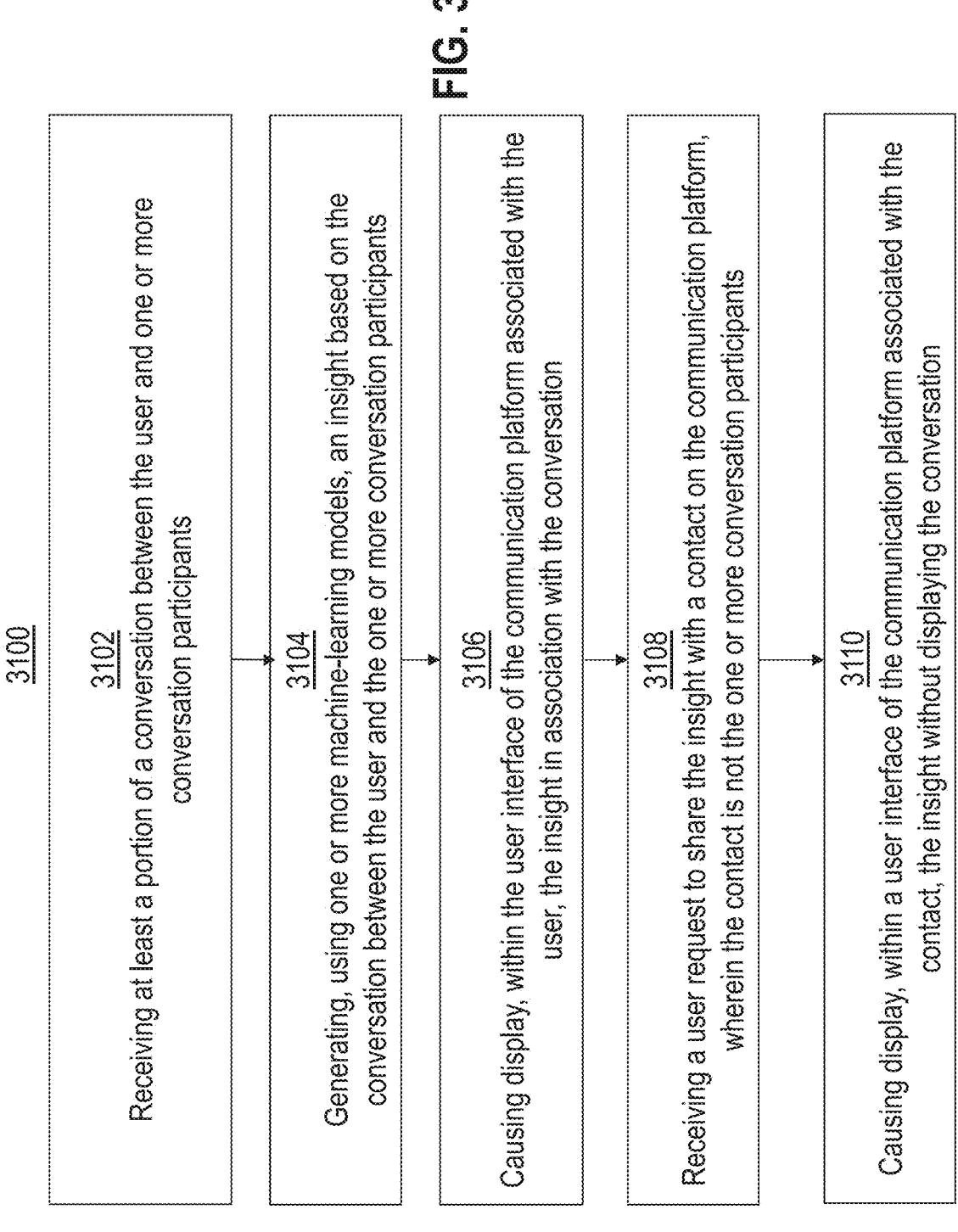

3100

3102

Receiving at least a portion of a conversation between the user and one or more conversation participants

3104

Generating, using one or more machine-learning models, an insight based on the conversation between the user and the one or more conversation participants

3106

Causing display, within the user interface of the communication platform associated with the user, the insight in association with the conversation

3108

Receiving a user request to share the insight with a contact on the communication platform, wherein the contact is not the one or more conversation participants

3110

Causing display, within a user interface of the communication platform associated with the contact, the insight without displaying the conversation

FIG. 31

COMMUNICATION PLATFORM

TECHNICAL FIELD

This disclosure generally relates to the field of artificial intelligence (AI), and more particularly to enabling collaboration (e.g., sharing machine-learning-generated insights) on a communication platform.

BACKGROUND

Artificial intelligence (AI), such as machine-learning models, is increasingly being adopted to analyze data to provide insights and intelligence. For a machine-learning-generated insight to be useful, a user often needs to share the insight with others and collaborate with others. For example, if a banker has a one-to-one conversation with a client about a project and the system generates an insight from the conversation, the banker may need to share the insight with an associate in the same department so that the necessary next steps can be taken to advance the project. Further, the banker and the associate may need to collaborate internally regarding the shared insight, for example, by discussing follow-up questions, so that the banker can carry on with the conversation with the client in a more informed and efficient matter. However, existing communication platforms, such as WhatsApp, iMessage, and Slack, do not allow for such sharing and collaboration. For example, they lack built-in mechanisms for sharing AI-generated insights with contacts while preserving conversation confidentiality.

Thus, there is a need for a communication platform that allows sharing of insights derived from a conversation and further allows collaboration outside the conversation, while taking into account the operational requirements, data access protocols, and engagement rules.

SUMMARY

Disclosed herein are exemplary devices, apparatuses, systems, methods, and non-transitory storage media for sharing machine-learning-generated insights on a communication platform. An exemplary system receives at least a portion of a conversation between a user and one or more conversation participants. The conversation may have occurred in one of a plurality of communication channels, such as WeChat, WhatsApp, Slack, Microsoft Teams, etc. The system can generate, using one or more machine-learning models (e.g., large language models), an insight based on the conversation between the user and the one or more conversation participants. The insight can be any information derived from messages in the conversation. For example, the insight may comprise a summary of the conversation or its participants, a sentiment analysis of the conversation or its participants, a recommendation based on the conversation, an action item based on the conversation, a response composition (e.g., a draft message) based on the conversation, a fact checking of the conversation, an analysis of the one or more conversation participants, or any combination thereof. The system can cause display, within a user interface of the communication platform associated with the user, the insight. The system can receive a user request to share the insight with a contact on the communication platform who is not the one or more conversation participants. The system can cause display, within a user interface of the communication platform associated with the contact, the insight without displaying messages of the conversation.

Embodiments of the present disclosure provide several technical advantages. By allowing a user to share machine-learning-generated insights of a conversation with a contact, the system enables the contact to understand key information of the conversation (e.g., action items, sentiment analysis) in an efficient manner. At the same time, the system can prevent the contact from accessing the exact messages in the conversation, thus maintaining certain level of confidentiality for the conversation participants. The system allows the user to easily share an insight via intuitive and streamlined graphical user interfaces and initiate a collaboration with the contact regarding the shared insight, without exposing the internal collaboration with the conversation participants. The user can review the collaboration and carry on with the conversation with the conversation participants separately, resulting in more streamlined and informed communication with the conversation participants. Further, the system operates seamlessly across disparate messaging applications and systems, unifying insights from channels that traditionally remain siloed.

Furthermore, the application framework effectively manages AI-based applications, while taking account of operational requirements, data access protocols and ethical walls, and engagement rules for both applications and users. For example, the system can automatically check to ensure that a contact has permission to view an insight before sharing the insight, thus automatically enforcing data access protocols and ethical walls. As another example, the disclosed application framework and methods allow machine-learning models to provide accurately tailored business insights and intelligence to users, while ensuring that data provided to the models follow sharing policies and access control requirements. The disclosed framework and methods eliminate a need for more complicated and riskier implementations, such as utilizing a separate system or a human, to enforce these policies and requirements. As a result, data is securely and safely provided to the machine-learning models to generate reliable responses in a faster and less complex manner while consuming less power.

An exemplary method for sharing machine-learning-generated insights on a communication platform comprises: receiving at least a portion of a conversation between the user and one or more conversation participants; generating, using one or more machine-learning models, an insight based on the conversation between the user and the one or more conversation participants; causing display, within a user interface of the communication platform associated with the user, the insight; receiving a user request to share the insight with a contact on the communication platform, wherein the contact is not the one or more conversation participants; and causing display, within a user interface of the communication platform associated with the contact, the insight without displaying messages of the conversation.

In some embodiments, the insight comprises a summary of the conversation, a sentiment analysis of the conversation, a recommendation based on the conversation, an action item based on the conversation, a response composition based on the conversation, a fact checking of the conversation, an analysis of the one or more conversation participants, or any combination thereof.

In some embodiments, the method further comprises receiving a comment associated with the insight from the contact; and causing display, within the user interface of the communication platform associated with the user, the comment in association with the insight.

In some embodiments, the method further comprises receiving a response to the comment from the user; and

3 causing display, within the user interface of the communication platform associated with the contact, the response to the comment.

In some embodiments, the comment associated with the insight and the response to the comment are not shared with the one or more conversation participants.

In some embodiments, the method further comprises: generating one or more additional insights based on the comment, the response to the comment, or any combination thereof.

In some embodiments, the insight is generated based on a portion of the conversation.

In some embodiments, the one or more machine-learning models comprise a large language model. In some embodiments, the communication platform is configured to provide insights of communications across separate messaging applications. In some embodiments, the user and the contact of the user are internal to an organization. In some embodiments, the one or more conversation participants are external to the organization.

In some embodiments, the method further comprises after receiving the user request to share the insight with the contact, checking permission for the contact to access the insight. The permission check may be based on one or more ethical wall within an organization.

In some embodiments, generating the insight comprises: constructing a plurality of embedding representations of a plurality of messages in the conversation; and providing the plurality of embeddings to the one or more machine-learning models to generate the insight.

An exemplary system for sharing machine-learning-generated insights on a communication platform comprises: one or more processors, a memory, and one or more programs, wherein the one or more programs are stored in the memory and configured to be executed by the one or more processors, the one or more programs including instructions for causing display, within a user interface of the communication platform associated with a user, a portion of a conversation between the user and one or more conversation participants; generating, using one or more machine-learning models, an insight based on the conversation between the user and the one or more conversation participants; causing display, within the user interface of the communication platform associated with the user, the insight in association with the conversation; receiving a user request to share the insight with a contact on the communication platform, wherein the contact is not the one or more conversation participants; and causing display, within a user interface of the communication platform associated with the contact, the insight without displaying messages of the conversation.

An exemplary non-transitory computer-readable storage medium stores one or more programs for sharing machine-learning-generated insights on a communication platform, the one or more programs comprising instructions, which when executed by one or more processors of one or more electronic devices, cause the one or more electronic devices to: cause display, within a user interface of the communication platform associated with a user, a portion of a conversation between the user and one or more conversation participants; generate, using one or more machine-learning models, an insight based on the conversation between the user and the one or more conversation participants; cause display, within the user interface of the communication platform associated with the user, the insight in association with the conversation; receive a user request to share the insight with a contact on the communication platform, wherein the contact is not the one or more conversation participants; and cause display, within a user interface of the communication platform associated with the contact, the insight without displaying messages of the conversation.

BRIEF DESCRIPTION OF THE DRAWINGS

FIG. 1 illustrates an exemplary method of operating an application framework, in accordance with some embodiments.

FIG. 31 illustrates an exemplary process for sharing machine-learning-generated insights on a communication platform, in accordance with some embodiments.

DESCRIPTION OF EXAMPLE EMBODIMENTS

Figure 2:
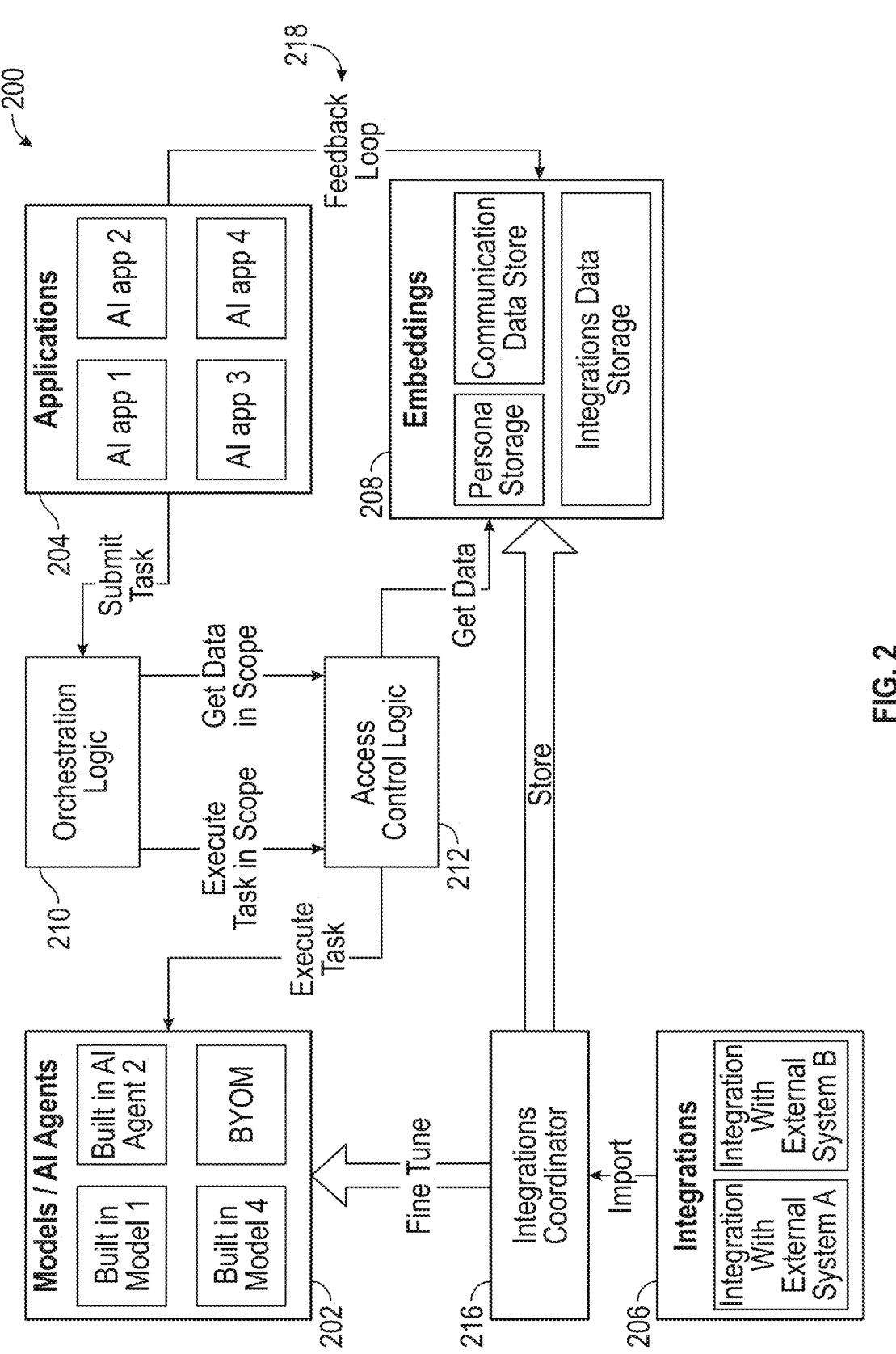
FIG. 2 illustrates an exemplary architecture of an application framework, in accordance with some embodiments.

In the following description of embodiments, reference is made to the accompanying drawings which form a part hereof, and in which it is shown by way of illustration specific embodiments which can be practiced. It is to be understood that other embodiments can be used, and structural changes can be made without departing from the scope of the disclosed embodiments.

Disclosed herein are exemplary devices, apparatuses, systems, methods, and non-transitory storage media for sharing machine-learning-generated insights on a communication platform. An exemplary system receives at least a portion of a conversation between a user and one or more conversation participants. The conversation may have occurred in one of a plurality of communication channels, such as WeChat, WhatsApp, Slack, Microsoft Teams, etc. The system can generate, using one or more machine-learning models (e.g., large language models), an insight based on the conversation between the user and the one or more conversation participants. The insight can be any information derived from messages in the conversation. For example, the insight may comprise a summary of the conversation or its participants, a sentiment analysis of the conversation or its participants, a recommendation based on the conversation, an action item based on the conversation, a response composition (e.g., a draft message) based on the conversation, a fact checking of the conversation, an analysis of the one or more conversation participants, or any combination thereof. The system can cause display, within a user interface of the communication platform associated with the user, the insight. The system can receive a user request to share the insight with a contact on the communication platform. The contact is not the one or more conversation participants. The system can cause display, within a user interface of the communication platform associated with the contact, the insight without displaying messages of the conversation.

Embodiments of the present disclosure provide several technical advantages. By allowing a user to share machinelearning-generated insights of a conversation with a contact, the system enables the contact to understand key information of the conversation (e.g., action items, sentiment analysis) in an efficient manner. At the same time, the system can prevent the contact from accessing the exact messages in the conversation, thus maintaining certain level of confidentiality for the conversation participants. The system allows the user to easily share an insight via intuitive and streamlined graphical user interfaces and initiate a collaboration with the contact regarding the shared insight, without exposing the internal collaboration with the conversation participants. The user can review the collaboration and carry on with the conversation with the conversation participants separately, resulting in more streamlined and informed communication with the conversation participants. Further, the system operates seamlessly across disparate messaging applications and systems, unifying insights from channels that traditionally remain siloed.

Furthermore, the application framework effectively manages AI-based applications, while taking account of operational requirements, data access protocols and ethical walls, and engagement rules for both applications and users. For example, the system can automatically check to ensure that a contact has permission to view an insight before sharing the insight, thus automatically enforcing data access protocols and ethical walls. As another example, the disclosed application framework and methods allow machine-learning models to provide accurately tailored business insights and intelligence to users, while ensuring that data provided to the models follow sharing policies and access control requirements. The disclosed framework and methods eliminate a need for more complicated and riskier implementations, such as utilizing a separate system or a human, to enforce these policies and requirements. As a result, data is securely and safely provided to the machine-learning models to generate reliable responses in a faster and less complex manner while consuming less power.

Also described herein are exemplary devices, apparatuses, systems, methods, and non-transitory storage media for providing an application framework. The application framework can provide various machine-learning models to perform a variety of analysis tasks to analyze enterprise data such as communications between one or more employees of an organization and one or more clients of the organization and provide intelligence and insights for a user in the organization (e.g., an employee of the organization). The variety of analysis tasks can include authorship analysis, sentiment analysis, summarization, response composition, action recommendation, fact checking, product or service recommendation, external user analysis, and internal user query. The insights and intelligence can include a recommendation or an observation related to a client or customer of the organization. The recommendation or observation can be provided, for example, in a communication platform (e.g., messaging interface), a chatbot, or a variety of other interfaces (e.g., a dashboard interface).

Embodiments of the present disclosure provide numerous technical advantages. The disclosed application framework and methods allow machine-learning models to provide accurately tailored business insights and intelligence to users, while ensuring that data provided to the models follow sharing policies and access control requirements. The disclosed framework and methods eliminate a need for more complicated and riskier implementations, such as utilizing a separate system or a human, to enforce these policies and requirements. As a result, data is securely and safely provided to the machine-learning models to generate reliable responses in a faster and less complex manner while consuming less power.

Advantageously, to perform an analysis task, the application framework automatically provides to the machine-learning model(s) information in accordance with the enterprise's data sharing and access control requirements to prevent inappropriate access and use of sensitive information.

In some embodiments, the application framework is configured to provide a machine-learning-based analysis of communications in a central communication platform. For example, the framework receives messages from clients of an enterprise to employees of the enterprise, which were communications in the central communication platform. The application framework then constructs embedding representations of the received messages by converting each message into one or more embedding representations.

In some embodiments, an embedding comprises a vector representation that can be obtained by inputting a message into a machine-learning model. The machine-learning model is configured to receive the message, which may include text, audio, and image data, and output the vector representation of the input message to construct the embedding. This machine-learning model may be a self-supervised model.

In some embodiments, the embeddings comprise information that would be utilized by a model (e.g., LLM) for executing analysis tasks, as described in more detail below. In some embodiments, the embeddings constitute data associated with individual platform users (e.g., internal user of an organization, an external user, a chat participant, a contact), which cannot be housed in AI models due to privacy and data scope concerns.

The embedding representations may be stored in a database, and each embedding representation may be associated with a corresponding sender identity (e.g., identity of the client sending the message associated with the embedding representation) or a corresponding recipient identity (e.g., identity of the employee receiving the message associated with the embedding representation).

The application framework may identify an analysis task for the employee, for example, based on the employee's input to the framework via a graphical user interface or a triggering event, such as receiving a message suggesting a need for the task. Examples of analysis tasks include authorship analysis, sentiment analysis, summarization, response composition, action recommendation, fact checking, product or service recommendation, external user analysis, and internal user query, and are described in more detail below.

The application framework may comprise a plurality of internal user groups divided by a plurality of ethical walls, which may be an information barrier protocol within an organization designed to prevent exchange or access of information that could lead to conflicts of interest within an organization or between the organization and its clients. The enterprise may comprise different departments, and ethical walls are implemented within or between the different departments to enforce data sharing policies and access control requirements. For example, in a financial institution, an ethical wall may be set up between the wealth management department and the investment banking department to prevent information from being shared between the two business units. This way, information about a client known to the wealth management is not communicated to the investment banking department and cannot be access by the investment banking department for performing a task (and vice versa), even if the investment banking department may also serve the same client in a different capacity.

The application framework retrieves, based on the ethical walls associated with the employee, a subset of embeddings from the embeddings stored in the database. The retrieved subset of embeddings may comprise embeddings that users on a same side of an ethical wall (e.g., employees in a same department, employees in departments that do not conflict) can access, and the retrieved subset of embeddings may not comprise embeddings that the employee is not allowed to access based on data access policies and access control requirements. Using the above financial institution example, a subset of embeddings retrieved for a wealth management department employee comprises information accessible to the wealth management department and does not comprise information from the investment banking department due to the ethical wall between the two departments. In some embodiments, the subset of embeddings comprises embeddings determined to be suitable for the analysis task.

The framework executes the analysis task by providing the retrieved subset of embeddings to a trained machine-learning model. The framework causes display a graphical user interface comprising one or more outputs based on the execution of the analysis tasks. For example, the graphical user interface comprises results of the analysis requested by the employee and determined by the machine-learning model.

An employee may contribute knowledge to the framework and add to data used for executing analysis tasks. For example, the framework receives statements related to the client from the employee (which may be different from the messages received by the framework described above) and embedding representations of the statements are constructed. These embeddings are stored in the database and may be used for executing future analysis tasks, improving future task quality.

For example, the disclosed application framework and methods would prevent an employee's (accidental or intentional) inappropriate usage of data to perform a machine-learning base analysis, reducing conflicts caused by the inappropriate usage. The disclosed application framework and methods may advantageously allow not only standard access controls to an organization's data, but also allow access control required by external users (e.g., clients of the organization) in a more efficient manner, compared to more complicated and riskier implementations (e.g., increased speed for performing a task while following these requirements, reduced power consumption for performing a task while following these requirements, reduced complexity for performing a task while following these requirements).

Returning to the financial institution example, information about a client from wealth management department should not be used for a task requested by an employee of the investment banking department (and vice versa). The application framework advantageously ensures that the task requested by an employee of the investment banking department does not use information from wealth management department for executing a task, allowing the ethical wall to be efficiently enforced.

In some embodiments, the framework comprises a delivery mechanism of insights generated via the applications, one or more machine-learning models used by the applications for generating the insights, and a control framework to enforce data access policies and access control requirements on data provided to the machine-learning models.

Embodiments of the application framework may additionally allow operation within one-to-one conversations among platform users, operation in group chats with multiple participants, engagement in direct interactions with users, performing of tasks in the background based on conversational cues among chat room participants, offering of insights to chat participants, and interactions with a broader audience (including enterprise users who do not directly interact with the chatbot).

The disclosed application framework and method may also advantageously allow a scalable framework for creating and running of AI-based applications, which operate inside and outside of communication channels, between enterprise employees and external parties. The framework may target complex enterprise environments with robust permission and access controls.

Additional examples and advantages of the application framework and methods are described below. FIG. 1 illustrates exemplary method 100 for operating the application framework, in accordance with some embodiments. In some embodiments, the steps of method 100 are performed by one or more components described with respect to FIGS. 2 and/or components of system 3000. It should be appreciated that steps described with respect to FIG. 1 are exemplary. The method 100 may include fewer steps, additional steps, or different order of steps than described. Additional examples of method 100 are described with respect to FIGS. 2-29, and it is appreciated that the steps of method 100 leverage the features and advantages described with respect to FIGS. 2-29.

In some embodiments, the method 100 comprises receiving a plurality of messages for a plurality of internal users of an organization from a plurality of external users (step 102). For example, the application framework receives messages from clients of an enterprise to employees of an enterprise, which were communications between clients and the employees. As an example, the plurality of messages may be received from communication data store of embedding databases 208 described with respect to architecture 200. It should be appreciated that messages and statements used by the framework are not limited to messages comprising text, and that the messages may comprise additional or different information such as audio and/or visual messages. For example, in some embodiments, the plurality of messages comprises a text message, an email message, a chat message, an audio message, or any combination thereof. Some examples of messages are described with respect to FIGS. 3-29.

In some embodiments, the method 100 comprises constructing a plurality of embedding representations of the plurality of messages by converting each message of the plurality of messages into one or more embedding representations (step 104). For example, based on the received messages from the clients to the employees, the framework constructs embedding representations of the received messages by converting each received message into one or more embedding representations.

As an example, the framework ingests data from a source (e.g., the plurality of messages) and stores the data in the embeddings. The ingestion process comprises a schema that handles segregation of the data, such as different enterprise-grade cases of information segregation, information barriers (e.g., based on ethical walls), and encryption at rest. Data can be ingested from communication channels (e.g., communications between internal user and external user, internal communication channels, external communication channels), institutional knowledge base, and any other source that can contribute to the enterprise intelligence.

In some embodiments, the method 100 comprises storing the plurality of embeddings in an embedding database (step 106). For example, the constructed embeddings from step 104 are stored in a database (e.g., a database described with respect to embedding databases 208 of architecture 200), which will be described in more detail below. In some embodiments, each embedding of the plurality of embeddings is associated with a corresponding sender identity or a corresponding recipient identity. For example, each embedding is associated with identity of a client sending the message or with identity of an employee receiving the message.

The embeddings may be stored in embedding databases based on properties (e.g., attributes) and the data of the embeddings itself. The properties may depend on the type of data being stored. For instance, persona embeddings may have one set of attributes while embeddings of messages may have a different set of attributes. For example, for knowledge base embeddings, attributes may be represented as:—'name': the name of the knowledge base (e.g., Confluence, CRM, SharePoint, etc.), —'access_level': who has access to this knowledge base (e.g., internal, client-facing), —'content_type': types of content stored (e.g., documents, financial reports), and—'linked_to': array of Persona IDs who use or contribute to this knowledge base.

In some embodiments, the method 100 comprises identifying an analysis task for an internal user of the organization (step 108). For example, the framework (e.g., an application of applications 204 of architecture 200) identifies an analysis task for the employee. As described in more detail herein, the task may be identified via an explicit instruction from the employee to the framework, the task may be identified via inferences by the framework based on employee communications, the task may be automatically identified based on the communications between the employee and the client, or the task may be identified in response to a triggering event (e.g., when a message suggesting a need for the task is received). In some embodiments, the analysis tasks are executed periodically. For example, after a threshold amount of time has passed, a new analysis task is identified and executed as described with respect to method 100. Some examples of analysis task identification are described below.

In some embodiments, the organization comprises a plurality of internal user groups in accordance with a plurality of ethical walls, and the internal user of the organization is associated with an internal user group of the plurality of internal user groups. For example, the enterprise comprises different departments, and ethical walls are implemented within or between the different departments to enforce data sharing policies and access control requirements. An ethical wall may be an information barrier protocol within an organization designed to prevent exchange or access of information that could lead to conflicts of interest within an organization or between the organization and its clients. For example, in a financial institution, an ethical wall may be set up between the wealth management department and the investment banking department to prevent information from being shared between the two business units. This way, information about a client known to the wealth management is not communicated to the investment banking department and cannot be access by the investment banking department for performing a task (and vice versa), even if the investment banking department may also serve the same client in a different capacity.

In some embodiments, the method 100 comprises retrieving, based on the internal user group and one or more ethical walls of the plurality of ethical walls, a subset of embeddings from the stored plurality of embeddings (step 110). For example, the framework (e.g., access control logic 212 of architecture 200) retrieves a subset of embeddings, which comprises embeddings that are relevant to executing the analysis task (e.g., determined by orchestration logic 210) and accessible to the employee based on the data sharing policies and access control requirements. The retrieved subset of embeddings does not comprise embeddings that the employee's department is not allowed to access based on these policies and requirements. As described with respect to architecture 200, the subset of embeddings may be retrieved from one or more databases of embedding databases 208.

The retrieved subset of embeddings may comprise embeddings that users on a same side of an ethical wall (e.g., employees in a same department, employees in departments that do not conflict) can access, and the retrieved subset of embeddings may not comprise embeddings that the employee is not allowed to access based on data access policies and access control requirements. Using the above financial institution example, a subset of embeddings retrieved for a wealth management department employee comprises information accessible to the wealth management department and does not comprise information from the investment banking department due to the ethical wall between the two departments. In some embodiments, the subset of embeddings comprises embeddings determined (e.g., by the framework) to be suitable for the analysis task.

In some embodiments, the subset of embeddings is retrieved additionally via an encryption key associated with the client. This may advantageously provide an additional of security rights and access control. For example, the subset of embeddings may be retrieved after a single sign-on requirement or similar security requirement is satisfied.

In some embodiments, the method 100 comprises executing the analysis task by providing the retrieved subset of embeddings to a trained machine-learning model (step 112). For example, the framework executes the analysis task by providing the retrieved subset of embeddings to a trained machine-learning model (e.g., a machine-learning model of Model/AI agents 202 of architecture 200). In some embodiments, the trained machine-learning model is configured to receive the subset of embeddings and output a result, such as a score, a summary, a text, or a recommendation.

In some embodiments, the machine-learning models for the analysis task are not trained based on restricted information (e.g., private information of a client, confidential information, sensitive information) because in some instances, the models may not forget this information or be able to delete this information. Therefore, it may be advantageous to provide the embeddings, which may include sensitive, confidential, and/or private information, to the trained machined-learning model, in lieu of training the machine-learning model with this information to avoid the information being retained by the model or affecting model operation.

In some embodiments, the trained machine-learning model is selected from a plurality of machine learning models based on the identified task. For example, a machine-learning model most appropriate for executing the analysis task is selected (e.g., by orchestration logic 210 of architecture 200). Examples of machine-learning models for executing the analysis tasks are described in more detail herein.

Examples of the analysis tasks are described in more detail below. The analysis task may comprise authorship analysis for an external user of the plurality of external user (e.g., a client). In this example, the method 100 further comprises receiving a current message from the external user and retrieving the subset of embeddings. The subset of embeddings may correspond to previous messages from the external user to one or more internal users of the internal user group (e.g., from step 110). The framework executes the analysis task by providing the retrieved subset of embeddings and the current message to the trained machine-learning model and receiving, from the trained machine-learning model, an output indicative of a stylistic difference between the current message and the previous messages from the external user. The stylistic difference may indicate whether the current message is authored by the external user. In some embodiments, access control for this task (e.g., control of access control logic 212 of architecture 200) can be configured via an application or configured via an external user's SSO or other access control systems.

As an example of authorship analysis, in response to identification of the task as comprising authorship analysis (e.g., on a continuous basis as messages are received from an external user as required by the organization's information security program, or after the internal user provides the message "tell me if it's the same user" to the application), messages sent by the external user (that the authorship analysis is performed on) are pulled from the embeddings database (e.g., using the access control logic 212), and the application queries the appropriate model (e.g., a model for determining authorship) with the current message (the message the authorship analysis is performed on) and the older messages, to compare the authorship style. The result (e.g., authorship mismatch, authorship match) of the analysis may be reported to the internal user via a graphical user interface. The number of messages pulled may be defined by the internal user (e.g., based on settings) or automatically by the framework. For example, the user may provide the message "give me last 200 messages of this user" to the application to compare the style of these 200 messages to style of the current message via the model.

In this example and the examples of analysis tasks below, the current message may be provided to the machine-learning model as a context associated with the analysis task, and the machine-learning model would take this context into account while the analysis task is executed. Additionally, prior to providing the current message to the machine-learning model, the current message may be converted into embeddings, and the embeddings converted from the current message are additionally provided to the machine-learning model for executing the analysis tasks.

The analysis task may comprise a sentiment analysis for an external user of the plurality of external users (e.g., a client). In this example, the method 100 further comprises retrieving the subset of embeddings. The subset of embeddings may correspond to previous messages from the external user to one or more internal users of the internal user group (e.g., from step 110). The framework executes the analysis task by providing the retrieved subset of embeddings to the trained machine-learning model and receiving, from the trained machine-learning model, the sentiment analysis of the external user. The analysis may indicate a sentiment of the external user. The sentiment of the user may be quantified by a sentiment score.

As an example of sentiment analysis, in response to identification of the analysis task as comprising sentiment analysis (e.g., via user input, on a continuous basis as messages are received by the internal user, after a threshold amount of time (e.g., as configured by the internal user)), messages of one or more conversations between the internal user and the external user (that the sentiment analysis is performed on) are pulled (e.g., from embeddings database of architecture 200). The pulled conversations are analyzed by a machine-learning model (e.g., LLM) to understand the sentiments of the one or more conversations. Based on this analysis, a sentiment score or a sentiment analysis (e.g., the client is satisfied) is determined and displayed on a graphical user interface.

The analysis task may comprise summarization. As an example, summarization comprises summarizing a current message from a client. In this example, the method 100 further comprises receiving a current message from the external user (e.g., the current message from the client) and retrieving the subset of embeddings. The subset of embeddings may correspond to previous messages from the external user to one or more internal users of the internal user group (e.g., from step 110). The framework executes the analysis task by providing the retrieved subset of embeddings and the current message to the trained machine-learning model and receiving, from the trained machine-learning model, a summary of the current message. The summary of the current message may be displayed on a graphical user interface.

In some embodiments of summarization, the subset of embeddings includes only embeddings associated with the current message. In some embodiments of summarization, the subset of embeddings includes embeddings associated with the current message and embeddings associated with messages related to the current message. For example, the embeddings associated with the current message are used for substance of the summarization, while the embeddings associated with the relevant messages (e.g., recent messages, messages including information about personas in the conversation) are used to provide context (e.g., set the tone of the summarization).

The analysis task may comprise response composition. As an example, response composition comprises generating a suggested response to a client. In this example, the method 100 further comprises receiving a current message from an external user (e.g., a current message from the client) and retrieving the subset of embeddings. The subset of embeddings may correspond to previous messages from the external user to one or more internal users of the internal user group (e.g., from step 110). The framework may execute the analysis task by providing the retrieved subset of embeddings and the current message to the trained machine-learning model and receiving, from the trained machine-learning model, a composed message for responding to the current message. For example, the framework receives, from the machine-learning model, the suggested response to the client. The composed message may be displayed on a graphical user interface.

As an example of response composition, in response to identification of the analysis task as comprising response composition (e.g., via user input, on a continuous basis as messages are received by the internal user, after a threshold amount of time (e.g., as configured by the internal user)), conversation history between the internal user and the external user (that the response is composed for) and persona embeddings (e.g., from embedding databases 208 of architecture 200) are pulled. In some embodiments, conversation history between a second internal user (e.g., a colleague in a same department) and the external user are also pulled, to provide additional intelligence for improving the quality of the response composition. This data is provided to one or more machine-learning models (e.g., a built-in model, BYOM model of architecture 200). Based on the output of the one or more machine-learning models, one or more suggested responses to the external user are displayed on a graphical user interface for the internal user to select. In some embodiments, the conversation history is also displayed.

The analysis task may comprise an action recommendation with respect to an external user. As an example, the analysis task comprises an action recommendation for the client. In some embodiments, the recommended action comprises suggesting a product or service to the external user or initiating a conversation with the external user. In this example, the method 100 further comprises retrieving the subset of embeddings. The subset of embeddings may correspond to previous messages from the external user to one or more internal users of the internal user group (e.g., from step 110). The framework may execute the analysis task by providing the retrieved subset of embeddings to the trained machine-learning model and receiving, from the trained machine-learning model, a recommended action with respect to the external user. The recommended action may be displayed on a graphical user interface.

The analysis task may comprise fact checking. As an example, fact checking comprises determining factual validity of information associated with the client (e.g., information provided by the client in a current message), which may be used for fraud mitigation. In this example, the method 100 further comprises receiving a current message from an external user and retrieving the subset of embeddings. The subset of embeddings may correspond to previous messages from the external user to one or more internal users of the internal user group (e.g., from step 110). The framework may execute the analysis task by providing the retrieved subset of embeddings and the current message to the trained machine-learning model and receiving, from the trained machine-learning model, a verification of the current message. For example, the framework receives a determination that the information in the current message is factually valid. The verification of the current message may be displayed on a graphical user interface.

As an example of fact checking, in response to identification of the task as comprising fact checking, a machine-learning model (e.g., LLM, which may be fine-tuned with institutional knowledge or have access to outside knowledge sources, such as the internet, financial databases) is used by the application, and the message is being checked with the model to understand if the fact in the message is correct. The result (e.g., valid facts, invalid facts) of the analysis may be reported to the internal user via a graphical user interface.

The analysis task may comprise product or service recommendation for an external user. In this example, the method 100 further comprises retrieving the subset of embeddings. The subset of embeddings corresponds to previous messages from the external user to one or more internal users of the internal user group (e.g., from step 110). The framework may execute the analysis task by providing the retrieved subset of embeddings to the trained machine-learning model and receiving, from the trained machine-learning model, a product or a service recommendation for the external user. The produce or service recommendation may be display on a graphical user interface.

The analysis task may comprise an analysis of an external user. For example, the analysis task comprises an analysis of a client. In this example, the method 100 further comprises retrieving the subset of embeddings. The subset of embeddings corresponds to previous messages from the external user to one or more internal users of the internal user group (e.g., from step 110). The framework may execute the analysis task by providing the retrieved subset of embeddings to the trained machine-learning model and receiving, from the trained machine-learning model, the analysis of the external user. The analysis of the external user may be displayed on a graphical user interface.

The analysis task may be obtained based on a query of the internal user of the organization. For example, the query is made via the internal user's conversation with a personal assistant (e.g., a chatbot). In this example, the method 100 further comprises retrieving the subset of embeddings. The subset of embeddings may correspond to previous messages to one or more internal users of the internal user group (e.g., from step 110). The framework may execute the analysis task by providing the retrieved subset of embeddings to the trained machine-learning model and receiving, from the trained machine-learning model, a response to the query of the internal user. For example, the framework receives the response of the query and communicate the response to the user via the personal assistant. The response to the query may be display on a graphical user interface.

In some embodiments, the method 100 comprises displaying a graphical user interface comprising one or more outputs based on the execution of the analysis task (step 114). For example, a system for operating the framework comprises a display, and a graphical user interface comprising one or more outputs based on the execution of the analysis tasks, such as results of an analysis (e.g., a score, a summary, a text, a recommendation) identified by the framework, is presented on the display. Examples of outputs displayed on a graphical user interface are described in more detail below.

In some embodiments, the graphical user interface comprises a dashboard graphical user interface. In some embodiments, the graphical user interface comprises a messaging graphical user interface. In some embodiments, the graphical user interface comprises a chatbot graphical user interface. Examples of the graphical user interfaces are described in more detail below.

In some embodiments, the application framework and methods allow a feedback loop, which enables an internal user to contribute additional information to supplement information derived from messages from an external user to an internal user. For example, an employee may contribute knowledge to the framework and add to the data used for executing the analysis task for improving output quality of the analysis task.

In some embodiments, the method 100 comprises receiving, from the internal user of the organization, one or more statements related to one or more external users of the plurality of external users and constructing one or more embedding representations of the one or more statements. For example, the employee provides one or more statements (which may be different from the messages received at step 102 and/or may be information that is not currently in the embedding databases) to the framework (e.g., via a chatbot application), and (e.g., via feedback loop 218 of architecture 200) one or more embeddings of the one or more statements are constructed (which may be different from the embeddings constructed at step 104).

The one or more statements may be relevant to different levels of interactions. For example, the one or more statements may be relevant to interactions between an internal user and an external user (e.g., a specific employee and a specific client). As another example, the one or more statements may be relevant to interactions between an internal group and an external user or an external group (e.g., between the enterprise or a department and a client firm or a specific client). In some embodiments, the constructed embeddings are associated with the entities that the knowledge refers to (e.g., users, clients, professional topics). Later, the constructed embeddings may be provided to machine-learning models for execution of tasks by applications, improving output quality of the models. In some embodiments, the constructed embeddings (based on the one or more statements) are stored in the embedding database.

Although examples described herein relate to employees of an enterprise, a client of the enterprise, and ethical walls associated with the enterprise, it should be appreciated that these examples of internal users, external users, and ethical walls are exemplary. The internal users, external users, and ethical walls may be associated with other organizations and scenarios. The disclosed application framework may retrieve a subset of embeddings (provided to a machine-learning model for executing an analysis task) based on ethical walls different than described.

FIG. 2 illustrates exemplary architecture 200 of the application framework, in accordance with some embodiments. In some embodiments, the architecture 200 includes components for performing steps and implementing features described with respect to method 100. The component operations of architecture 200 may be performed by system 3000. It should be appreciated that the components and interactions between components illustrated in and described with respect to FIG. 2 are exemplary, and that the application framework architecture may include different components and interactions than illustrated and described.

An example workflow of the architecture is now described. The architecture 200 comprises applications 204, which may comprise a chatbot application interacting with an internal user. Based on the interaction, an analysis task is identified and submitted to orchestration logic 210. The orchestration logic 210 communicates with access logic 212 to determine accessible data required for the task (e.g., determining a subset of embeddings for the task based on ethical walls). Based on this determination, the access logic 212 retrieves the embeddings from databases of embedding databases 208. After the appropriate embeddings are retrieved, the orchestration logic 210 instructs the access control logic 212 to execute the analysis task, which may include an instructing the access control logic 212 to invoke one or more appropriate models for performing the task. In some embodiments, based on the provided data, the orchestration logic 210 determines the one or more appropriate models. In response, the access control logic 212 communicates with models/AI agents 202 and provides the retrieved data to the appropriate models for performing the task. An output of the task may be provided to the internal user via a graphical user interface of the chatbot application. Additional detail of the architecture 200 is described below.

In some embodiments, the architecture 200 comprises models/AI agents 202, which comprise one or more AI models (e.g., LLMs). In some embodiments, the Models/AI agents 202 comprise the trained machine-learning model described with respect to method 100. In some embodiments, the models/AI agents 202 comprise multiple machine-learning models (e.g., multiple LLMs) for various application needs.

The one or more AI models may form the foundation of applications deployed on the application framework. In some embodiments, these models are provided with the product comprising the framework. In some embodiments, the trained machine-learning models are pre-trained by data that do not conflict with the organization's data sharing policies and data access control requirements. In some embodiments, these models are added to the framework (e.g., not part of the product) via Bring Your Own Model (BYOM) methodology, as illustrated in the example. The models may reside locally or remotely, either integrated with the product or accessible via APIs.

As an example of BYOM—a finance organization is working on its internal models for its specific domain use case in finance. For example, a domain-specific model is needed for its chat room, in lieu or in addition to machine-learning models (e.g., LLMs) that were included with the product. In this example, the BYOM would comprise the domain-specific model for the finance organization's specific needs.

In some embodiments, if a domain-specific model is trained using data governed by ethical walls, then access to the domain-specific model is also governed by these ethical walls. For example, if there is an ethical wall between the wealth management department and the investment banking department, a version of the domain-specific model trained using wealth management department data may not be accessed by the investment banking department. The investment banking department may access a version of the domain-specific model trained using data that it can access.

In some embodiments, one or more models of models/AI agents 202 are not trained based on restricted information (e.g., private information of a client, confidential information, sensitive information) because in some instances, the models may not forget this information or be able to delete this information. Therefore, it may be advantageous to provide the embeddings, which may include sensitive, confidential, and/or private information, to the trained machined-learning model, in lieu of training the machine-learning model with this information to avoid the information being retained by the model or affecting model operation.

In some embodiments, the architecture 200 comprises applications 204, which comprise chat applications employed by internal users (e.g., employees of an enterprise). As described in more detail herein, the applications 204 interact with the framework to convey insights to users, determined based on data (e.g., embeddings) and the models. In some embodiments, the application framework and methods allow multiple application scopes, single conversation scope, and/or a larger scope encompassing activity spectrum of an enterprise user (or an external party). Example graphical user interfaces (for facilitating this interaction) associated with the applications 204 are described in more detail below.

In some embodiments, an application of applications 204 is linked to a specific model of model/AI agents 202, such that the specific model is used when this application is being utilized.

In some embodiments, some applications of applications 204 may require knowledge stored in multiple models of model/AI agents 202 (in addition to the machine-learning model used for executing an analysis task). For example, one model might be associated with a knowledge base of an enterprise, and another model may be associated with communication history of the enterprise. As other examples, authorship attribution application may (additionally or alternatively) use Flan t5 model and summarization application may (additionally or alternatively) use the GPT4 model. As another example, some application might use more than one models—for instance, general reasoning task can be achieved by using GPT4 model, and the answer can be enriched by running the same task by additional model, such as a model supplied by the organization itself, which might hold information about specific products offered by the organization that may improve the output quality of the task.

In some examples, depending on the execution task, the application framework can infer the intent. For example, if the intent is to provide an answer from a knowledge base, then the model associated with the knowledge base is used. If the intent is to provide an answer based on the communication history, then the model associated with the communication history is used. This may be facilitated by orchestration logic 210, which is described in more detail below. In some embodiments, the association between a model and an application is defined by metadata. The metadata may comprise information about, for example, an interface to the model, what the model can provide, expected inputs of the model, and expected outputs of the model. Based on the metadata, the framework (e.g., orchestration logic 210) would be able to determine which models can be used for an application.

In some embodiments, the architecture 200 comprises embedding databases 208. In some embodiments, embedding databases 208 are configured to store embeddings described with respect to method 100 above. In some embodiments, the embeddings constitute data associated with individual platform users (e.g., internal user of an organization, an external user, a chat participant, a contact), which cannot be housed in AI models due to privacy and data scope concerns. As described in more detail herein, the framework uses these embeddings as contextual information when activating the AI models. Embedding databases 208 can leverage a variety of storage models depending on the nature of data to be stored.

In some embodiments, the embeddings comprise information that would be utilized by a model (e.g., LLM) for executing analysis tasks. As described in more detail herein, the model provides an output based on this provided data.

In some embodiments, embedding databases 208 comprise a collection of databases for storing the data. For example, as illustrated in this example, embedding databases 208 comprise a database that stores information about persona. As examples, information stored in persona storage includes external user (e.g., client) identity information, knowledge about external user, internal user (e.g., enterprise employee) identity information, a department of a user, information that allows data segregation (e.g., ethical wall information), or any combination thereof. As another example, as illustrated, communication history (e.g., messages from external users to internal users, information about who said what to whom, metadata grouping the information by organizations) is stored in communicate data storage of the embedding databases 208. In some embodiments, embeddings stored in communication data storage comprise vector representations of communication history, providing the ability to plug-in and chain external machine-learning models (e.g., LLMs) for enhanced, enterprise specific intelligence. In some embodiments, the embedding databases 208 comprise other databases that store information in a segregated way.

In some embodiments, the persona storage stores known information about a persona from different sources, which may include SSO/AD, information shared about the persona (e.g., from communications data), and/or a user. For example, through a knowledge commitment application (e.g., of applications 204), a user may communicate information about the persona (e.g., a client), and the information may be stored in a portion of the persona storage associated with the persona. A user may modify client profile and add to the persona storage by e.g., providing travel details, hobbies, interests, etc. known to the user. This information (e.g., information from client profile stored in persona storage) can be used to customize conversation style—for example, if the client is less transactional and requires chit chat before diving into business, then this information is stored as the client's persona embeddings and may be used for executing an analysis task (e.g., suggesting a message to the client).

As described in more detail below, access control logic 212 may control the access to information in the embedding databases 208, such that sensitive data may not be provided to the models, instead stored safely and securely within the enterprise (e.g., according to ethical walls), and not used by an external user. Based on the ethical walls, a subset of the embedding databases 208 is retrieved and provided to a trained machine-learning model to execute an analysis task. For example, when these databases are accessed by access control logic 212, the access is based on the scope of specific user, specific client, and specific application (e.g., determined by ethical walls), to prevent e.g., violation of data sharing policies and/or access control requirements.

In some embodiments, the architecture 200 comprises orchestration logic 210, which ensures that the appropriate applications have access to the correct models and data and poses the appropriate queries. For example, the orchestration logic 210 helps shuttle relevant information from external users (e.g., client inputs) to the appropriate model while abiding by the access controls (e.g., determined based on client access control requirements or enterprise data sharing policies).

In some embodiments, the orchestration logic 210 is configured to communicate an application's needs, such as one or more appropriate models for the application, in response to a request for executing an analysis task. The model's use may be changed. In some embodiments, the orchestration logic 210 initially uses one model for the task, and then based on an output from this model, the orchestration logic 210 uses a second model for the task, such that more than one models may be combined to provide a better outcome.

In some embodiments, the architecture 200 comprises access control logic 212, which is configured to manage granular access to embedding databases 208 and to ensure that information boundaries are upheld and enforced (e.g., based on an organization's ethical walls). In some embodiments, the information being stored in embeddings (e.g., persona storage, communication data storage, integrations data storage) and the access to embeddings are being governed by access control logic 212.

In some embodiments, access control logic 212 is configured to collect the authorized data as input data for the machine-learning model. The input data may comprise a subset of embeddings, which is retrieved by the access control logic 212 based on, for example, an ethical wall, an identity of an internal user requesting the task, an external user associated with the task. For example, the platform deployed in financial organization, and the organization set up ethical walls between investment banking and wealth management departments. Information about a client that wealth management know should not be used for a task associated with the same client requested by a user of the investment banking department. In this example, access control logic 212 ensures that the task requested by the user of the investment banking department does not use information known to wealth management and the ethical wall is efficiently maintained.

In some embodiments, as mentioned above, information in a segregated way in databases of embedding databases 208. Based upon understanding the application, the external user, the internal user, and an ethical wall associated with the internal user, the access control logic 212 is configured to access specific segregations of the data. The access control logic 212 may advantageously access only what is permitted to the internal user and only information necessary for executing the analysis task.

In some embodiments, the architecture 200 comprises integrations 206, which comprise interaction of the application framework with one or more external systems. For example, to ensure applications provide enterprise-specific information to users, the framework may permit the incorporation of external data sources (e.g., Confluence, CRM, SharePoint). The data from external data sources may include third-party knowledge (different from first-hand knowledge already stored in the application framework) that may be used to improve analysis results (e.g., used for cross-correlation with user data). This data may be utilized to fine-tune AI models or to store information within the embeddings.

In some embodiments, the architecture 200 comprises integration coordinator 216, which is configured to receive data imported from third-party platforms (e.g., in communications with integrations 206), which could include external communication sources, external persona information, an external organizational knowledge base, or any combination thereof. In some embodiments, some of the data received via integration coordinator 216 and integrations 206 are employed for model fine-tuning, some are stored as embeddings (with the necessary access control), or both.

In some embodiments, the architecture 200 comprises feedback loop 218, which allows users (e.g., internal users) to contribute knowledge or intelligence back to the framework (e.g., as described with respect to method 100). As illustrated, the user may provide feedback via an application of application 204, and the feedback is provided to and stored in embedding databases 208, which may be used to improve embeddings used for further tasks. Advantageously, the feedback loop 218 allows the ability for the platform to learn is coming not only from the communication data (e.g., messages in communication data store) and external sources (e.g., from integrations 206), but also from the users themselves. As an example, feedback loop 218 can be implemented in form a chatbot (e.g., user provides knowledge or intelligence to the framework via the chatbot), documents upload, or any other similar mechanism.

FIGS. 3-29 illustrate exemplary graphical user interfaces, in accordance with some embodiments. In some embodiments, FIGS. 3-29 illustrate examples of user interactions with the application framework described with respect to FIGS. 1 and 2. For example, FIGS. 3-29 illustrate graphical user interfaces of one or more applications 204, such as a chat application. In some embodiments, FIGS. 3-29 illustrate graphical user interfaces presented to an internal user of an organization (e.g., an employee of an enterprise), and the described interactions between the internal user and the graphical user interface provide examples of application framework operations.

For example, the application is configured to suggest the next action when an internal user (e.g., an enterprise employee) is chatting with an external user (e.g., a client). Via a graphical user interface described below, the framework is configured to propose, for example, the succeeding message or action to be transmitted to the external user. Upon identification of an analysis task (e.g., the internal user selects one of the options proposed by the framework, the framework determines an appropriate task based on the current chat), the analysis task is executed as described with respect to FIGS. 1 and 2, and one or more outputs based on the execution of the analysis task are displayed on these graphical user interfaces.

Figure 3:
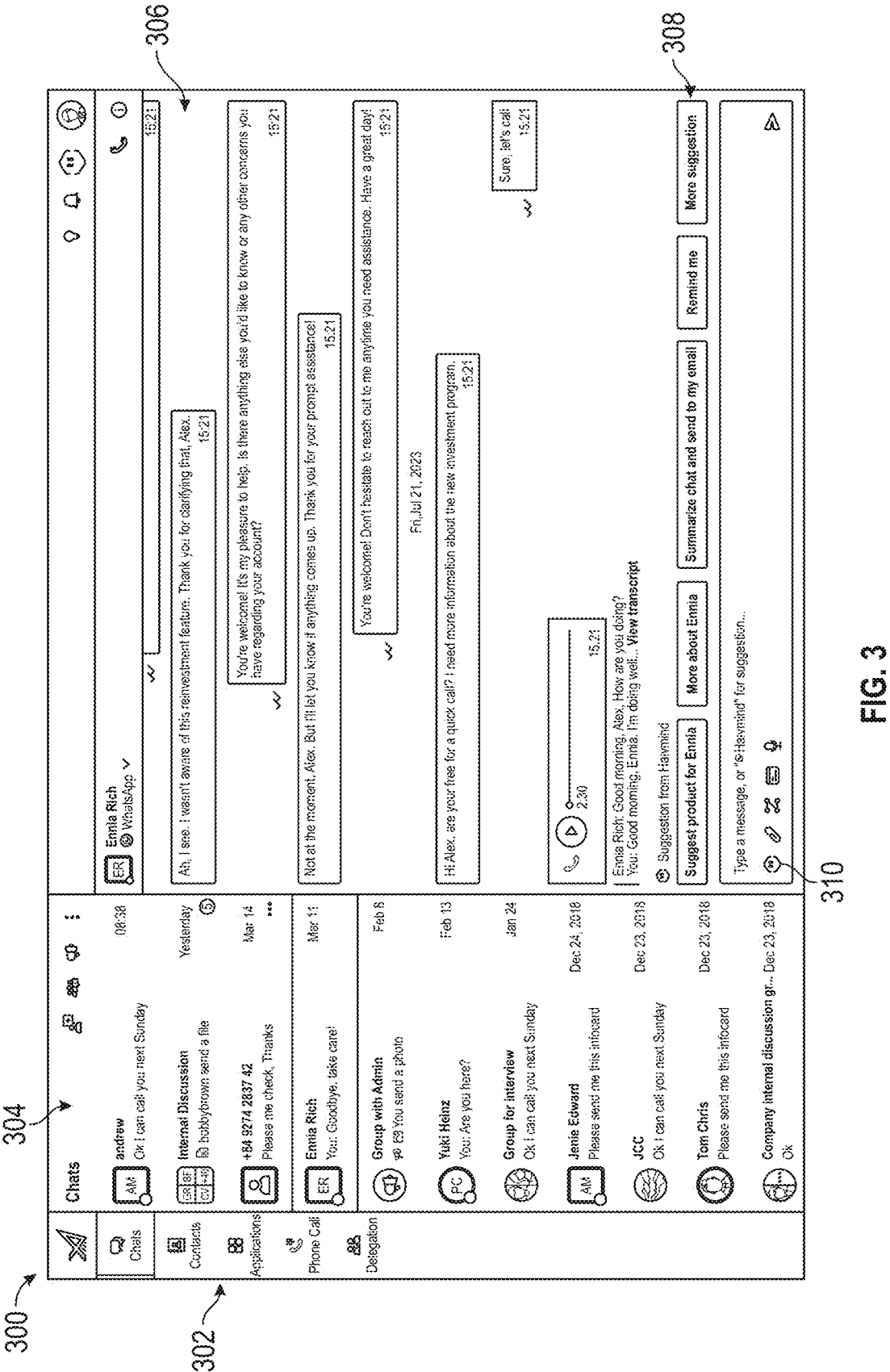
FIGS. 3-29 illustrate exemplary graphical user interfaces, in accordance with some embodiments.

FIG. 3 illustrates exemplary graphical user interface 300, in accordance with some embodiments. As illustrated, the graphical user interface 300 is a graphical user interface of a chat application, and the graphical user interface 300 comprises a first group 302 of graphical user interface objects, a second group 304 of graphical user interface objects, a chat window 306, a third group 308 of graphical user interface objects, and a graphical user interface object 310.

In some embodiments, the first group 302 of graphical user interface objects comprises objects for selecting different interfaces of the chat application. For example, as illustrated, the "Chats" object is selected, and in response, the second group 304 of graphical user interface objects is displayed, and a chat window 306 corresponding to the selected object of group 304 is displayed on the graphical user interface 300.

In some embodiments, the second group 304 of graphical user interface objects comprises graphical user interface objects corresponding to chats with different contacts. In some embodiments, the chat application advantageously integrates chats with different contacts from different messaging application into one graphical user interface. That is, the contacts associated with the second group 304 of graphical user interface objects may be communicating with the internal user via different messaging applications. As described above, each of these contacts and/or chats may have respective embeddings that correspond to a respective persona of the contact and/or messages of a respective chat, and these embeddings may be used for executing an analysis task related to the respective contact and/or the respective chat.

In some embodiments, the chat window 306 corresponds to a selected object of group 304. In this illustrated example, the chat window 306 corresponds to a chat between the internal user and external user "Ennia Rich," who may be a client of the enterprise. In some embodiments, the messages in the chat window 306 comprise messages (which include a voice transcription in this example) that may be received by the framework for constructing embeddings, as described with respect to FIGS. 1 and 2.

In some embodiments, the third group 308 of graphical user interface objects comprise graphical user interface objects corresponding to suggested next actions. The next actions may be suggested by the framework based on the context of the chat and embeddings associated with the external user Ennia Rich and/or the chat.

For example, as illustrated, the suggested next actions include "Suggest product for Ennia" (e.g., suggesting a product to the external user), "More about Ennia", "Summarize chat and send to my email" (e.g., summarization), and "Remind me". Each of the suggested next actions corresponds to an analysis task that may be executed as described with respect to FIGS. 1 and 2. The third group 308 of objects may also include an object for displaying additional suggestions (e.g., "More suggestion"). After selection of an object from the third group 308 of objects, an analysis task is identified, and the analysis task may be executed as described with respect to FIGS. 1 and 2.

As explained above, the embeddings used for generating the suggested next actions and/or executing the analysis task depend on the internal user of the graphical user interface 300. That is, the internal user may be required to follow data access policies and/or access control requirements, and these policies and requirements are defined via ethical walls. The ethical walls associated with the internal user may prevent some embeddings to be used for suggesting the next action and/or executing the analysis task. For example, if there is an ethical wall that prevents the internal user from knowing that Ennia Rich loves karaoke, then the suggested actions and/or execution of the analysis task would not take Ennia Rich's love of karaoke into account. That is, embeddings comprising information indicating that Ennia Rich loves karaoke would not be used for suggesting the next actions and executing the analysis task.

In some embodiments, the suggested next actions are presented automatically. For example, if the application determines that the internal user may desire a suggestion (e.g., based on context of the conversation, based on embeddings of the external user indicating that the user has a particular preference, based on the internal user's preference) for a next action, then the third group 308 of graphical user interfaces is displayed in accordance with this determination.

In some embodiments, the third group 308 of graphical user interface objects is displayed in response to a selection of the graphical user interface object 310. As illustrated, selection of the graphical user interface object 310 is configured to invoke software "Haivmind," and in response to the selection, the application is configured to display suggestions from the software. In some embodiments, the software is configured to communicate with components of the framework for executing the analysis tasks and to display results of the analysis tasks on the user interface 300. In this example, the suggestions comprise suggested next actions.

Figure 4:
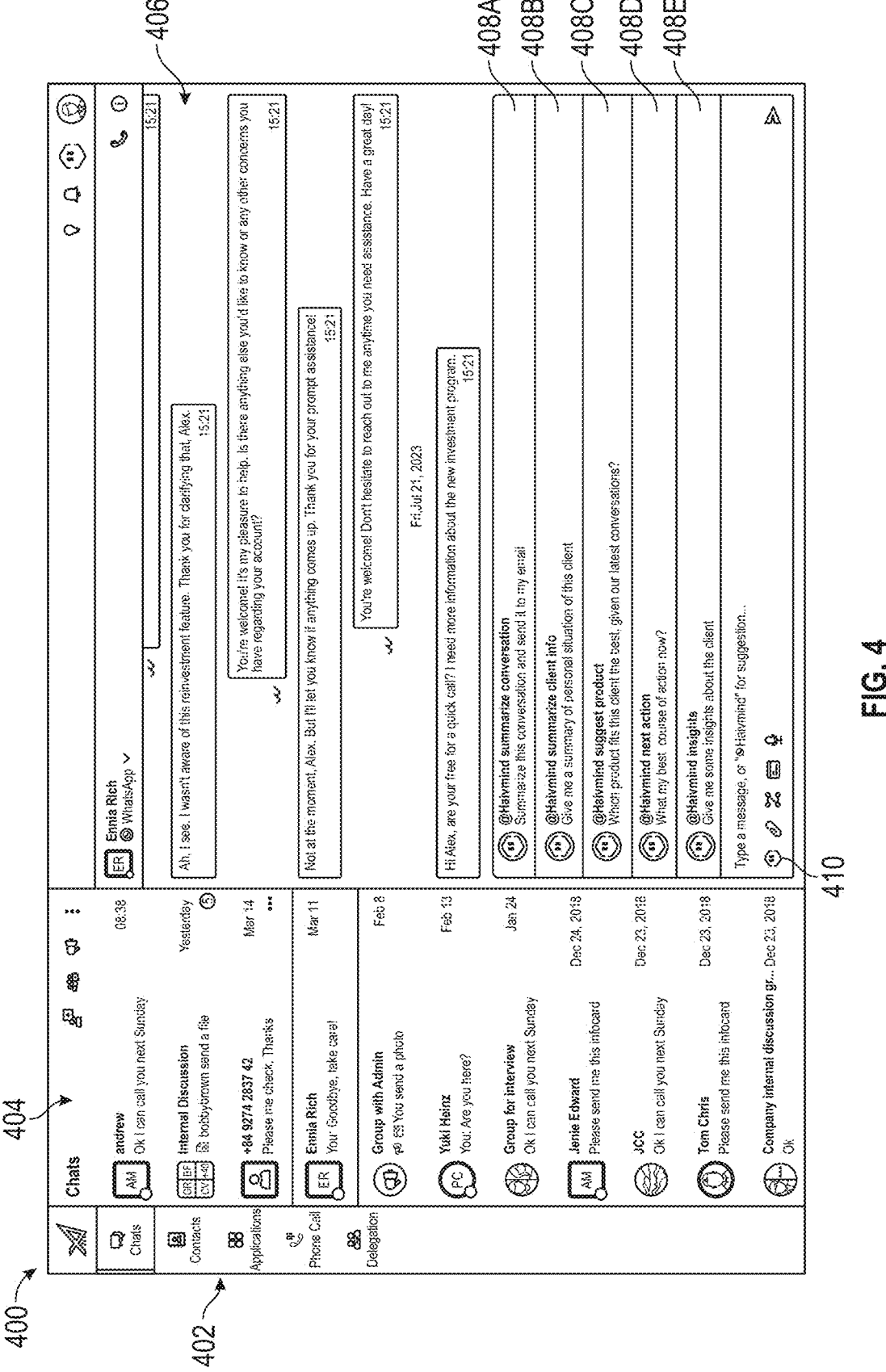

FIG. 4 illustrates exemplary graphical user interface 400, in accordance with some embodiments. As illustrated, the graphical user interface 400 is a graphical user interface of a chat application, and the graphical user interface 400 comprises a first group 402 of graphical user interface objects, a second group 404 of graphical user interface objects, a chat window 406, graphical user interface objects 408A-408E, and a graphical user interface object 410.

It should be appreciated that the graphical user interface 400 leverages features and advantages described with respect to graphical user interface 300. For example, the first group 402 of graphical user interface objects may correspond to the first group 302 of graphical user interface objects, the second group 404 of graphical user interface objects may correspond to the second group 304 of graphical user interface objects, the chat window 406 may correspond to the chat window 306, and the graphical user interface object 410 may correspond to the graphical user interface object 310.

In some embodiments, the graphical user interface objects 408A-408E correspond to prompt shortcuts corresponding to suggested next actions. The prompt shortcuts may be suggested by the framework based on the context of the chat and embeddings associated with the external user Ennia Rich and/or the chat. For example, as illustrated, the prompts include summarizing a conversation (e.g., summarization) corresponding to graphical user interface object 408A, summarizing client info (e.g., an analysis of a client) corresponding to graphical user interface object 408B, suggesting a product (e.g., suggesting a product to the external user) corresponding to graphical user interface 408C, next action (e.g., an action recommendation) corresponding to graphical user interface 408D, and insights (e.g., an analysis of a client) corresponding to graphical user interface object 408E. As illustrated, in some embodiments, each of the graphical user interface objects 408A-408E may include a short description of the tasks corresponding to the objects. After selection of an object from one of objects 408A-408E, an analysis task is identified, and the analysis task may be executed as described with respect to FIGS. 1 and 2.

As explained above, the embeddings used for generating the prompt shortcuts and/or executing the analysis task depend on the internal user of the graphical user interface 400. That is, the internal user may be required to follow data access policies and/or access control requirements, and these policies and requirements are defined via ethical walls. The ethical walls associated with the internal user may prevent some embeddings to be used for generating the prompt shortcuts and/or executing the analysis task.

In some embodiments, the prompt shortcuts are presented automatically. For example, if the application determines that the internal user may desire a suggestion (e.g., based on context of the conversation, based on embeddings of the external user indicating that the user has a particular preference, based on the internal user's preference) for a next action, then the graphical user interface objects 408A-408E are displayed in accordance with this determination. In some embodiments, the graphical user interface objects 408A-408E are displayed in response to a selection of the graphical user interface object 410.

Figure 5:
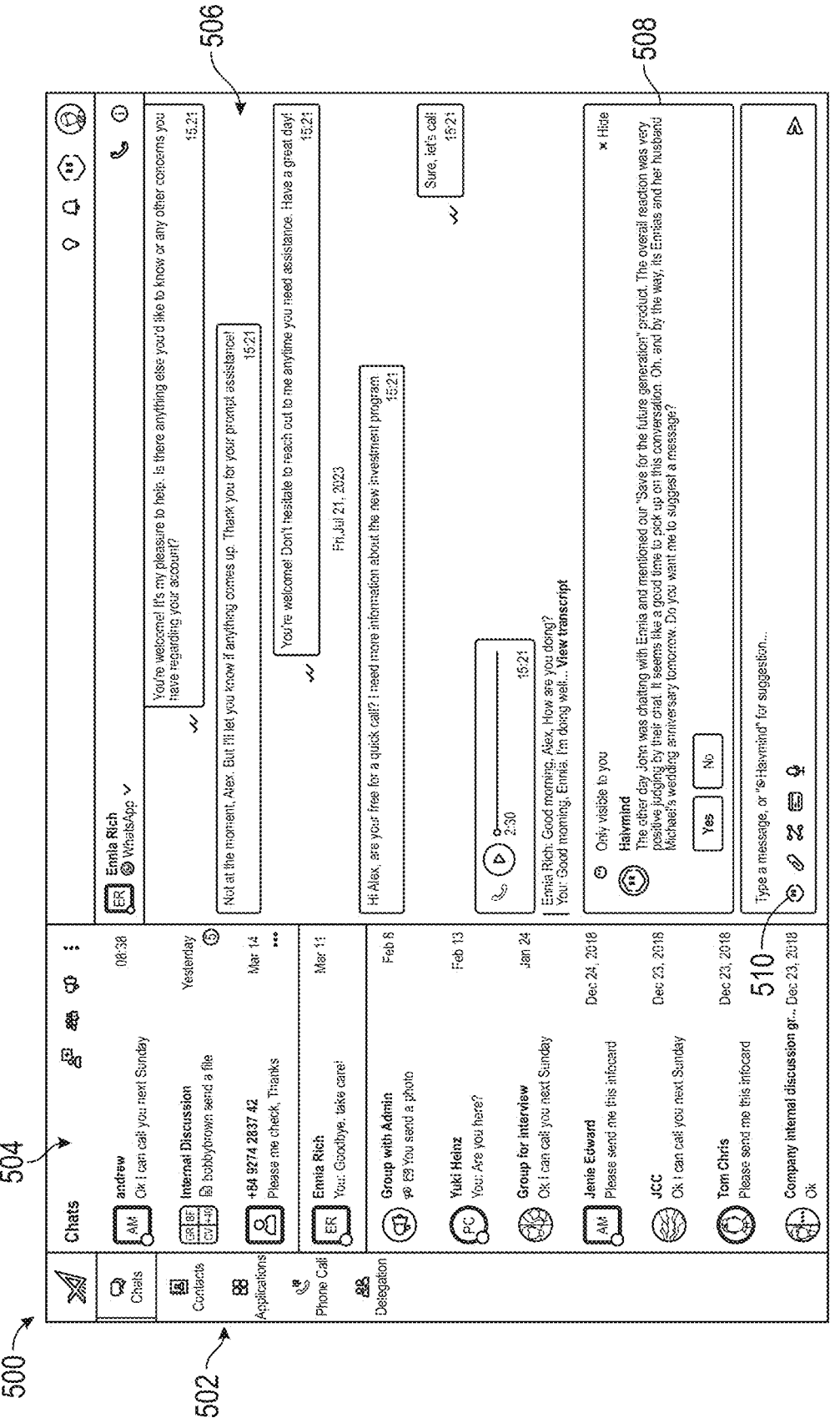

FIG. 5 illustrates exemplary graphical user interface 500, in accordance with some embodiments. As illustrated, the graphical user interface 500 is a graphical user interface of a chat application, and the graphical user interface 500 comprises a first group 502 of graphical user interface objects, a second group 504 of graphical user interface objects, a chat window 506, graphical user interface object 508, and a graphical user interface object 510.

It should be appreciated that the graphical user interface 500 leverages features and advantages described with respect to graphical user interface 300. For example, the first group 502 of graphical user interface objects may correspond to the first group 302 of graphical user interface objects, the second group 504 of graphical user interface objects may correspond to the second group 304 of graphical user interface objects, the chat window 506 may correspond to the chat window 306, and the graphical user interface object 510 may correspond to the graphical user interface object 310.

In some embodiments, the graphical user interface object 508 comprises a suggested next action. The next action may be suggested by the framework based on enterprise information associated with the external user. For example, as illustrated, a different internal user, John, was chatting with the external user Ennia, and a positive reception of a product and anniversary date were mentioned, and the graphical user interface object 508 asks whether the internal user would like a suggest a message. The information in the suggested next action may be associated with one or more embeddings. For example, these one or more embeddings are associated with John's messages with Ennia. After selection of "Yes," the response composition task may be identified, and the analysis task may be executed as described with respect to FIGS. 1 and 2. An example of the suggested message is described with respect to FIG. 6.

As explained above, the embeddings used for generating the suggested next action and/or executing the analysis task depend on the internal user of the graphical user interface 500. That is, the internal user may be required to follow data access policies and/or access control requirements, and these policies and requirements are defined via ethical walls. The ethical walls associated with the internal user may prevent some embeddings to be used for generating the suggested next action and/or executing the analysis task. In this example, because information about Ennia's positive product reception and anniversary date is accessible to the internal user, the suggested next action may be generated and executed based on this information.

In some embodiments, the suggested next action is presented automatically. For example, if the application determines that the internal user may desire a suggestion (e.g., based on context of the conversation, based on embeddings of the external user indicating that the user has a particular preference, based on the internal user's preference) for a next action, then the graphical user interface object 508 is displayed in accordance with this determination. In some embodiments, the graphical user interface objects 508 is displayed in response to a selection of the graphical user interface object 510.

Figure 6:
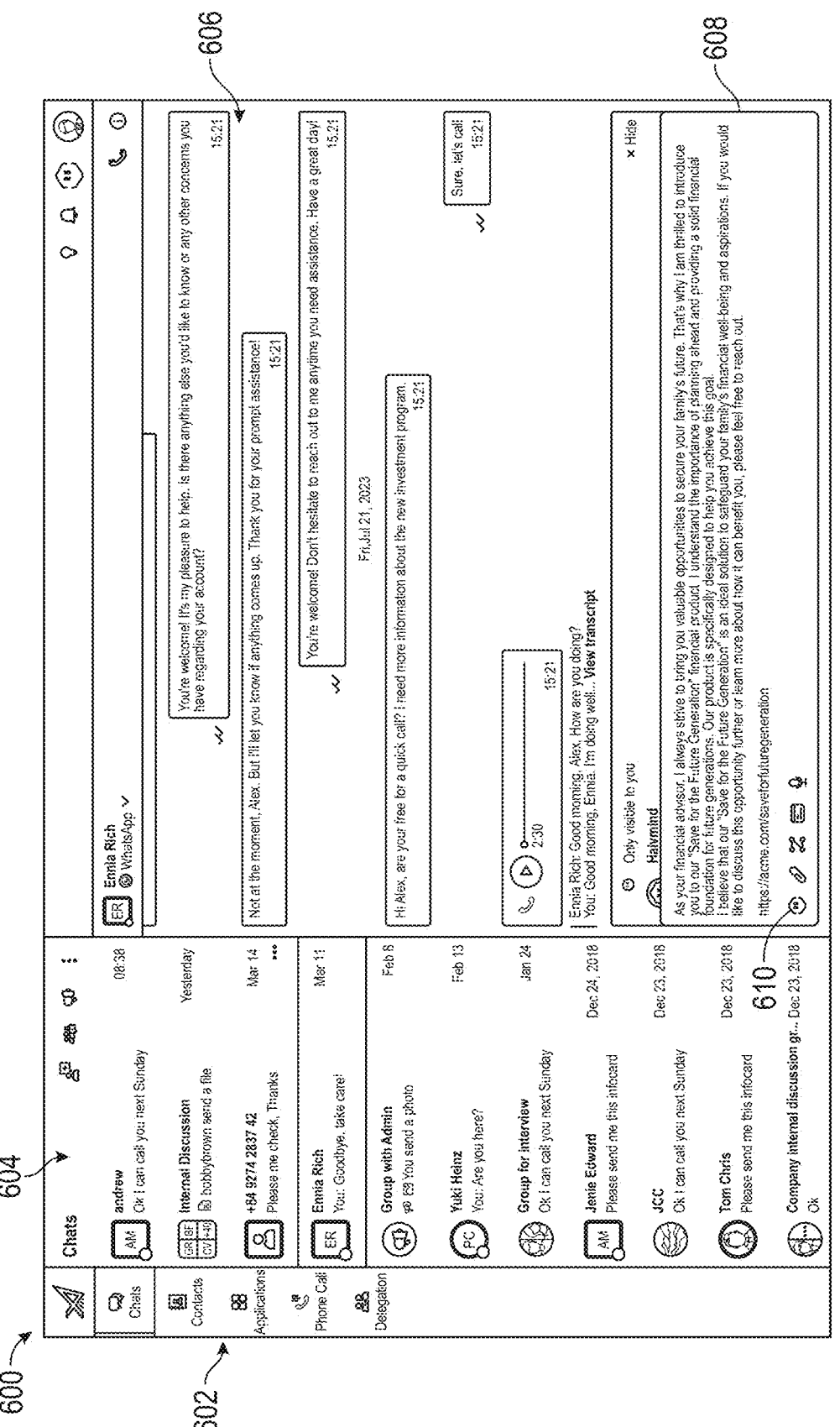

FIG. 6 illustrates exemplary graphical user interface 600, in accordance with some embodiments. As illustrated, the graphical user interface 600 is a graphical user interface of a chat application, and the graphical user interface 600 comprises a first group 602 of graphical user interface objects, a second group 604 of graphical user interface objects, a chat window 606, graphical user interface object 608, and a graphical user interface object 610.

It should be appreciated that the graphical user interface 600 leverages features and advantages described with respect to graphical user interface 300. For example, the first group 602 of graphical user interface objects may correspond to the first group 302 of graphical user interface objects, the second group 604 of graphical user interface objects may correspond to the second group 304 of graphical user interface objects, the chat window 606 may correspond to the chat window 306, and the graphical user interface object 610 may correspond to the graphical user interface object 310.

In some embodiments, the graphical user interface object 608 comprises a suggested message. For example, the graphical user interface object 608 is displayed in response to a selection of "Yes" on the graphical user interface object 508. After the selection of "Yes," the response composition task may be identified, and the analysis task may be executed using embeddings associated with the positive product reception and anniversary date, as described with respect to FIGS. 1 and 2. The internal user may review the suggested message on graphical user interface object 608 and confirm the suggested message before sending the suggested message to the external user. In some embodiments, the internal user may edit the suggested message before sending the message to the external user.

Figure 7:
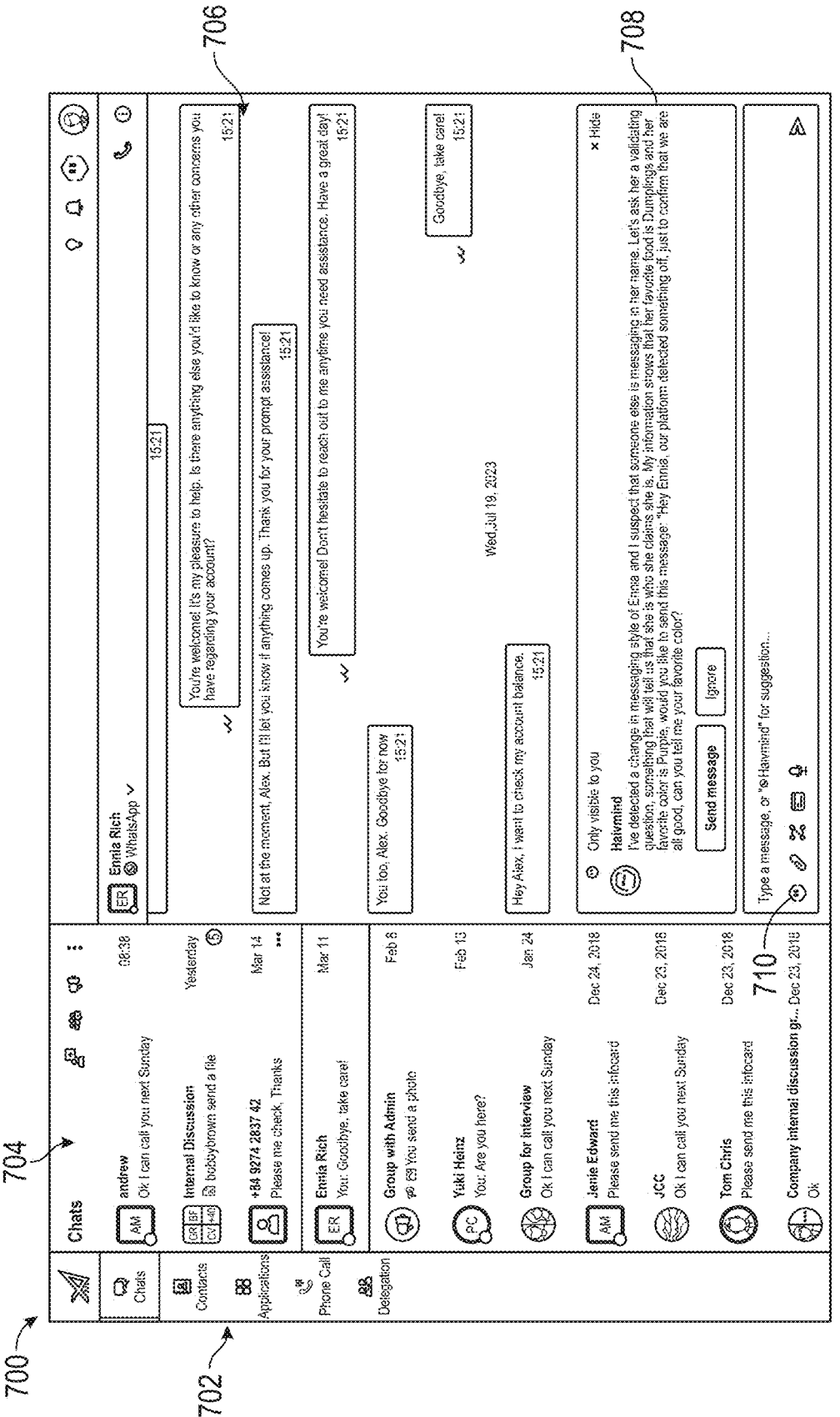

FIG. 7 illustrates exemplary graphical user interface 700, in accordance with some embodiments. As illustrated, the graphical user interface 700 is a graphical user interface of a chat application, and the graphical user interface 700 comprises a first group 702 of graphical user interface objects, a second group 704 of graphical user interface objects, a chat window 706, graphical user interface object 708, and a graphical user interface object 710.

It should be appreciated that the graphical user interface 700 leverages features and advantages described with respect to graphical user interface 300. For example, the first group 702 of graphical user interface objects may correspond to the first group 302 of graphical user interface objects, the second group 704 of graphical user interface objects may correspond to the second group 304 of graphical user interface objects, the chat window 706 may correspond to the chat window 306, and the graphical user interface object 710 may correspond to the graphical user interface object 310.

In some embodiments, the graphical user interface object 708 comprises a suggestion for authorship analysis. The authorship analysis may be suggested by the framework based on embeddings associated with the external user. For example, as illustrated, because embeddings accessible to the internal user comprise information about Ennia's favorite food and favorite color, the graphical user interface object 708 comprises a suggestion to ask for Ennia's favorite color to confirm the author of the message for checking account balance. After selection of "Send message," the suggested question is sent to the external user. An example of the suggested question is described with respect to FIG. 8.

As explained above, the embeddings used for suggesting authorship analysis and/or executing the authorship analysis depend on the internal user of the graphical user interface 700. That is, the internal user may be required to follow data access policies and/or access control requirements, and these policies and requirements are defined via ethical walls. The ethical walls associated with the internal user may prevent some embeddings to be used for generating the prompt shortcuts and/or executing the analysis task. In this example, because information about Ennia's favorite food and favorite color is accessible to the internal user, the suggested question may be generated and sent based on this information. In some embodiments, the internal user may edit the suggested question before sending the question to the external user.

In some embodiments, the suggestion for authorship analysis is presented automatically. For example, if the application determines that the authorship of a message may be in question (e.g., based on context of the message, based on embeddings of the external user indicating that the user's message style that are accessible to the internal user) for a next action, then the graphical user interface object 708 is displayed in accordance with this determination. In some embodiments, the graphical user interface objects 708 is displayed in response to a selection of the graphical user interface object 710 (e.g., the internal user has doubt about authorship of a message and would like the application to suggest a question to confirm authorship).

Figure 8:
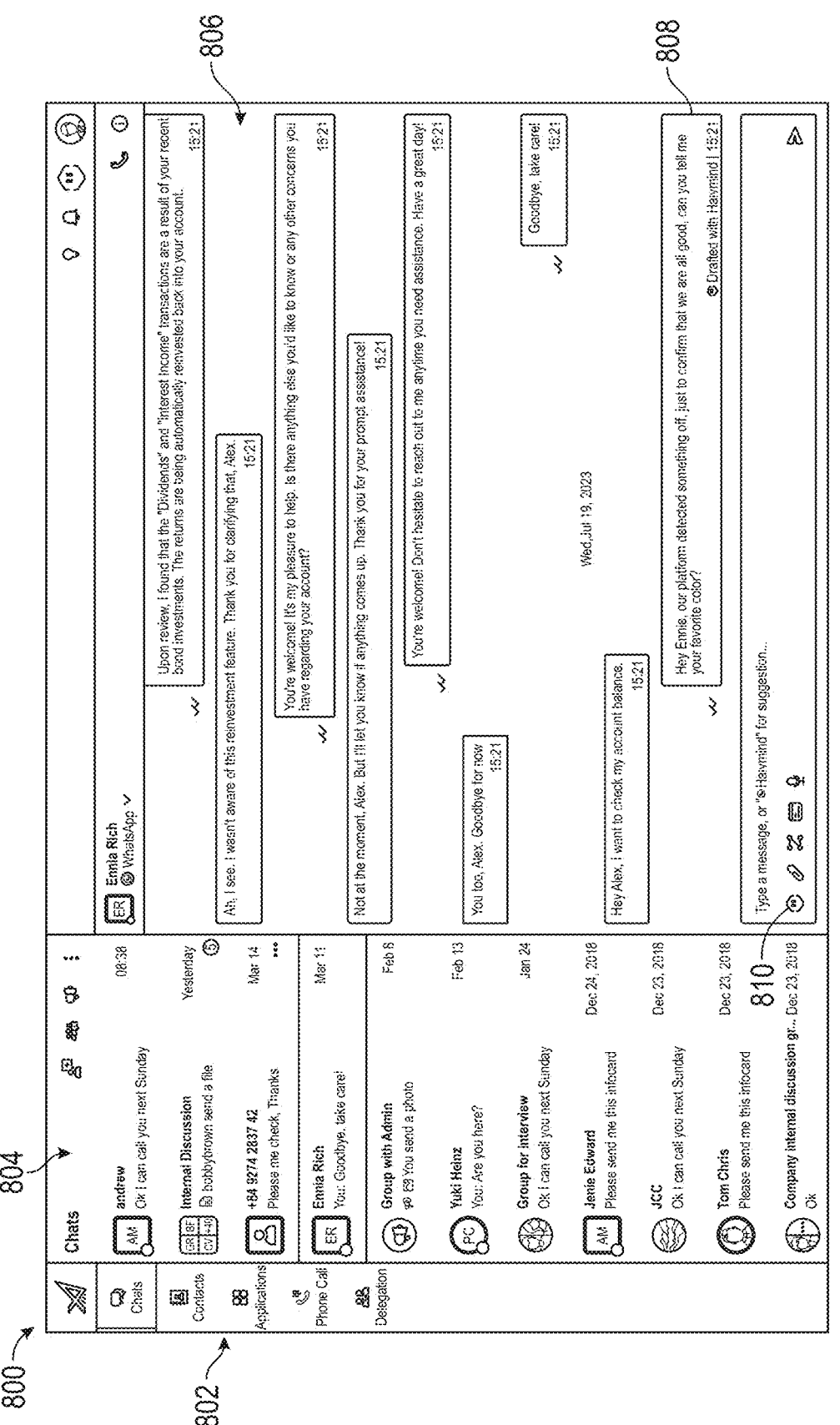

FIG. 8 illustrates exemplary graphical user interface 800, in accordance with some embodiments. As illustrated, the graphical user interface 800 is a graphical user interface of a chat application, and the graphical user interface 800 comprises a first group 802 of graphical user interface objects, a second group 804 of graphical user interface objects, a chat window 806, graphical user interface object 808, and a graphical user interface object 810.

It should be appreciated that the graphical user interface 800 leverages features and advantages described with respect to graphical user interface 300. For example, the first group 802 of graphical user interface objects may correspond to the first group 302 of graphical user interface objects, the second group 804 of graphical user interface objects may correspond to the second group 304 of graphical user interface objects, the chat window 806 may correspond to the chat window 306, and the graphical user interface object 810 may correspond to the graphical user interface object 310.

In some embodiments, the graphical user interface object 808 comprises a transmitted question for authorship analysis. For example, the graphical user interface object 808 is displayed in response to a selection of "Send message" on the graphical user interface object 708 and a transmission of the question suggested in graphical user interface object 708. As illustrated, in some embodiments, the graphical user interface object 808 comprises an indication (e.g., "Drafted with Haivmind") that the question is automatically generated.

The external user may respond to the question, and the application may analyze the answer to confirm authorship. For example, if Ennia answers purple, then an indication confirming authorship is displayed, and if Ennia does not answer purple, then an indication that Ennia is not the author is displayed.

Figure 9:
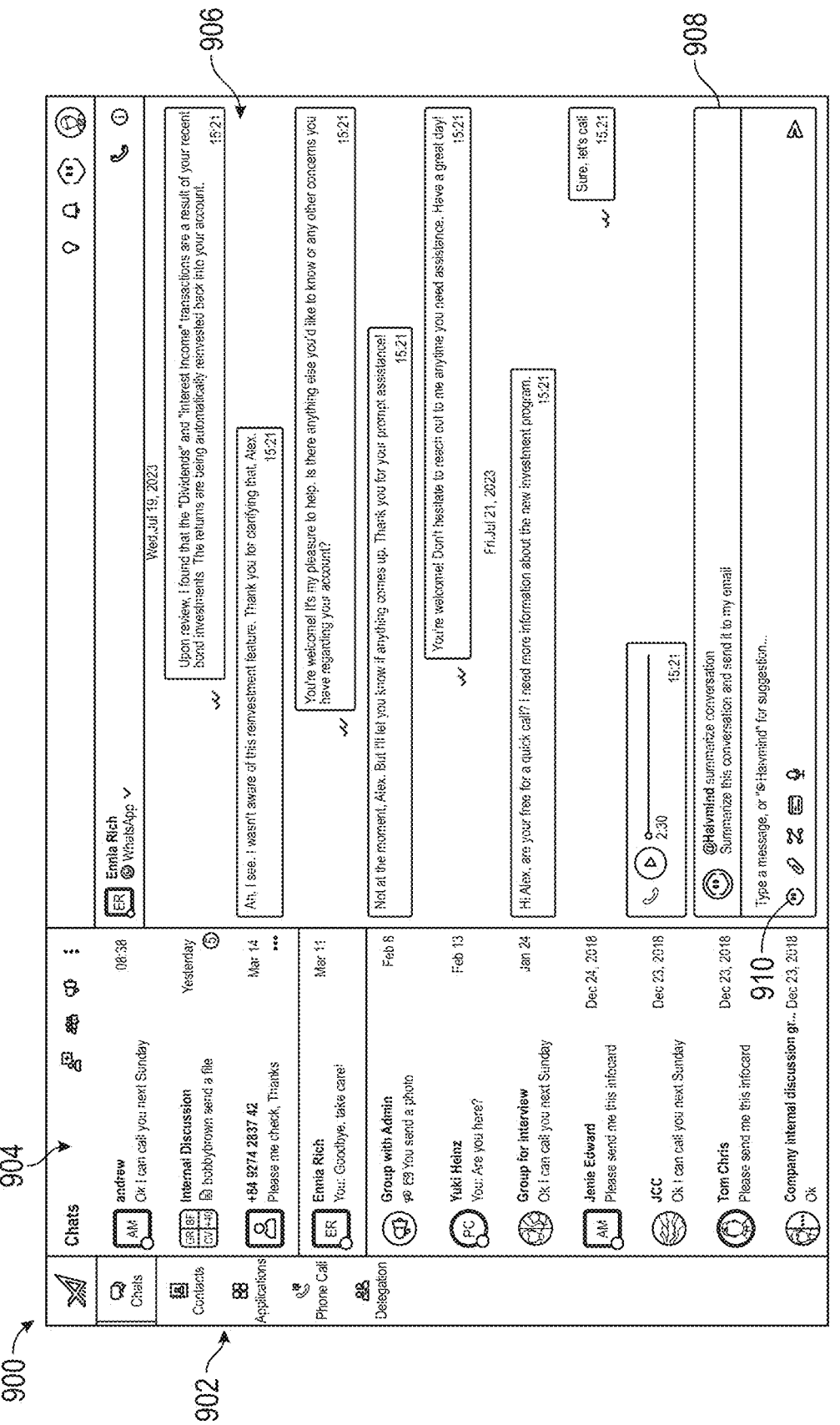

FIG. 9 illustrates exemplary graphical user interface 900, in accordance with some embodiments. As illustrated, the graphical user interface 900 is a graphical user interface of a chat application, and the graphical user interface 900 comprises a first group 902 of graphical user interface objects, a second group 904 of graphical user interface objects, a chat window 906, graphical user interface object 908, and a graphical user interface object 910.

It should be appreciated that the graphical user interface 900 leverages features and advantages described with respect to graphical user interface 300. For example, the first group 902 of graphical user interface objects may correspond to the first group 302 of graphical user interface objects, the second group 904 of graphical user interface objects may correspond to the second group 304 of graphical user interface objects, the chat window 906 may correspond to the chat window 306, and the graphical user interface object 910 may correspond to the graphical user interface object 310.

In some embodiments, the graphical user interface object 908 comprises a suggestion for summarizing the conversation. The conversation summary may be suggested by the framework based on enterprise information associated with the external user and/or internal user. For example, accessible embeddings include information indicating the external user is detail-oriented or information indicating that internal user prefers to summarize client conversations. After confirmation of the suggestion, the summarization task may be identified, and the analysis task may be executed as described with respect to FIGS. 1 and 2. In some embodiments, the graphical user interface objects 908 is displayed in response to a selection of the graphical user interface object 910.

As explained above, the embeddings used for suggesting a conversation summary and/or executing the analysis task depend on the internal user of the graphical user interface 900. That is, the internal user may be required to follow data access policies and/or access control requirements, and these policies and requirements are defined via ethical walls. The ethical walls associated with the internal user may prevent some embeddings to be used for generating the conversation summary and/or executing the analysis task.

Figure 10:
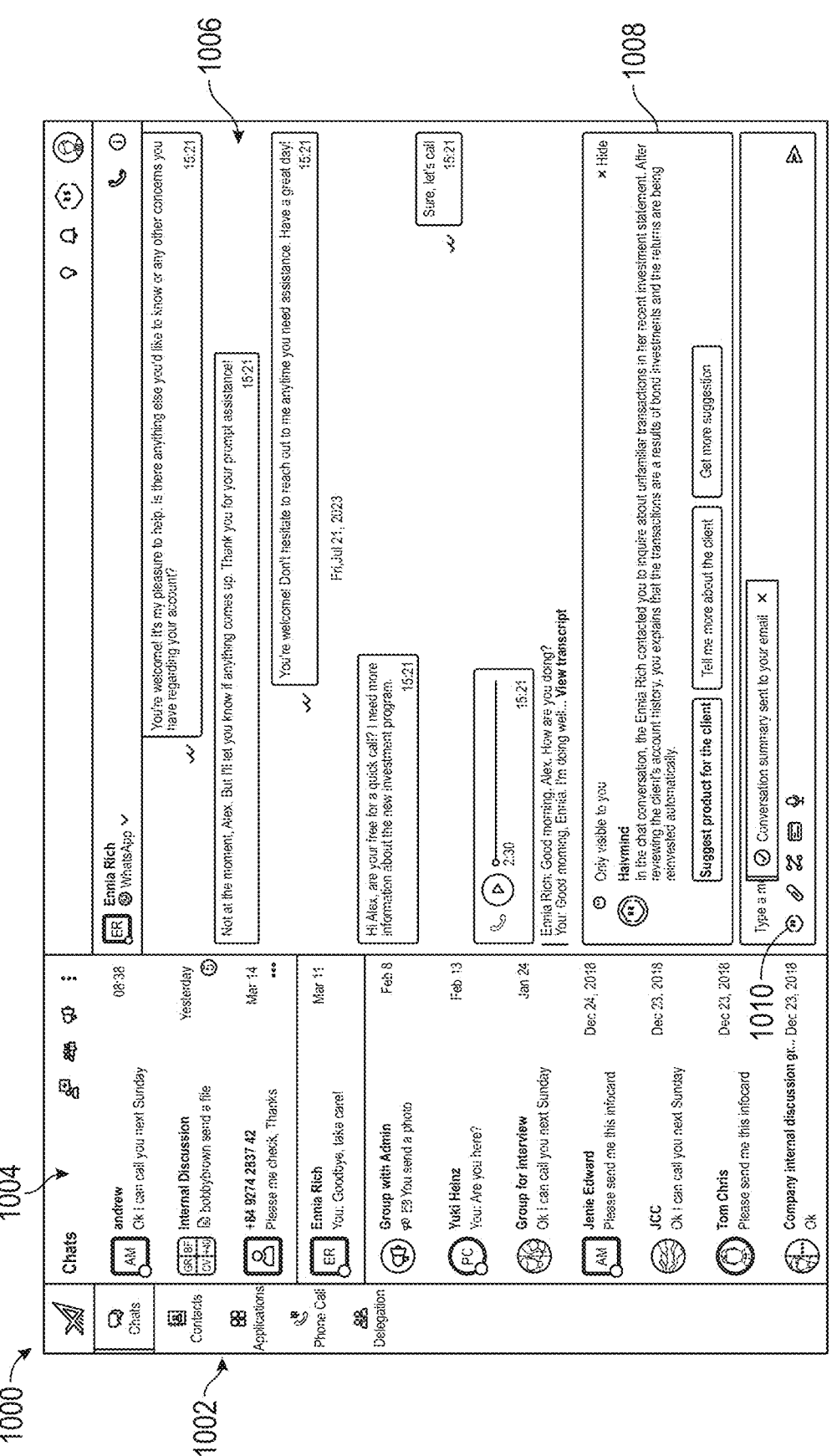

FIG. 10 illustrates exemplary graphical user interface 1000, in accordance with some embodiments. As illustrated, the graphical user interface 1000 is a graphical user interface of a chat application, and the graphical user interface 1000 comprises a first group 1002 of graphical user interface objects, a second group 1004 of graphical user interface objects, a chat window 1006, a third group 1008 of graphical user interface objects, and a graphical user interface object 1010.

It should be appreciated that the graphical user interface 1000 leverages features and advantages described with respect to graphical user interface 300. For example, the first group 1002 of graphical user interface objects may correspond to the first group 302 of graphical user interface objects, the second group 1004 of graphical user interface objects may correspond to the second group 304 of graphical user interface objects, the chat window 1006 may correspond to the chat window 306, and the graphical user interface object 1010 may correspond to the graphical user interface object 310.

In some embodiments, the graphical user interface object 1008 comprises suggested next actions. The next actions may be suggested by the framework based on enterprise information associated with the external user. For example, as illustrated, the suggestions are displayed based on previous conversations with Ennia (information of which may be stored in embeddings associated with messages with Ennia). In this example, because the previous conversations are related to investments, the suggestions include suggesting a product for the client (e.g., produce recommendation for the external user), receiving more information about the client (e.g., an analysis of an external user), and getting more suggestions. After selection of a suggested option, the corresponding analysis task may be identified, and the analysis task may be executed as described with respect to FIGS. 1 and 2. An example of the graphical user interface after selection of the product suggestion is described with respect to FIG. 11.

As explained above, the embeddings used for generating the suggested next actions and/or executing the analysis task depend on the internal user of the graphical user interface 1000. That is, the internal user may be required to follow data access policies and/or access control requirements, and these policies and requirements are defined via ethical walls. The ethical walls associated with the internal user may prevent some embeddings to be used for generating the suggested next action and/or executing the analysis task. In this example, the suggested product for Ennia may be determined based on only embeddings that the internal user can access. That is, the suggested product for Ennia cannot be determined using information that the internal user cannot access due to an ethical wall.

In some embodiments, the suggested next actions are presented automatically. For example, if the application determines that the internal user may desire a suggestion (e.g., based on context of the conversation, based on embeddings of the external user indicating that the user has a particular preference, based on the internal user's preference) for a next action, then the graphical user interface object 1008 is displayed in accordance with this determination. In some embodiments, the graphical user interface objects 1008 is displayed in response to a selection of the graphical user interface object 1010.

Figure 11:
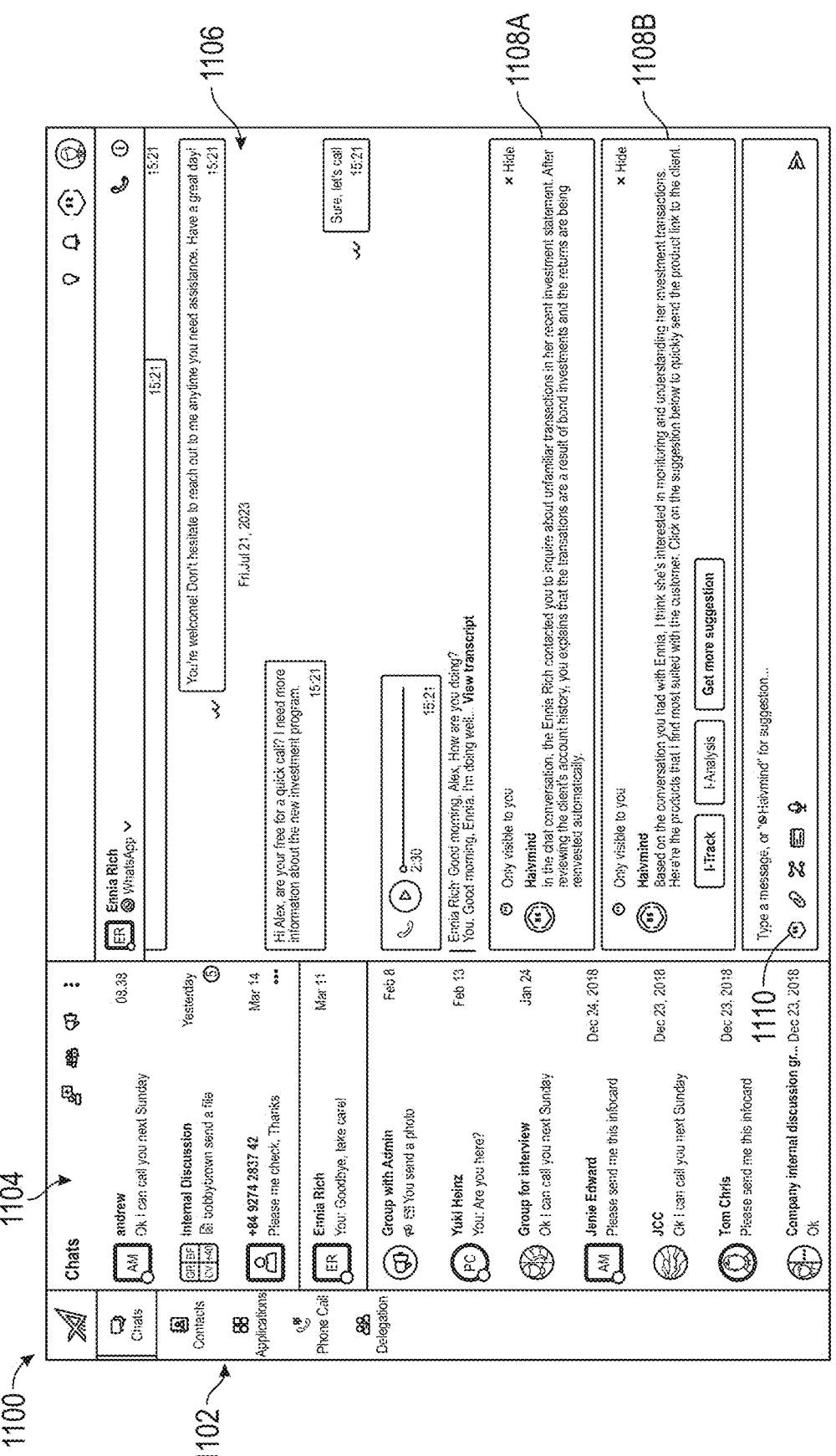

FIG. 11 illustrates exemplary graphical user interface 1100, in accordance with some embodiments. As illustrated, the graphical user interface 1100 is a graphical user interface of a chat application, and the graphical user interface 1100 comprises a first group 1102 of graphical user interface objects, a second group 1104 of graphical user interface objects, a chat window 1106, graphical user interface objects 1108A and 1108B, and a graphical user interface object 1110.

It should be appreciated that the graphical user interface 1100 leverages features and advantages described with respect to graphical user interface 300. For example, the first group 1102 of graphical user interface objects may correspond to the first group 302 of graphical user interface objects, the second group 1104 of graphical user interface objects may correspond to the second group 304 of graphical user interface objects, the chat window 1106 may correspond to the chat window 306, and the graphical user interface object 1110 may correspond to the graphical user interface object 310.

In some embodiments, graphical user interface object 1108A correspond to graphical user interface object 1008, and graphical user interface object 1108B is presented in response to selection of product suggestion on user interface object 1008. In this example, after selection of product selection, the product recommendation task is identified, and the analysis task may be executed using embeddings associated with the external user, as described with respect to FIGS. 1 and 2. As illustrated, the graphical user interface object 1108B may include one or more suggested product (e.g., i-Track, i-Analysis) that are determined based on accessible embeddings and an option for more suggestions. A selection of a suggested product would cause a product information (e.g., link) to be transmitted to the external user via the chat window 1106.

Figure 12:
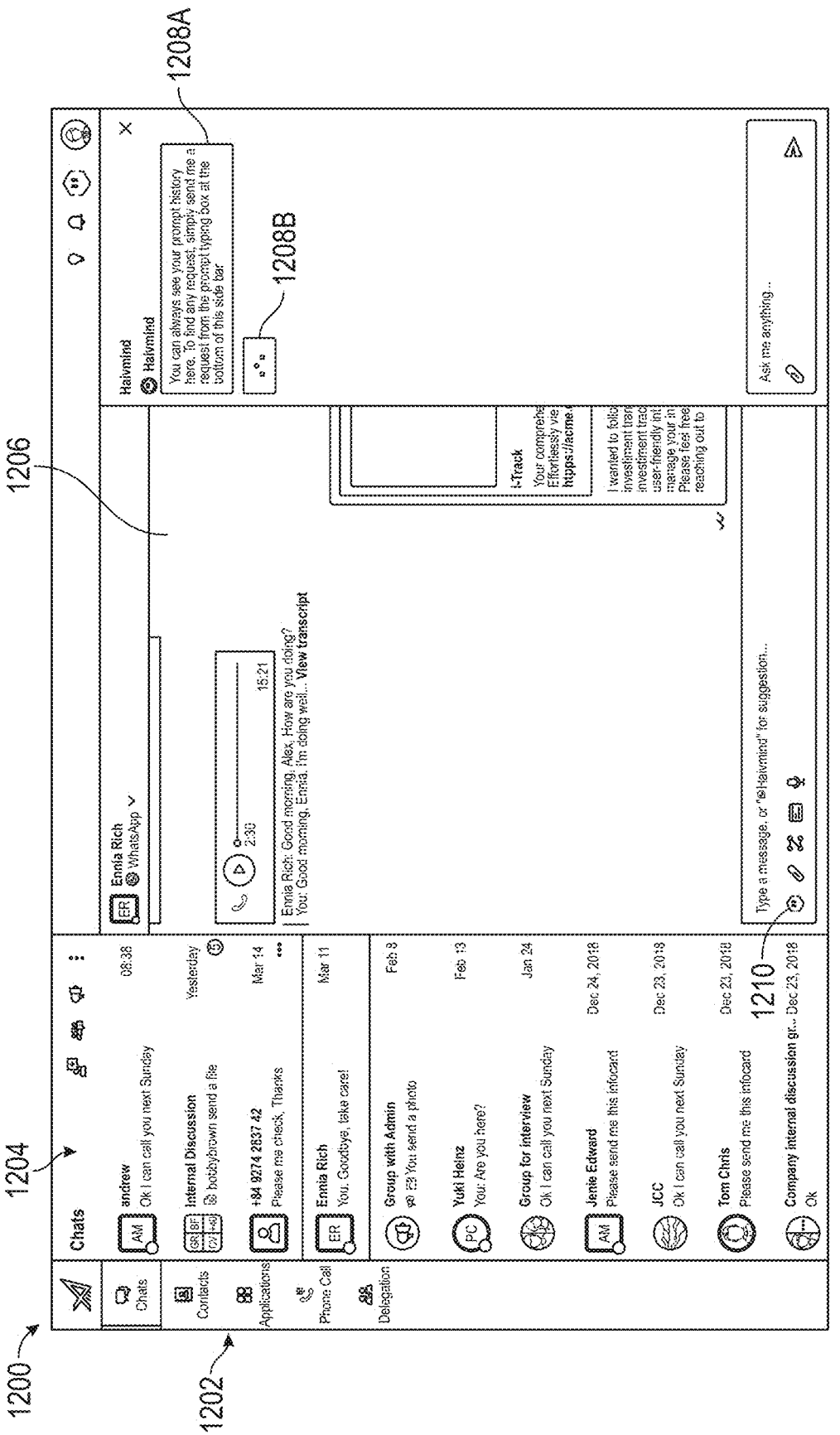

FIG. 12 illustrates exemplary graphical user interface 1200, in accordance with some embodiments. As illustrated, the graphical user interface 1200 is a graphical user interface of a chat application, and the graphical user interface 1200 comprises a first group 1202 of graphical user interface objects, a second group 1204 of graphical user interface objects, a chat window 1206, graphical user interface objects 1208A and 1208B, and a graphical user interface object 1210.

It should be appreciated that the graphical user interface 1200 leverages features and advantages described with respect to graphical user interface 300. For example, the first group 1202 of graphical user interface objects may correspond to the first group 302 of graphical user interface objects, the second group 1204 of graphical user interface objects may correspond to the second group 304 of graphical user interface objects, the chat window 1206 may correspond to the chat window 306, and the graphical user interface object 1210 may correspond to the graphical user interface object 310.

In some embodiment, the graphical user interface objects 1208A and 1208B are part of a pop-up sidebar displayed on top of the chat window 1206. In some embodiments, the sidebar is displayed in response to an input from the internal user (e.g., by selecting "hide" on objects 508, 608, 708, 1008, 1108B). In this example, the sidebar allows the user to communicate with the Haivmind software via messaging. The graphical user interface object 1208A may be a comment or a tip from the Haivmind software. For instance, it reminds the user that prompt history may been seen on this sidebar and a message to the Haivmind software (e.g., a request to execute an analysis task, a statement to provide feedback) may be provided to the Haivmind software via the sidebar (e.g., by inputting the request at the bottom of the sidebar). The graphical user interface object 1208B may be displayed to show a typing animation while a message from the Haivmind software is being composed, giving the internal user a feeling that he or she is chatting with a human.

Figure 13:
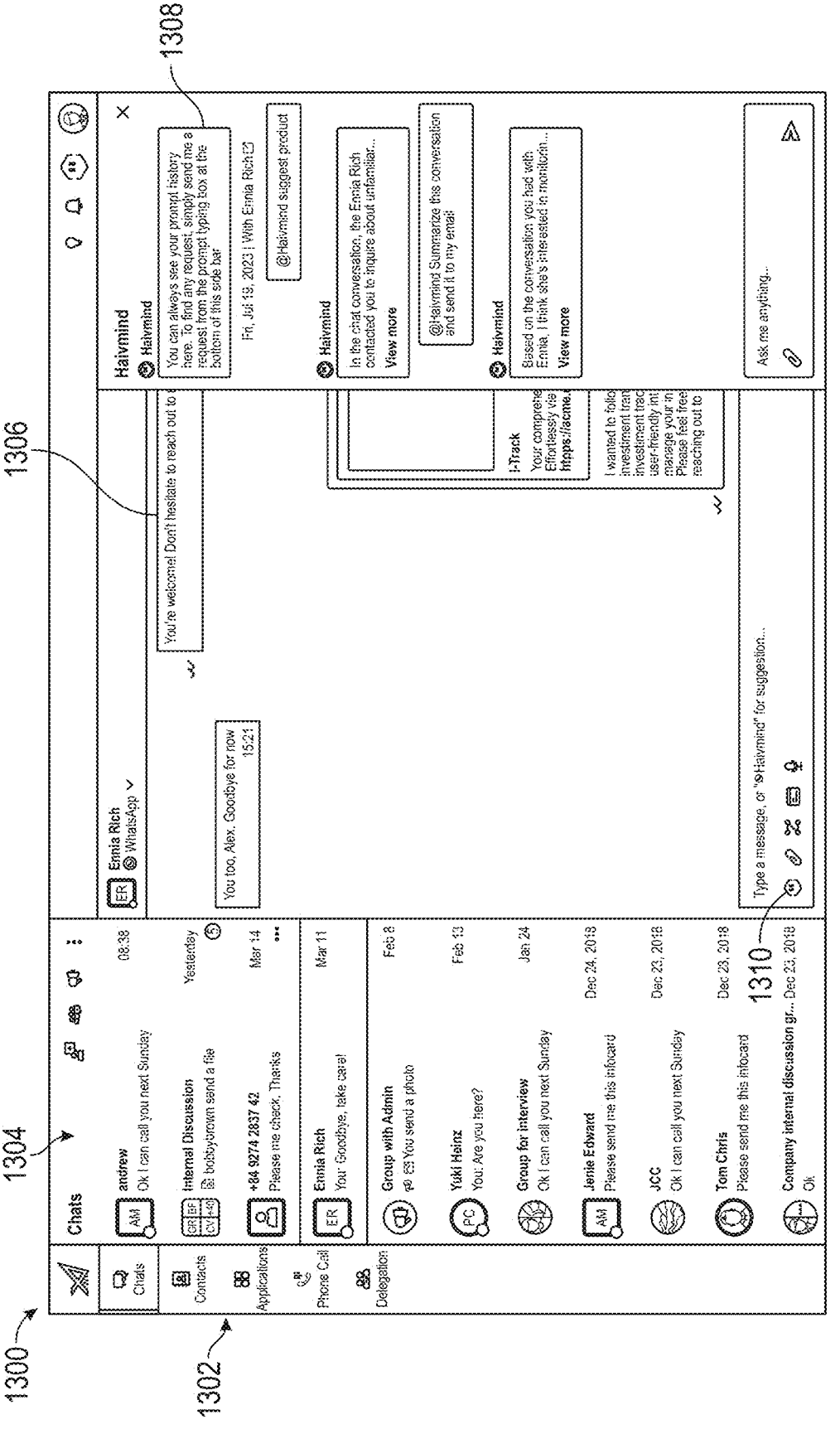

FIG. 13 illustrates exemplary graphical user interface 1300, in accordance with some embodiments. As illustrated, the graphical user interface 1300 is a graphical user interface of a chat application, and the graphical user interface 1300 comprises a first group 1302 of graphical user interface objects, a second group 1304 of graphical user interface objects, a chat window 1306, graphical user interface object 1308, and a graphical user interface object 1310.

It should be appreciated that the graphical user interface 1300 leverages features and advantages described with respect to graphical user interface 300. For example, the first group 1302 of graphical user interface objects may correspond to the first group 302 of graphical user interface objects, the second group 1304 of graphical user interface objects may correspond to the second group 304 of graphical user interface objects, the chat window 1306 may correspond to the chat window 306, and the graphical user interface object 1310 may correspond to the graphical user interface object 310.

In some embodiments, the graphical user interface object 1308 is a sidebar, and this sidebar may correspond to the sidebar of graphical user interface 1200. As illustrated, the sidebar is updated to include prompt history, which comprises history of the internal user's interactions with the Haivmind software. The prompt history may be displayed a threshold amount of time (e.g., 1 second) after displaying of the sidebar on graphical user interface 1200. The messages to the left of the sidebar may be past suggestions by the Haivmind software, and the messages to the right of the sidebar may be past task requests by the internal user. Examples of these messages are described with respect to the user interfaces described above.

Figure 14:
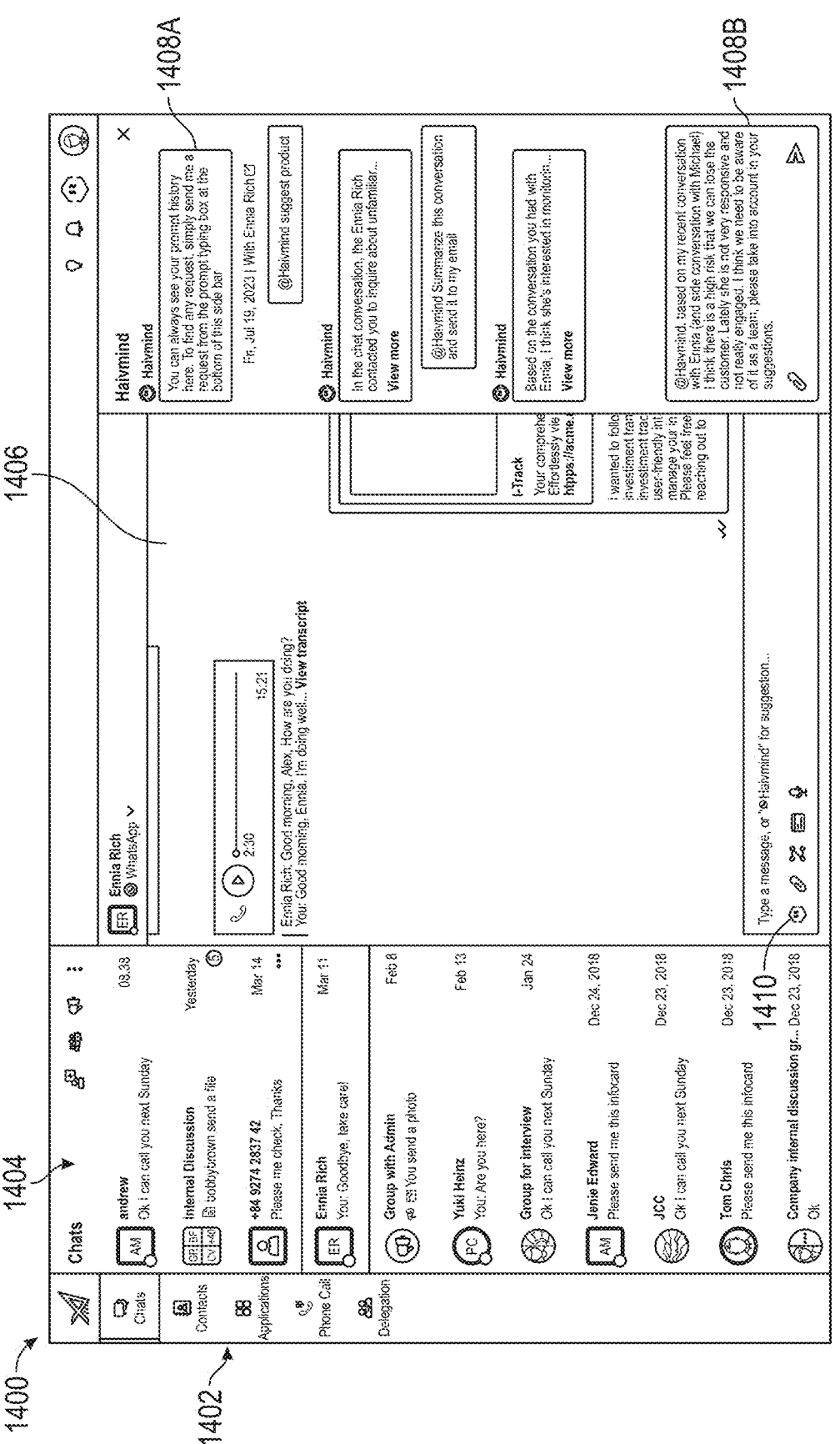

FIG. 14 illustrates exemplary graphical user interface 1400, in accordance with some embodiments. As illustrated, the graphical user interface 1400 is a graphical user interface of a chat application, and the graphical user interface 1400 comprises a first group 1402 of graphical user interface objects, a second group 1404 of graphical user interface objects, a chat window 1406, graphical user interface objects 1408A and 1408B, and a graphical user interface object 1410.

It should be appreciated that the graphical user interface 1400 leverages features and advantages described with respect to graphical user interface 300. For example, the first group 1402 of graphical user interface objects may correspond to the first group 302 of graphical user interface objects, the second group 1404 of graphical user interface objects may correspond to the second group 304 of graphical user interface objects, the chat window 1406 may correspond to the chat window 306, and the graphical user interface object 1410 may correspond to the graphical user interface object 310.

In some embodiments, the graphical user interface objects 1408A and 1408B are part of a sidebar, and this sidebar may correspond to the sidebar of graphical user interfaces 1200 and 1300. As illustrated, the sidebar includes the prompt history from graphical user interface 1300. The graphical user interface object 1408B is configured to receive a message from the internal user to the Haivmind software. The message may comprise a task request or a suggestion for feedback for the application. For example, as illustrated, the internal user provides a message in graphical user interface object 1408B to provide feedback on the external user, and this information is received by the framework. As described with respect to method 100 and feedback loop 218 of architecture 200, the information is converted to embeddings, and the embeddings may be used to improve quality of future task outputs. In this example, after the user's statement is received, the risk of losing Ennia as a customer will be considered (e.g., via associated embeddings) for future tasks, providing this information is accessible to the task requestor.

Figure 15:
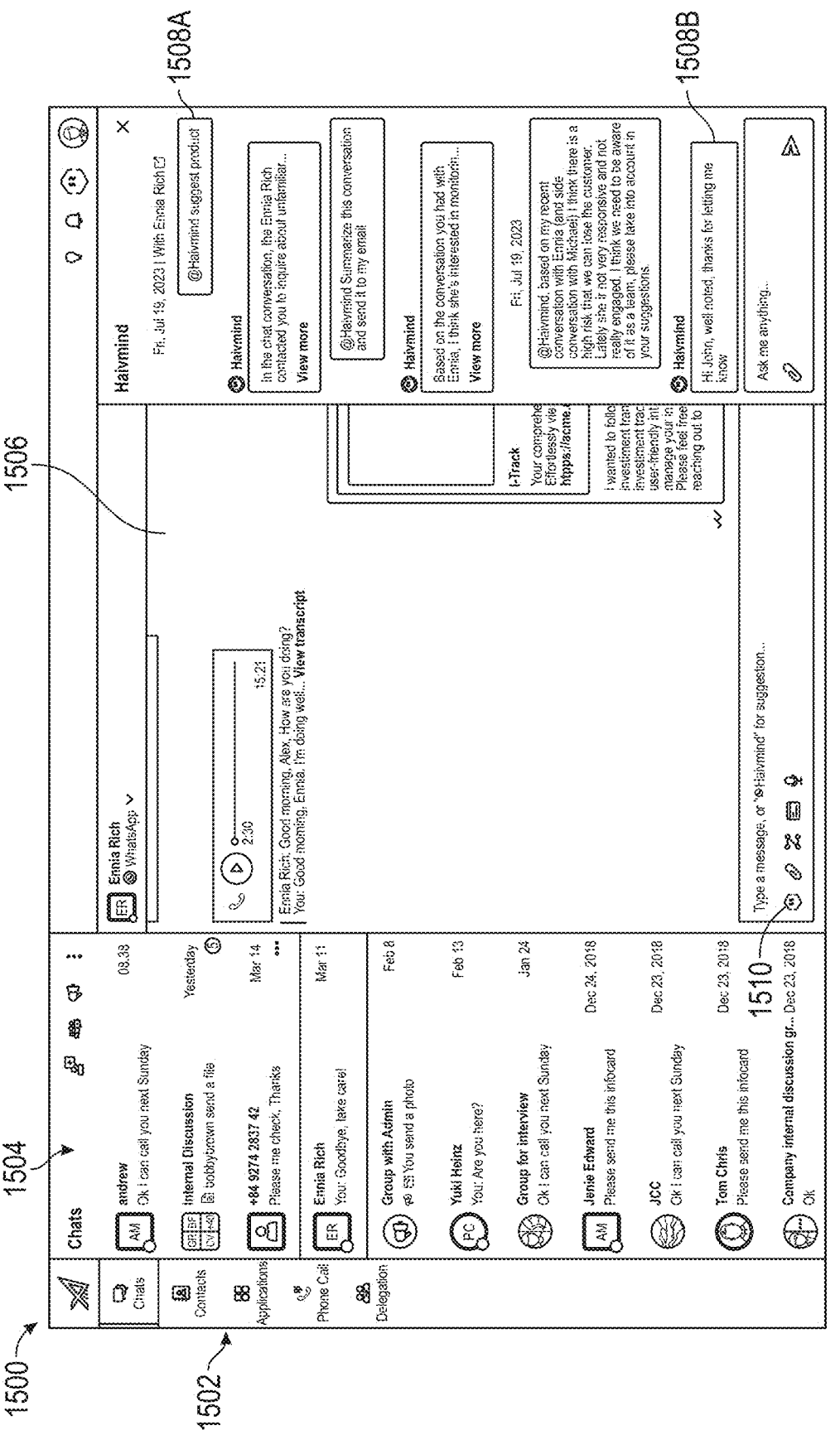

FIG. 15 illustrates exemplary graphical user interface 1500, in accordance with some embodiments. As illustrated, the graphical user interface 1500 is a graphical user interface of a chat application, and the graphical user interface 1500 comprises a first group 1502 of graphical user interface objects, a second group 1504 of graphical user interface objects, a chat window 1506, graphical user interface objects 1508A and 1508B, and a graphical user interface object 1510.

It should be appreciated that the graphical user interface 1500 leverages features and advantages described with respect to graphical user interface 300. For example, the first group 1502 of graphical user interface objects may correspond to the first group 302 of graphical user interface objects, the second group 1504 of graphical user interface objects may correspond to the second group 304 of graphical user interface objects, the chat window 1506 may correspond to the chat window 306, and the graphical user interface object 1510 may correspond to the graphical user interface object 310.

In some embodiments, the graphical user interface objects 1508A and 1508B are part of a sidebar, and this sidebar may correspond to the sidebar of graphical user interfaces 1200-1400. As illustrated, the sidebar includes the prompt history from graphical user interface 1400 after the framework receives the internal user's message about risk of losing Ennia as a customer. The graphical user interface object 1508B comprises a message from the Haivmind software confirming that the statement is received and will be considered by the framework in the future.

Figure 16:
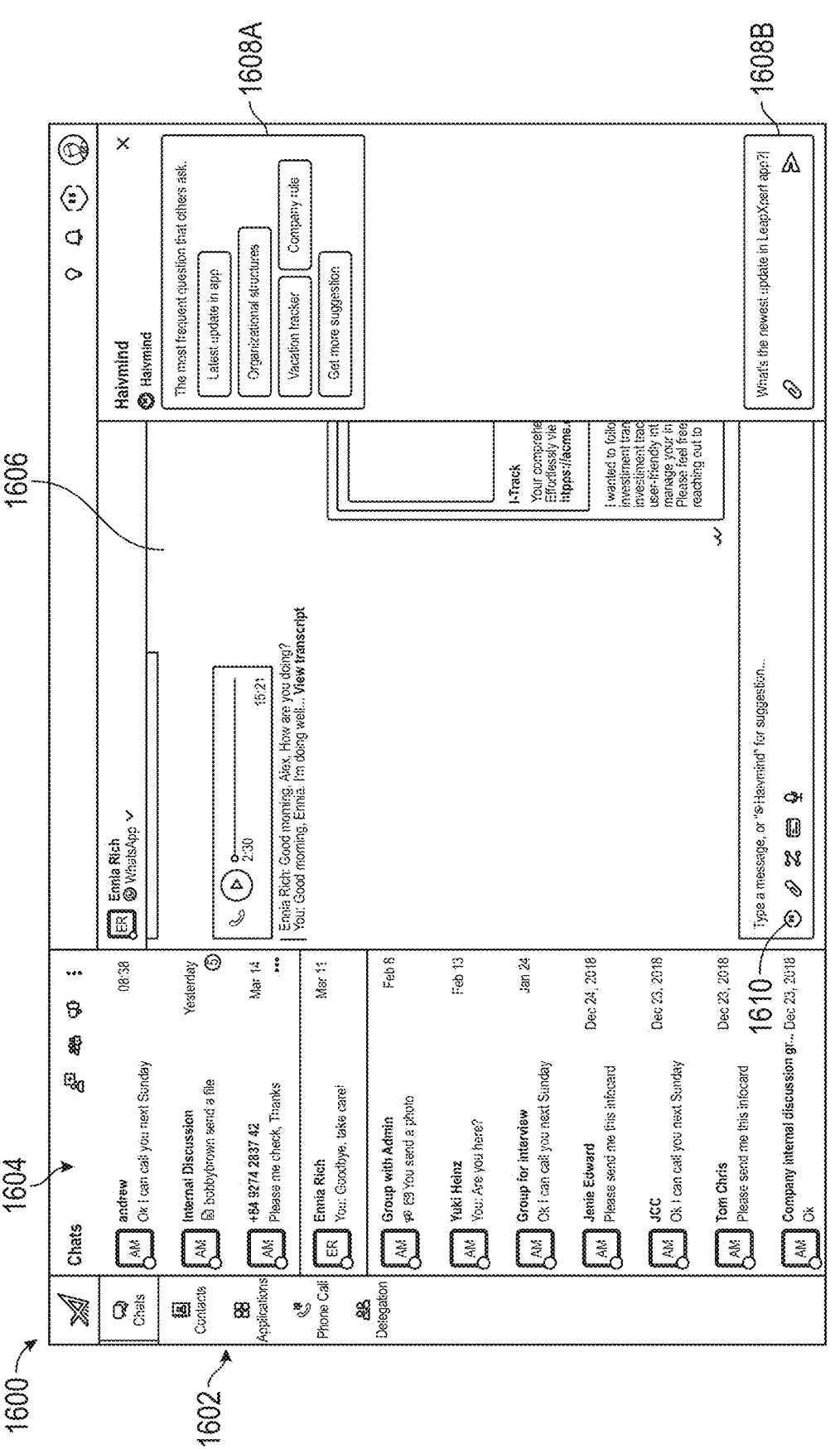

FIG. 16 illustrates exemplary graphical user interface 1600, in accordance with some embodiments. As illustrated, the graphical user interface 1600 is a graphical user interface of a chat application, and the graphical user interface 1600 comprises a first group 1602 of graphical user interface objects, a second group 1604 of graphical user interface objects, a chat window 1606, graphical user interface objects 1608A and 1608B, and a graphical user interface object 1610.

It should be appreciated that the graphical user interface 1600 leverages features and advantages described with respect to graphical user interface 300. For example, the first group 1602 of graphical user interface objects may correspond to the first group 302 of graphical user interface objects, the second group 1604 of graphical user interface objects may correspond to the second group 304 of graphical user interface objects, the chat window 1606 may correspond to the chat window 306, and the graphical user interface object 1610 may correspond to the graphical user interface object 310.

In some embodiment, the graphical user interface objects 1608A and 1608B are part of a pop-up sidebar displayed on top of the chat window 1606. In some embodiments, the sidebar is displayed in response to an input from the internal user (e.g., by selecting "hide" on objects 508, 608, 708, 1008, 1108B). In this example, the sidebar allows the user to communicate with the Haivmind software via messaging. The graphical user interface object 1608A may comprise frequent questions other internal users ask the Haivmind software. This list of frequent questions may be generated based on embeddings associated with internal users that are accessible to the internal user currently interacting with graphical user interface 1600. Selection of one of the frequent questions would cause the Haivmind software to send a message to the sidebar that comprises the answer to the selected question. The graphical user interface object 1608B is configured to receive a message (e.g., a query of the internal user) from the internal user to the Haivmind software. As illustrated in the example, in lieu of asking the frequent questions, the internal user inputs a question about the latest update for an application. After the internal user submits the question to the Haivmind software, the software is configured to respond to the question, as illustrated in the example of FIG. 17.

Figure 17:
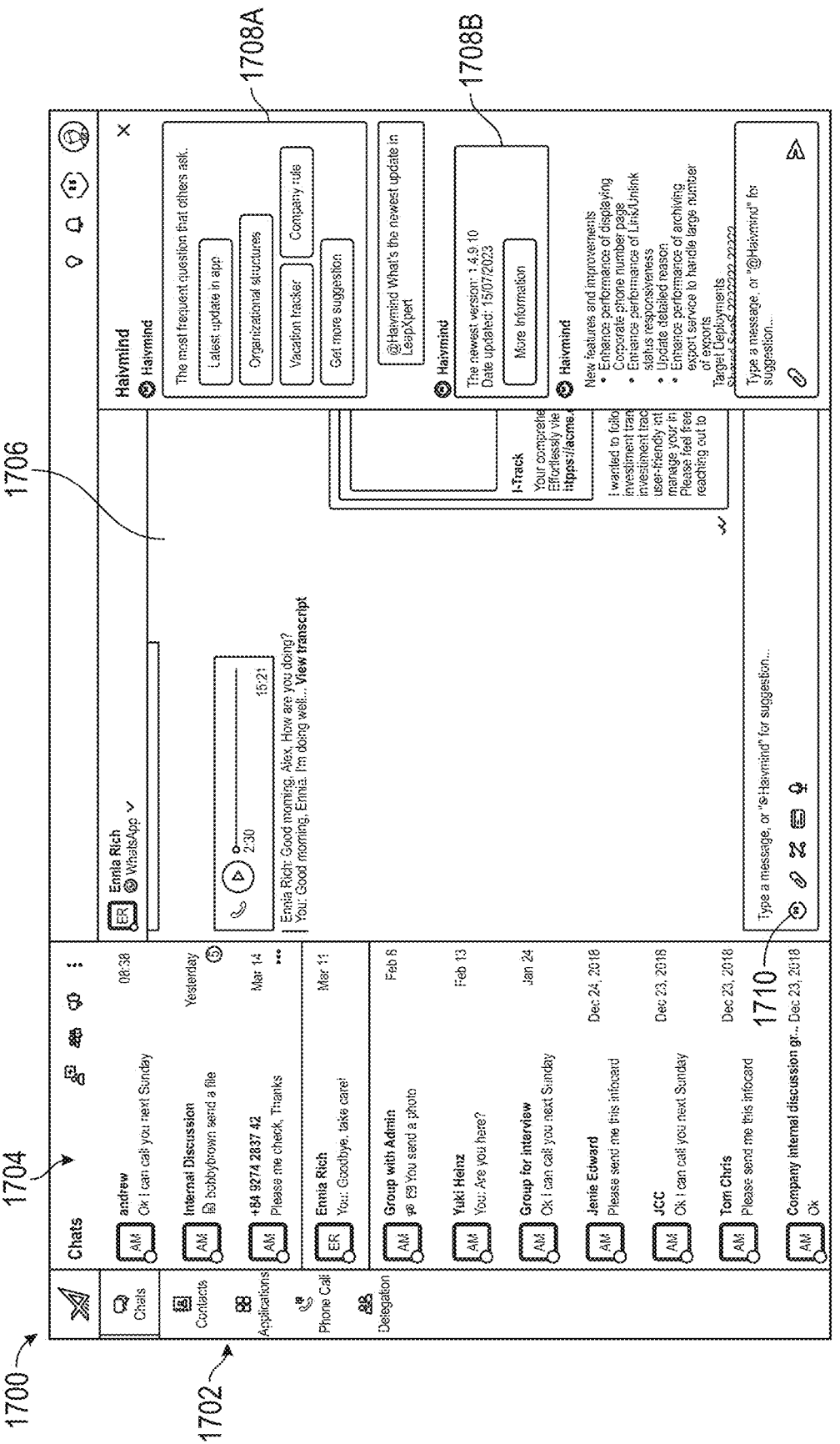

FIG. 17 illustrates exemplary graphical user interface 1700, in accordance with some embodiments. As illustrated, the graphical user interface 1700 is a graphical user interface of a chat application, and the graphical user interface 1700 comprises a first group 1702 of graphical user interface objects, a second group 1704 of graphical user interface objects, a chat window 1706, graphical user interface objects 1708A and 1708B, and a graphical user interface object 1710.

It should be appreciated that the graphical user interface 1700 leverages features and advantages described with respect to graphical user interface 300. For example, the first group 1702 of graphical user interface objects may correspond to the first group 302 of graphical user interface objects, the second group 1704 of graphical user interface objects may correspond to the second group 304 of graphical user interface objects, the chat window 1706 may correspond to the chat window 306, and the graphical user interface object 1710 may correspond to the graphical user interface object 310.

In some embodiment, the graphical user interface objects 1708A and 1708B are part of a pop-up sidebar displayed on top of the chat window 1706. In some embodiments, the sidebar is displayed in response to an input from the internal user (e.g., by selecting "hide" on objects 508, 608, 708, 1008, 1108B). In this example, the sidebar the conversation history between the internal user and the Haivmind software from graphical user interface 1600. The sidebar additionally includes responses to the question from graphical user interface 1600.

After the internal user submits the question to the Haivmind software, the query of the internal user analysis task is identified, and the analysis task may be executed using embeddings accessible to the internal user, as described with respect to FIGS. 1 and 2. The output of the query comprises these responses, and these responses are determined only based on information that is accessible to the internal user. If the internal user is not allowed to access confidential information about the application, then the response to the internal user's question would not be generated based on embeddings associated with this confidential information.

Figure 18:
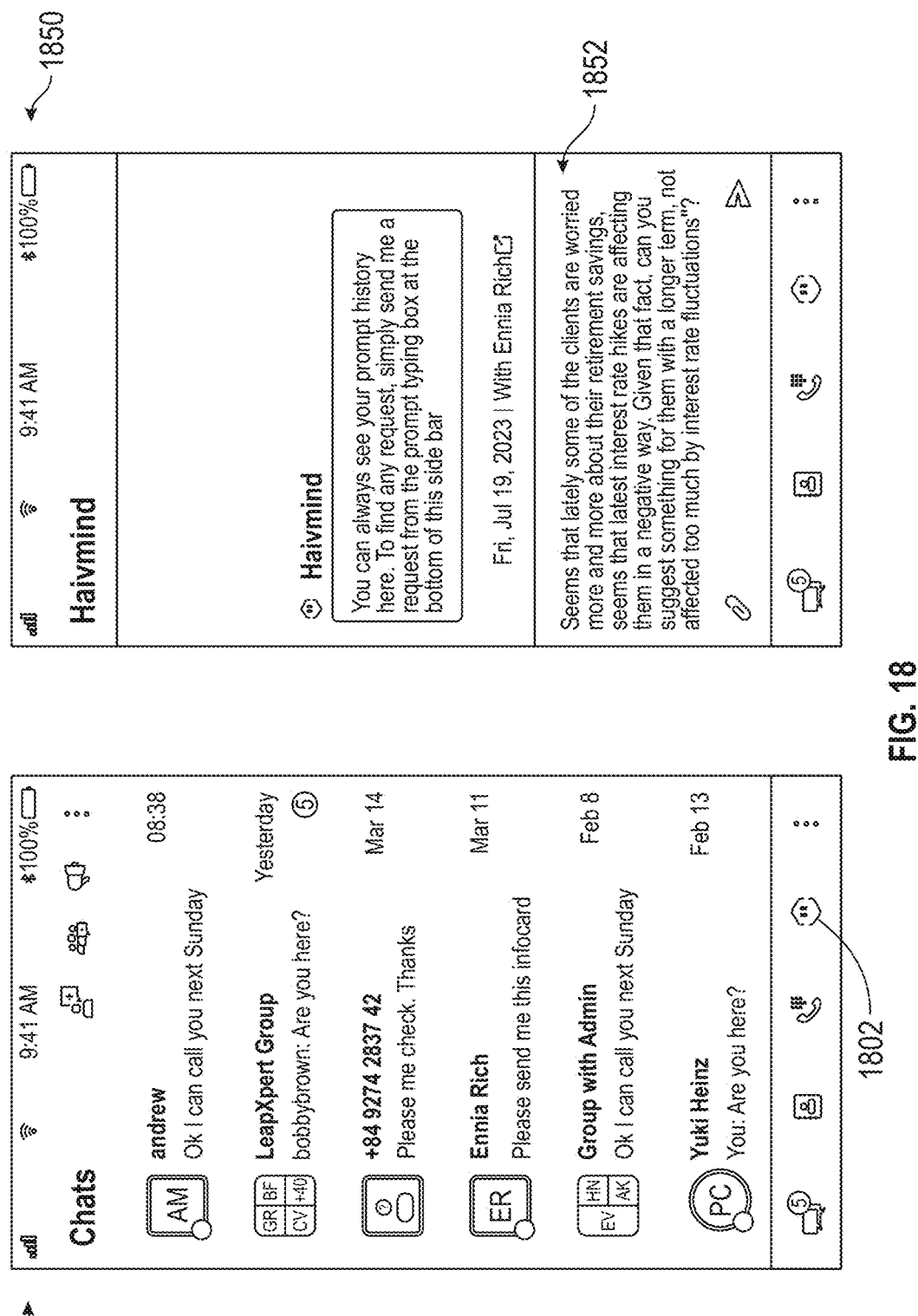

FIG. 18 illustrates exemplary graphical user interfaces 1800 and 1850, in accordance with some embodiments. The graphical user interfaces 1800 and 1850 may be user interfaces of a mobile device using the application (e.g., as described with respect to the above graphical user interfaces). As illustrated, the graphical user interface 1800 comprises a plurality of graphical user interface objects that are each associated with a chat with an external user. The graphical user interface 1800 may correspond to group 304 of graphical user interface objects. It should be appreciated that the graphical user interface 1800 leverages features and advantages described with respect to graphical user interface 300.

In some embodiments, the graphical user interface 1800 comprises a graphical user interface object 1802. In response to selection of the graphical user interface object 1802, graphical user interface 1850 is displayed. The graphical user interface 1850 may correspond to the pop-up sidebar described with respect to FIGS. 12-17. For example, the graphical user interface object 1852 is configured to receive a message from the internal user to the Haivmind software. In this example, the message comprises statements (e.g., clients are worried about retirement savings, interest rate hikes have a negative effect) and a request for a suggestion (e.g., a request for a long-term suggestion based on the statements) for clients. As described with respect to feedback loops, the statements may be constructed as embeddings, and the embeddings (and other accessible embeddings) may be used by the framework to execute this suggestion task.

Figure 19:
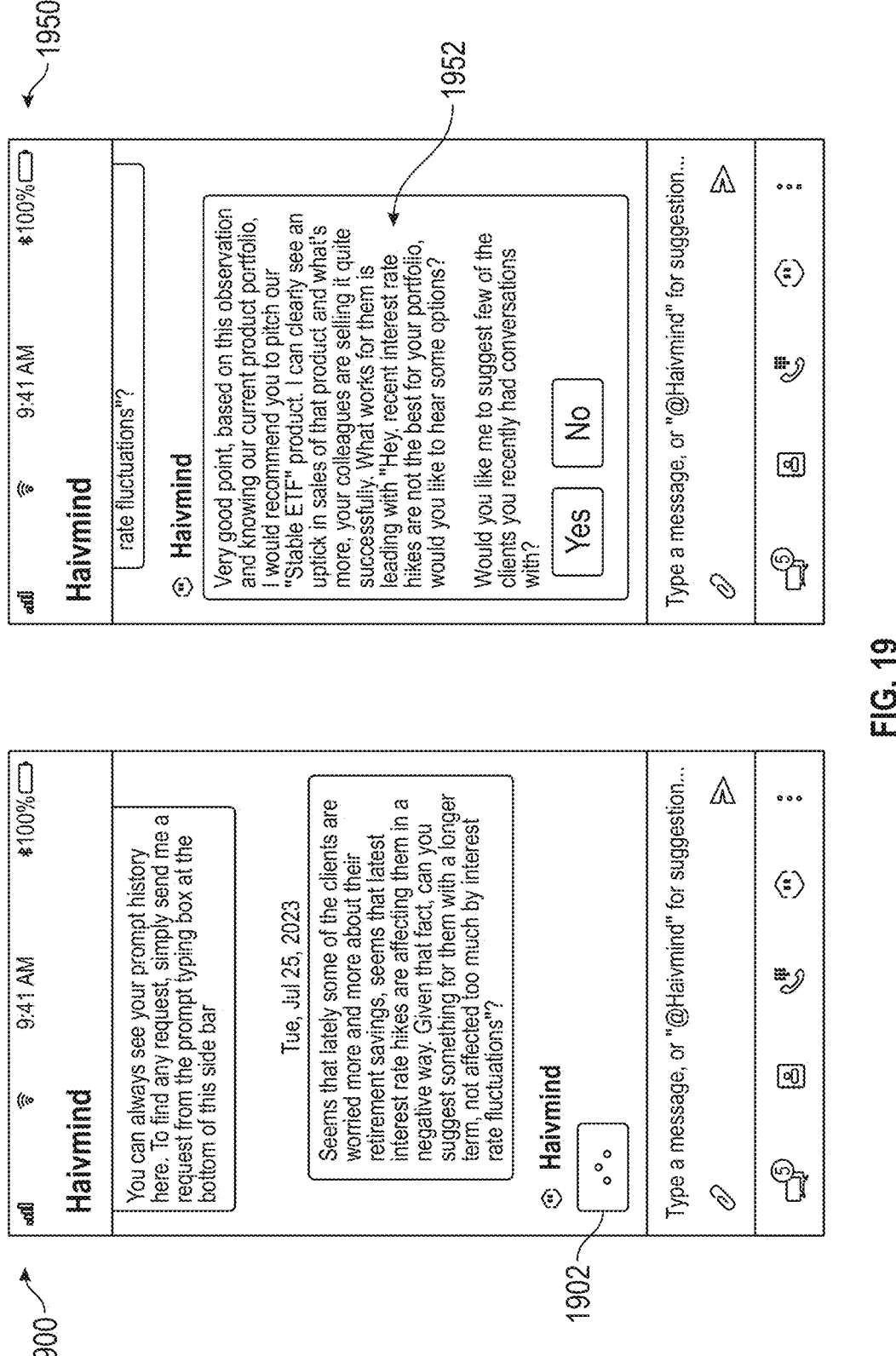

FIG. 19 illustrates exemplary graphical user interfaces 1900 and 1950, in accordance with some embodiments. The graphical user interfaces 1900 and 1950 may be user interfaces of a mobile device using the application (e.g., as described with respect to the above graphical user interfaces) and continuation of the conversation between the internal user and the Haivmind software from graphical user interfaces 1800 and 1850. As illustrated on graphical user interface 1900, the internal user's statements and request for suggestion are entered and displayed on the chat window of the interface. While the Haivmind software is preparing a response, the graphical user interface object 1902 is displayed to show a typing animation, giving the internal user a feeling that he or she is chatting with a human.

After the application receives the statements and the request for suggestions, embeddings associated with the statements are constructed and stored, and the product recommendation task is identified, and the analysis task may be executed using embeddings accessible to the internal user, as described with respect to FIGS. 1 and 2. As illustrated, the graphical user interface object 1952 may include a suggested product (e.g., Stable ETF) that are determined based on accessible embeddings and additional information associated with the suggested product. As illustrated in this example, the suggested product is determined based on embeddings associated with product sales information, other internal users' sale information, and other internal users' conversations, which are accessible to the internal user in this example.

In addition, the graphical user interface object 1952 comprises options for selecting additional product options and suggested external users for suggesting the product. The suggested external users may be determined via accessible embeddings that include information about external users' desire to switch to a more stable investment product.

Figure 20:
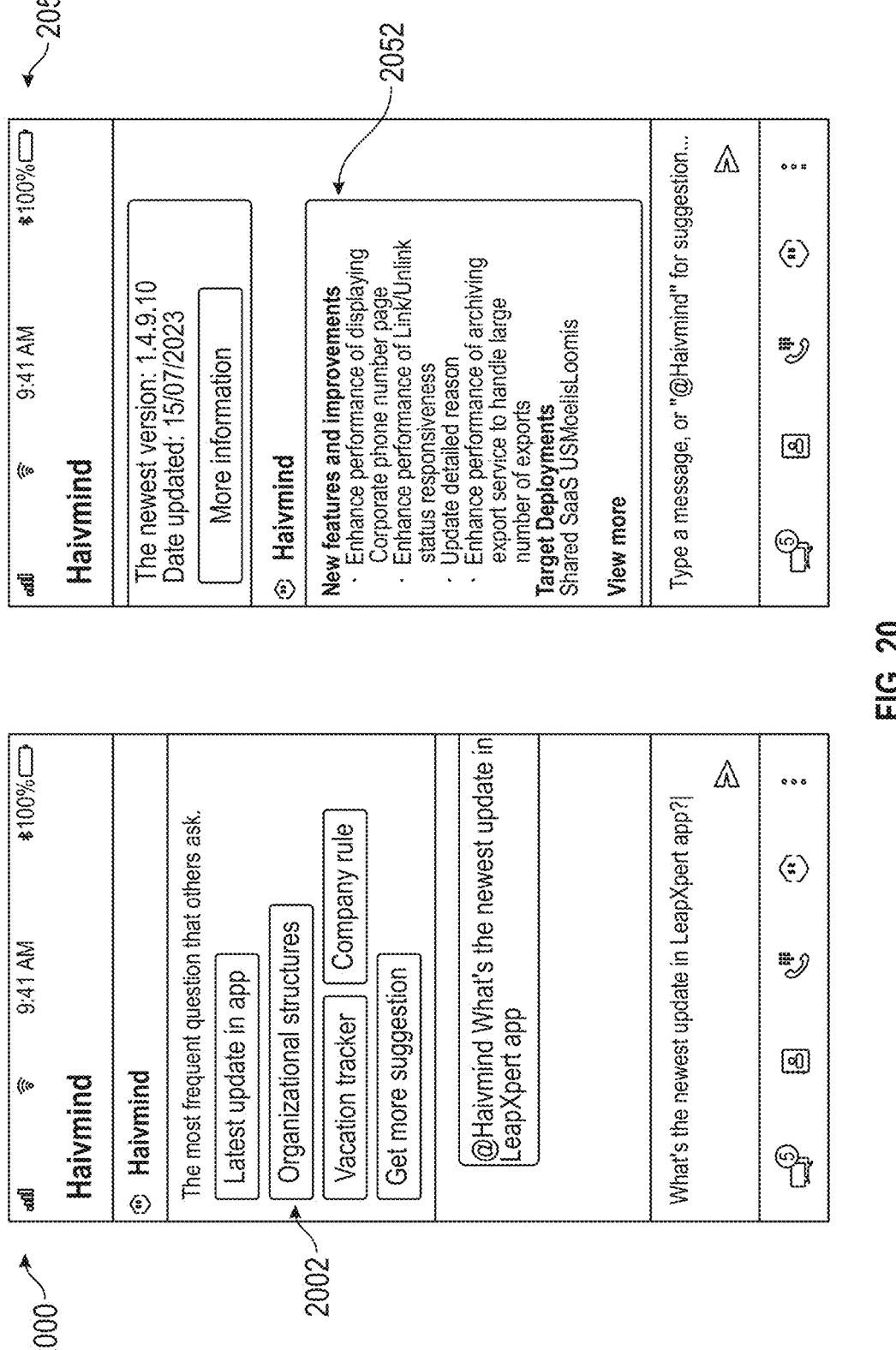

FIG. 20 illustrates exemplary graphical user interfaces 2000 and 2050, in accordance with some embodiments. The graphical user interfaces 2000 and 2050 may be user interfaces of a mobile device using the application (e.g., as described with respect to the above graphical user interfaces). The graphical user interface 2000 may correspond to the pop-up sidebar described with respect to FIG. 16, and the graphical user interface 2050 may correspond to the pop-up sidebar described with respect to FIG. 17. It should be appreciated that the graphical user interface 1800 and 1850 leverage features and advantages described with respect to FIGS. 16 and 17.

Figure 21:
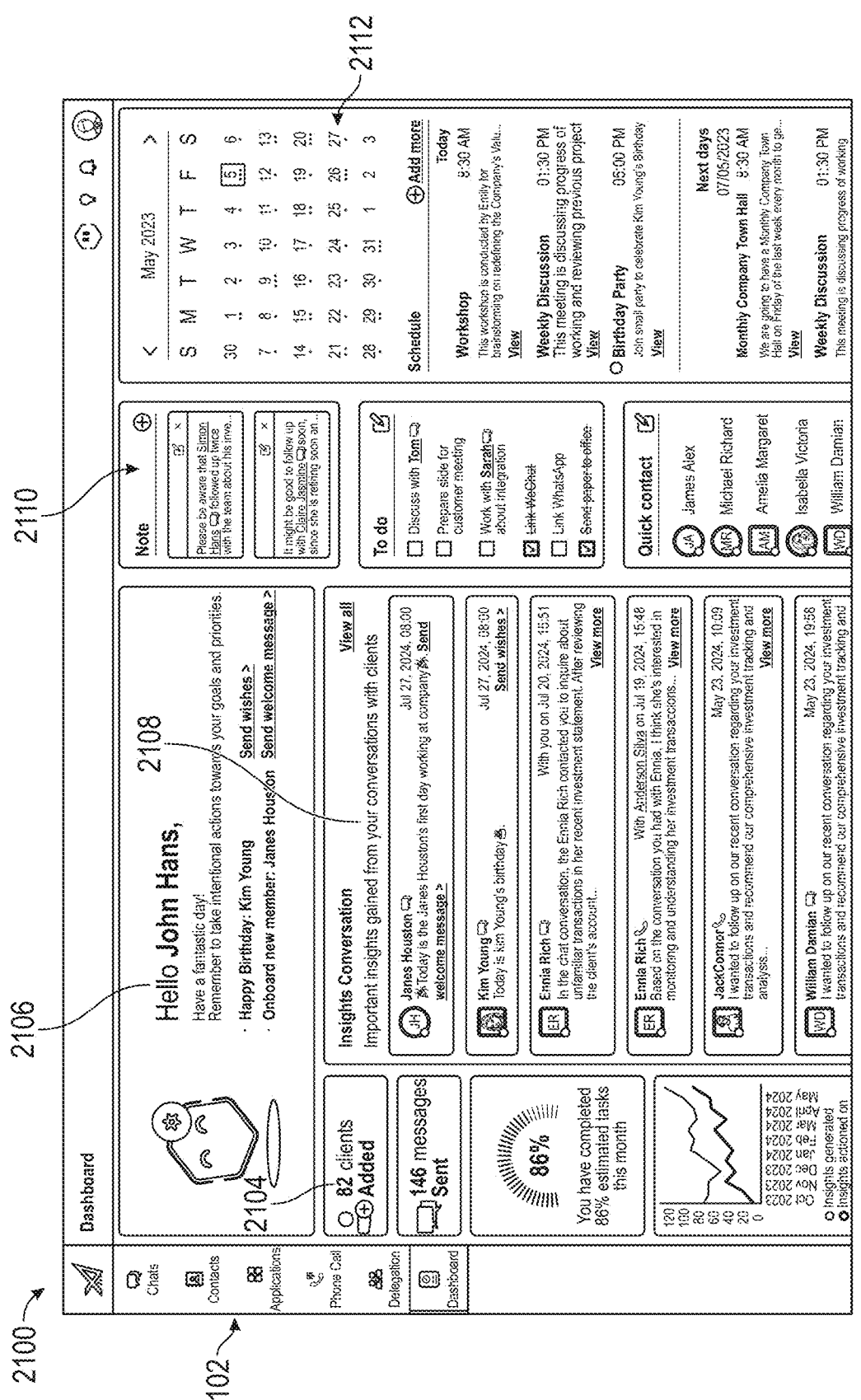

FIG. 21 illustrates exemplary graphical user interface 2100, in accordance with some embodiments. In some embodiments, the graphical user interface 2100 comprises a dashboard of the application. The graphical user interface 2100 may be displayed in response to a selection of the "Dashboard" graphical user interface object of group 2102 of graphical user interface objects (which may correspond to the first group 302 of graphical user interface objects of FIG. 3).

In some embodiments, as illustrated, the graphical user interface 2100 comprises graphical user interface objects associated information that may be of interest to the internal user. For example, group 2104 of graphical user interface objects may comprise productivity information such as number of clients added, messages sent, percentage of tasks completed, and a graphical representation related to insights.

The graphical user interface 2100 may also comprise graphical user interface object 2106, which includes a welcome message to the internal user, information about other users, and suggested actions related to the information. The welcome message and information about other users may be generated based on embeddings associated with the internal user and accessible embeddings about these other internal users. For example, the welcome message is determined based on an embedding associated with the internal user indicating a preference for a motivating welcome message, and the birthday is displayed based on an embedding associated with that the user's personal information, which is accessible to the internal user of this graphical user interface. The suggested actions may be generated as described herein.

The graphical user interface 2100 may also comprise group 2108 of graphical user interface objects. As illustrated, these graphical user interface objects comprise conversation insights associated with different external users. As illustrated, the each of the graphical user interface objects comprises the insight and a recommended action related to the insight. The group 2108 of graphical user interface objects advantageously allow the internal user to view possible actions that he or she can take today, allowing increased productivity.

In some embodiments, the insight and recommended action are generated based on accessible embeddings associated with conversations with a respective user, conversations between the respective user and another internal user, and/or conversations between internal users. In some embodiments, the insight and recommended action are generated via a semantic search in relevant conversation history. For example, based on a conversation associated with co-worker Janes Houston, it is determined that today is Janes' first day, and in accordance with a determination that today is Janes' first day, a recommendation to send a welcome message is displayed. In response to a selection of the recommendation, the welcome message is sent to Janes.

As illustrated in this example, group 2110 of graphical user interface objects may comprise graphical user interfaces associated with notes, to-do list, and contacts. In some embodiments, at least a part of the notes is generated based on conversation history information (e.g., embeddings comprising information that Simon Hans followed up twice, embeddings comprising information that Claire Jasmine is retiring soon) between the internal user and a respective external user. In some embodiments, at least a part of the to-do list is generated based on conversation history information (e.g., embeddings comprising information indicating that a discussion with Tom is needed) between the internal user and an associated external user.

As illustrated in this example, group 2112 of graphical user interface objects may comprise graphical user interfaces associated with the internal user's calendar. In some embodiments, meetings are scheduled on the calendar based on internal user information (e.g., embeddings comprising information about the internal user's schedule) and/or conversation history information (e.g., embeddings comprising information about scheduling from a conversation).

Figure 22:
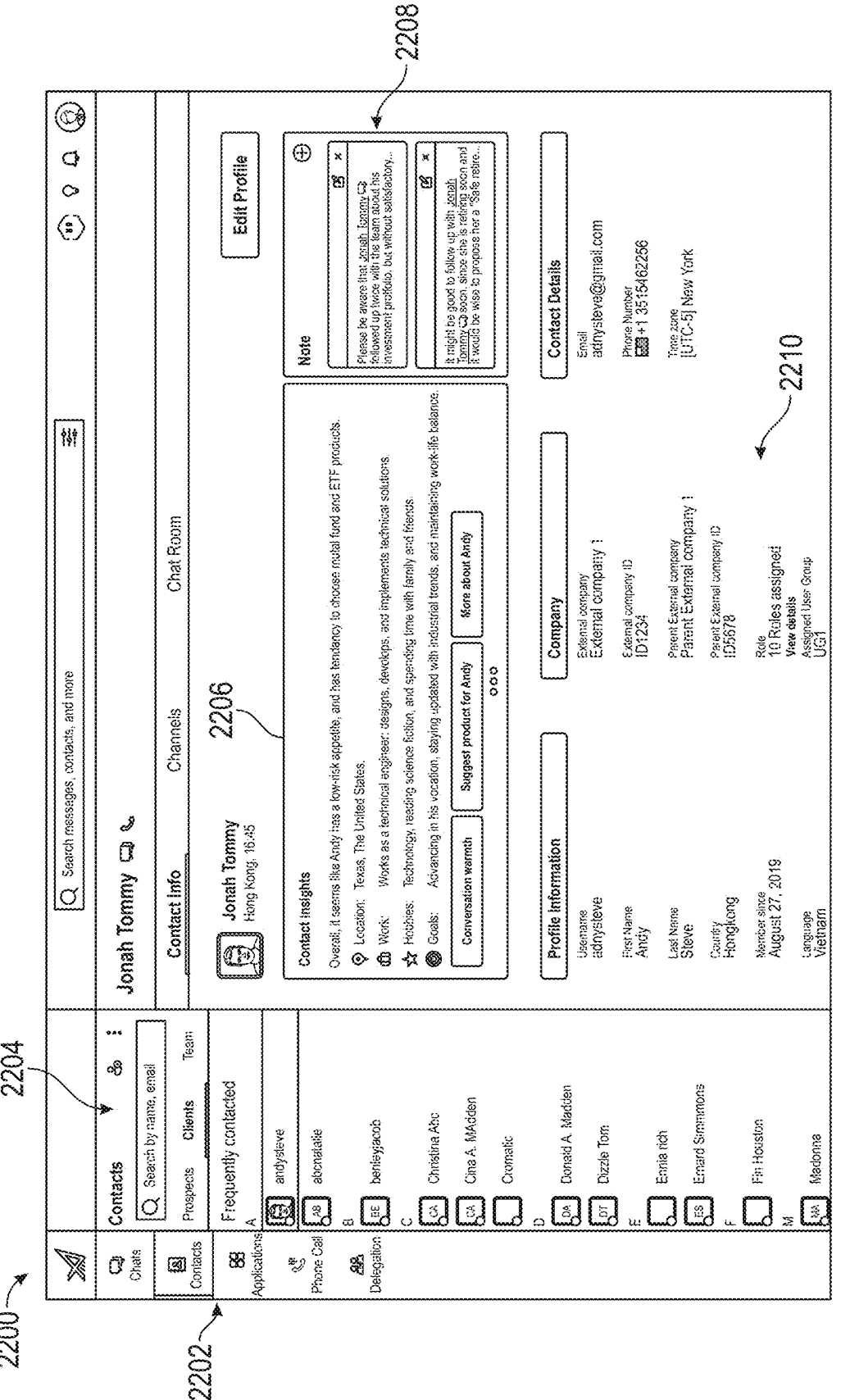

FIG. 22 illustrates exemplary graphical user interface 2200, in accordance with some embodiments. The graphical user interface 2200 may be displayed in response to a selection of the "Contacts" graphical user interface object of group 2202 of graphical user interface objects (which may correspond to the first group 302 of graphical user interface objects of FIG. 3).

In some embodiments, the graphical user interface 2200 comprises contact information. For example, group 2204 of graphical user interface objects may comprise a list of contacts. As illustrated, information about a selected contact (e.g., Jonah Tommy) of the list of contacts is displayed on the graphical user interface 2200.

The information about the selected contact may include insights about the contact, as shown on graphical user interface object 2206. The insights about the contact may be generated via accessible embeddings, as described herein (for example as described with respect to FIG. 21). The graphical user interface object 2206 may also comprise suggested actions relating to the contact. In response to a selection of a suggested action, a corresponding task is executed as described herein.

As illustrated, the graphical user interface 2200 comprises graphical user interface object 2208 that includes notes about the contact. The notes about the contact may be generated via accessible embeddings, as described herein (for example as described with respect to FIG. 21). The graphical user interface 2200 may also comprise additional information about the client, as indicated by portion 2210 of the interface.

Figure 23:
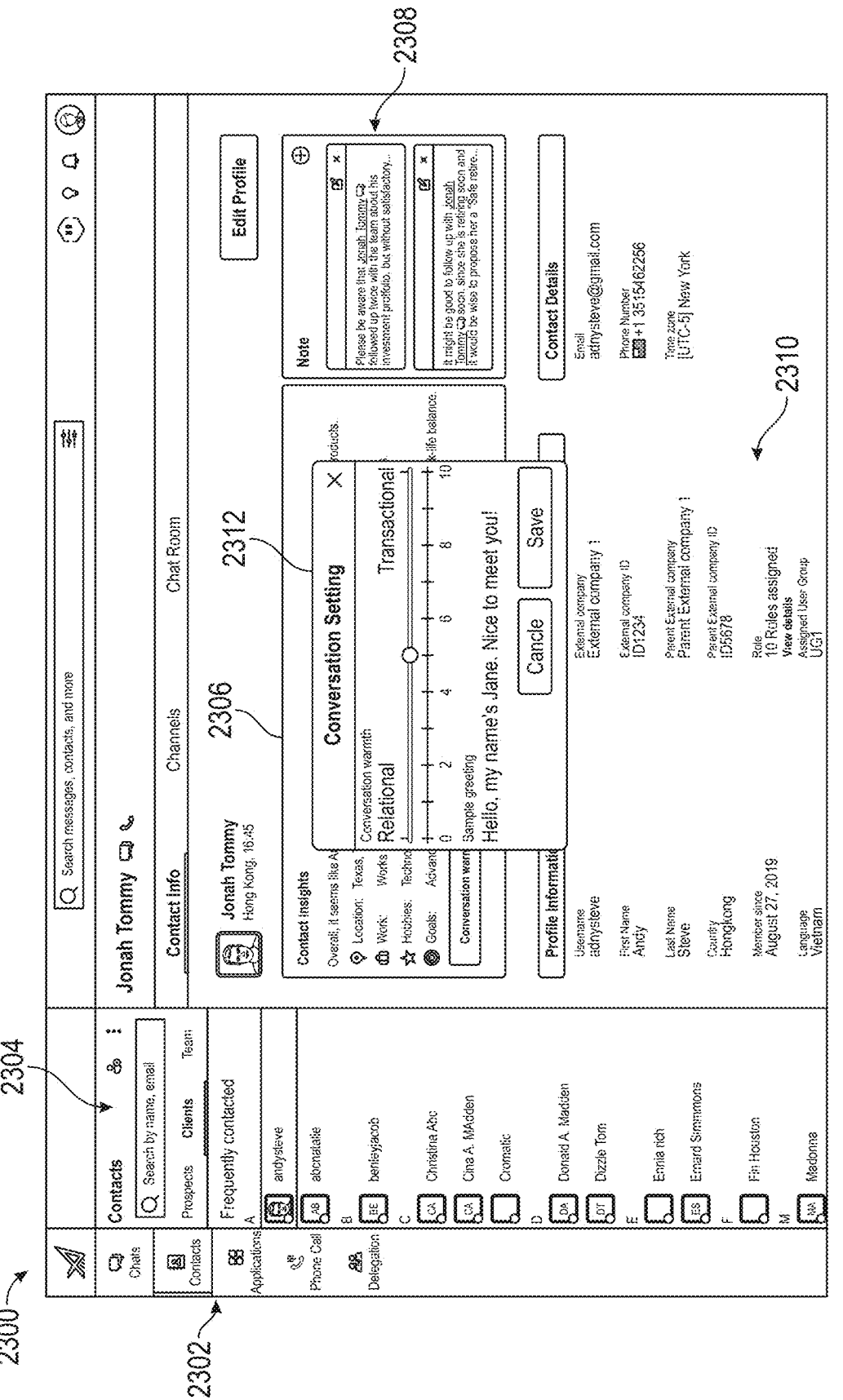

FIG. 23 illustrates exemplary graphical user interface 2300, in accordance with some embodiments. It should be appreciated that the graphical user interface 2300 leverages features described with respect to graphical user interface 2200.

As illustrated, in response to a selection of "Conversation warmth" on the graphical user interface object 2206, the graphical user interface object 2312 is displayed. The graphical user interface object 2312 may allow the internal user to configure a conversation warmth of response suggestions for this particular contact. For example, if the setting is more relational, the application would take this setting into account and may suggest more small talk into suggested messages for this client. As another example, if the setting is more transactional, the application would take this setting into account and may suggest less small talk into suggested messages for this client.

Figure 24:
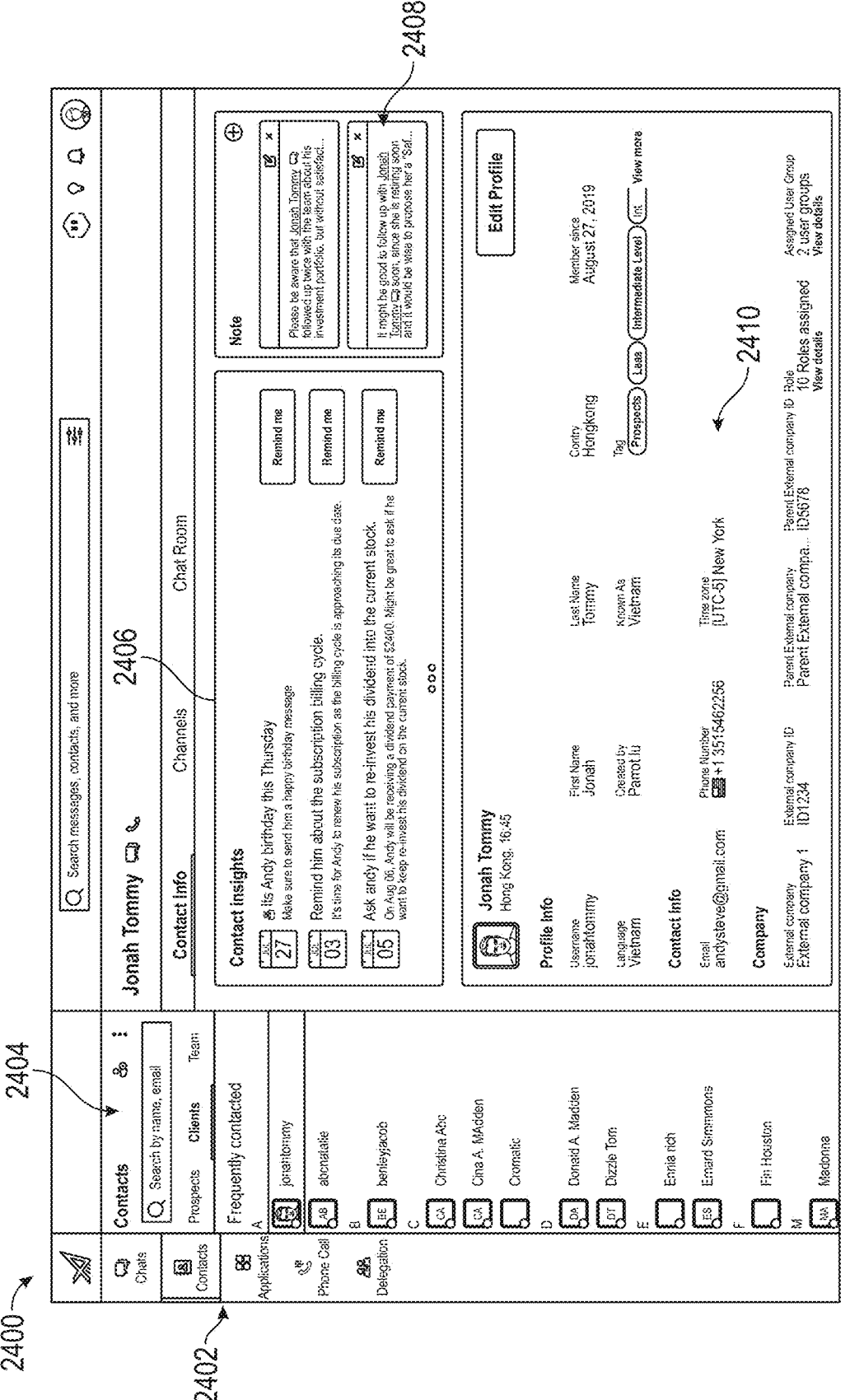

FIG. 24 illustrates exemplary graphical user interface 2400, in accordance with some embodiments. It should be appreciated that the graphical user interface 2400 leverages features described with respect to graphical user interface 2200.

As illustrated, the graphical user interface 2400 comprises graphical user interface object 2406, which may include additional contact insights (which may be generated as disclosed herein) and actions related to the insights (e.g., reminder). In some embodiments, the graphical user interface object 2406 is displayed in response to an input to graphical user interface object 2306 (e.g., scrolling, swiping).

Figure 25:
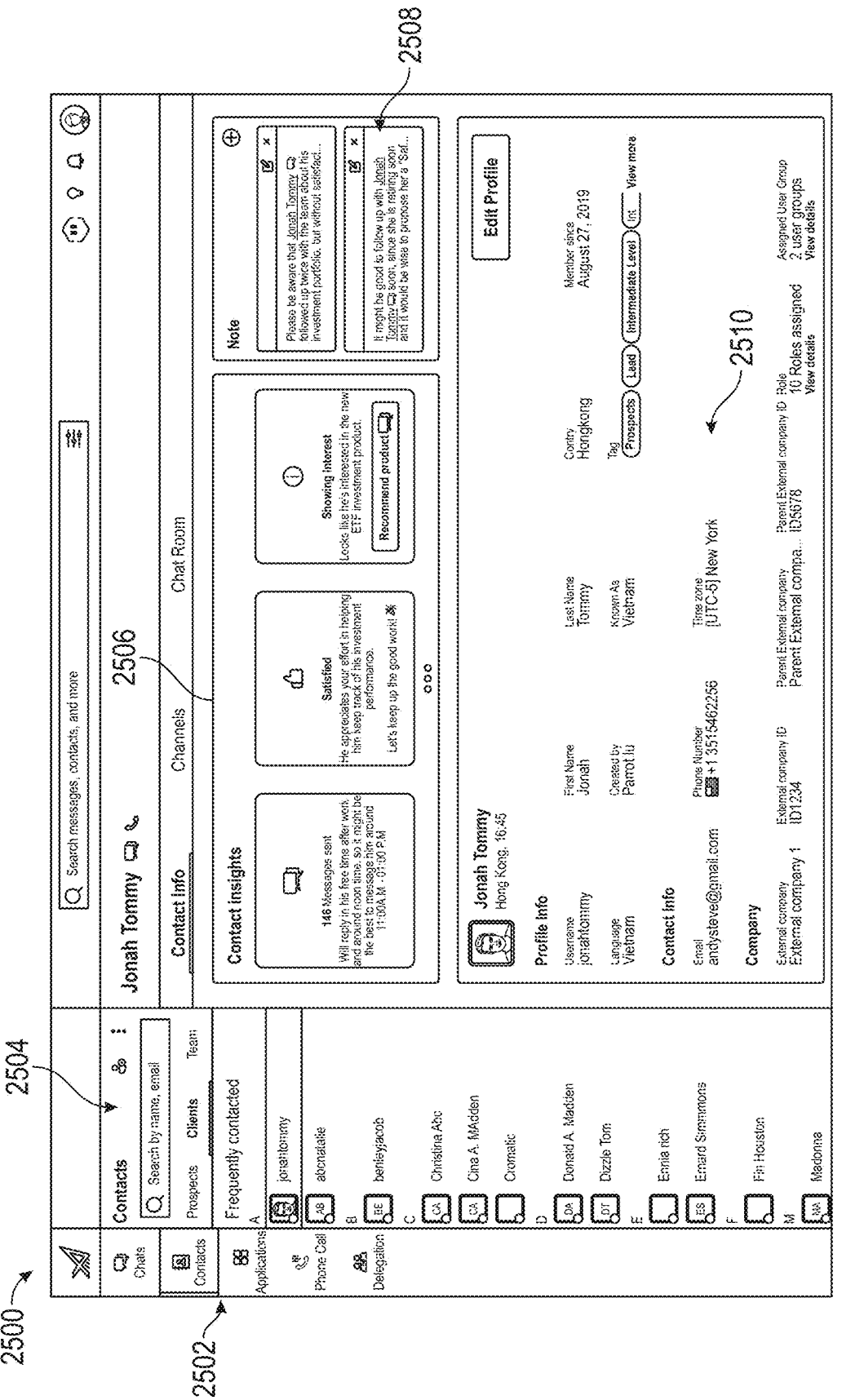

FIG. 25 illustrates exemplary graphical user interface 2500, in accordance with some embodiments. It should be appreciated that the graphical user interface 2500 leverages features described with respect to graphical user interface 2200.

As illustrated, the graphical user interface 2500 comprises graphical user interface object 2506, which may include additional contact insights (which may be generated as disclosed herein) and actions related to the insights (e.g., a product recommendation based on contact interest). For example, as illustrated, the graphical user interface object

2506 comprises about messaging patterns and suggested messaging times, a sentiment of the contact (e.g., determined via sentiment analysis), and product interests. In some embodiments, the graphical user interface object 2506 is displayed in response to an input to graphical user interface object 2306 or 2406 (e.g., scrolling, swiping).

Figure 26:
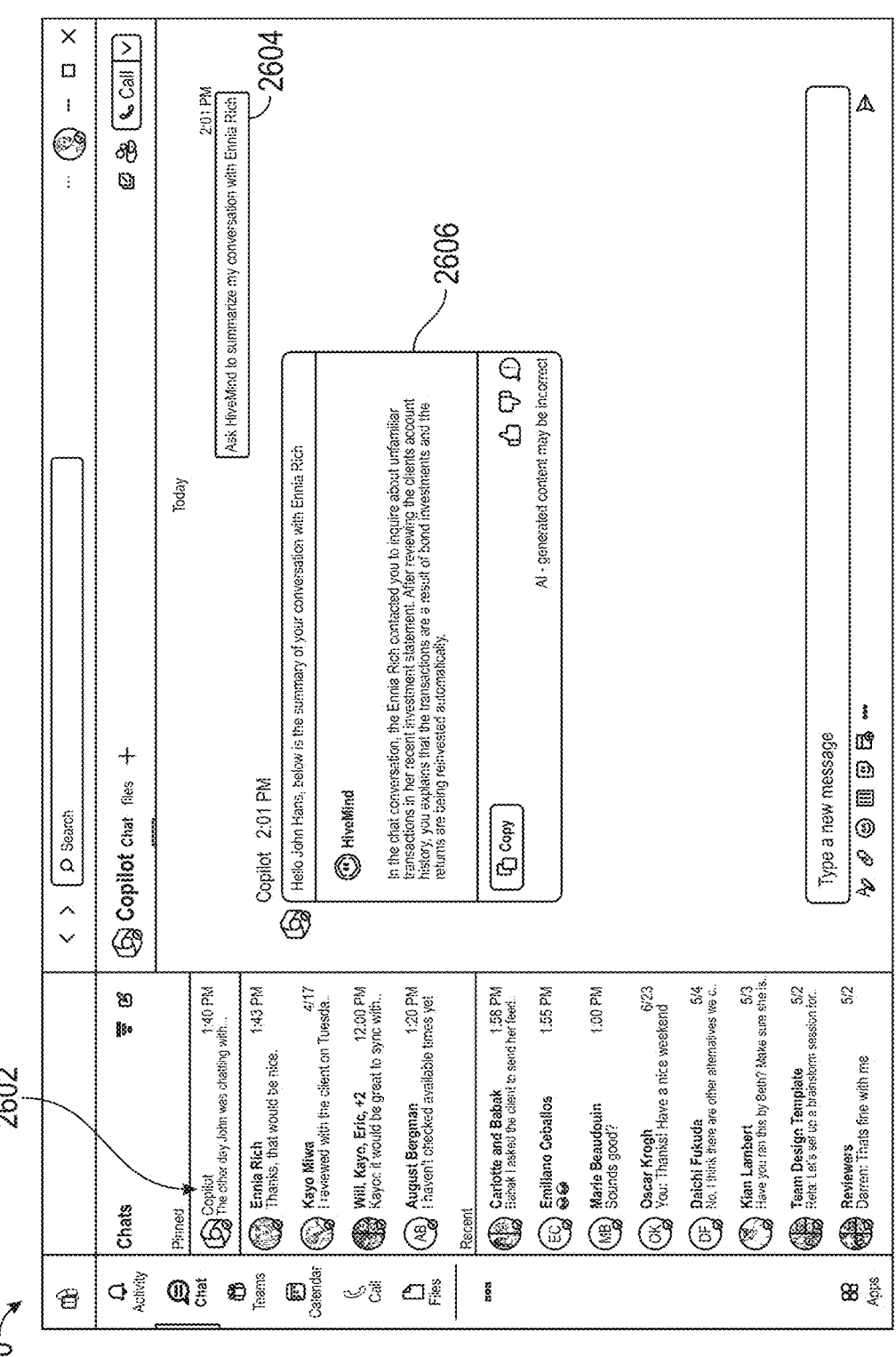

FIG. 26 illustrates exemplary graphical user interface 2600, in accordance with some embodiments. In some embodiments, the graphical user interface 2600 comprises a conversation with a personal assistant (Copilot) via a chat window similar to chat window 306. An internal user may send a message to the personal assistant for performing tasks. As illustrated, the chat window for chatting with the personal assistant may be similar to a chat window for chatting with a contact.

For example, graphical user interface object 2604 comprises a message to request a summary of a conversation with an external user. In response to receiving this message, the application identifies the analysis task as comprising summarization, and the second personal assist may invoke the Haivmind software to instruct execution of the task. The analysis task may be executed as described with respect to FIGS. 1 and 2. The output of the task and a comment about the output may be displayed on graphical user interface object 2606, as illustrated.

Figure 27:
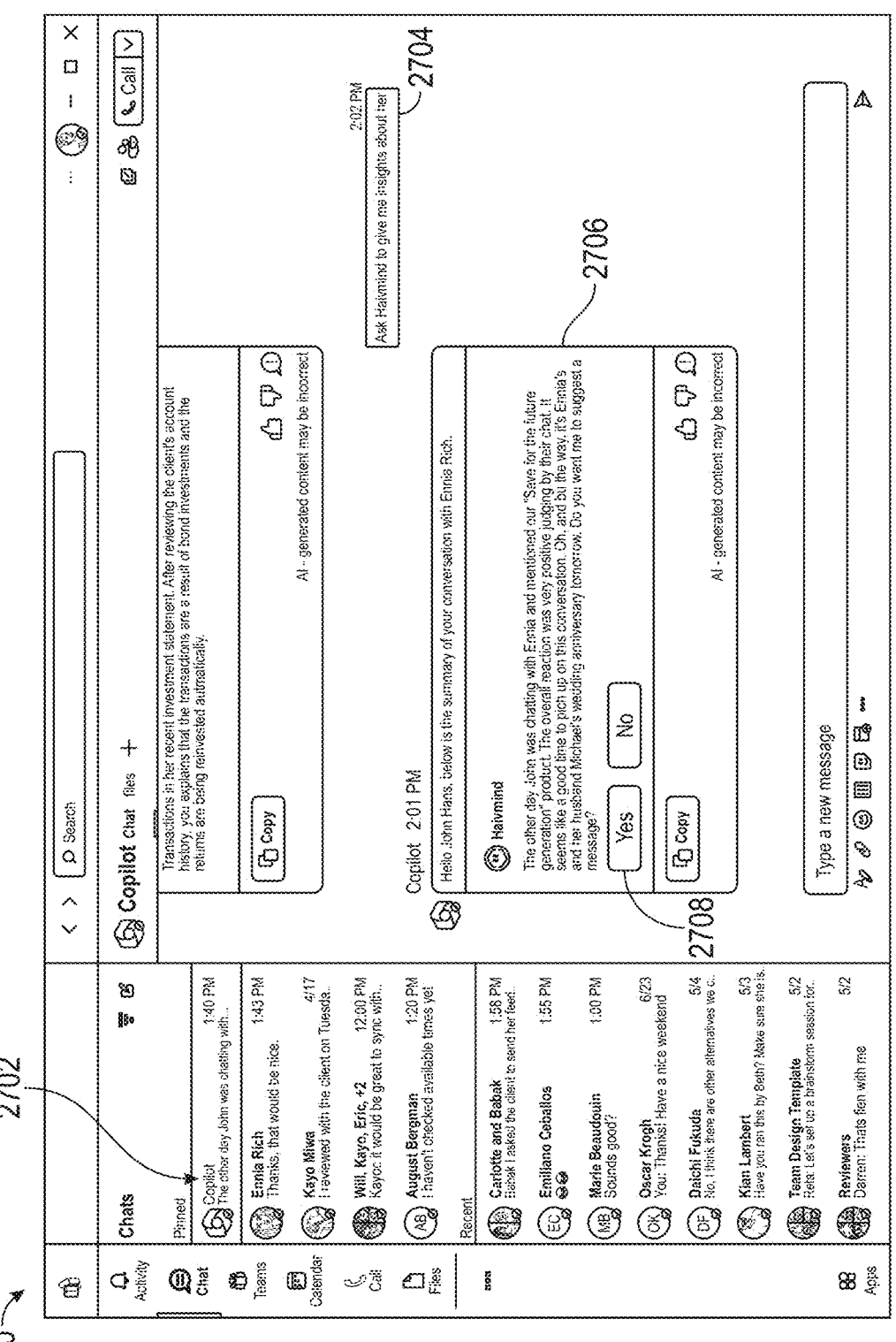

FIG. 27 illustrates exemplary graphical user interface 2700, in accordance with some embodiments. As illustrated, graphical user interface 2700 comprises graphical user interface objects 2704 and 2706. Graphical user interface object 2704 may comprise a message from the internal user that includes a follow up request after the output described with respect to graphical user interface 2600 is displayed.

For example, graphical user interface object 2704 comprises a message to request an insight about the external user. In response to receiving this message, the application identifies the analysis task as comprising analysis of an external user, and the second personal assist may invoke the Haivmind software to instruct execution of the task. The analysis task may be executed as described with respect to FIGS. 1 and 2. The output of the task, a comment about the output, and options related to the output (e.g., confirming a suggestion related to the insights) may be displayed on graphical user interface object 2706, as illustrated.

Figure 28:
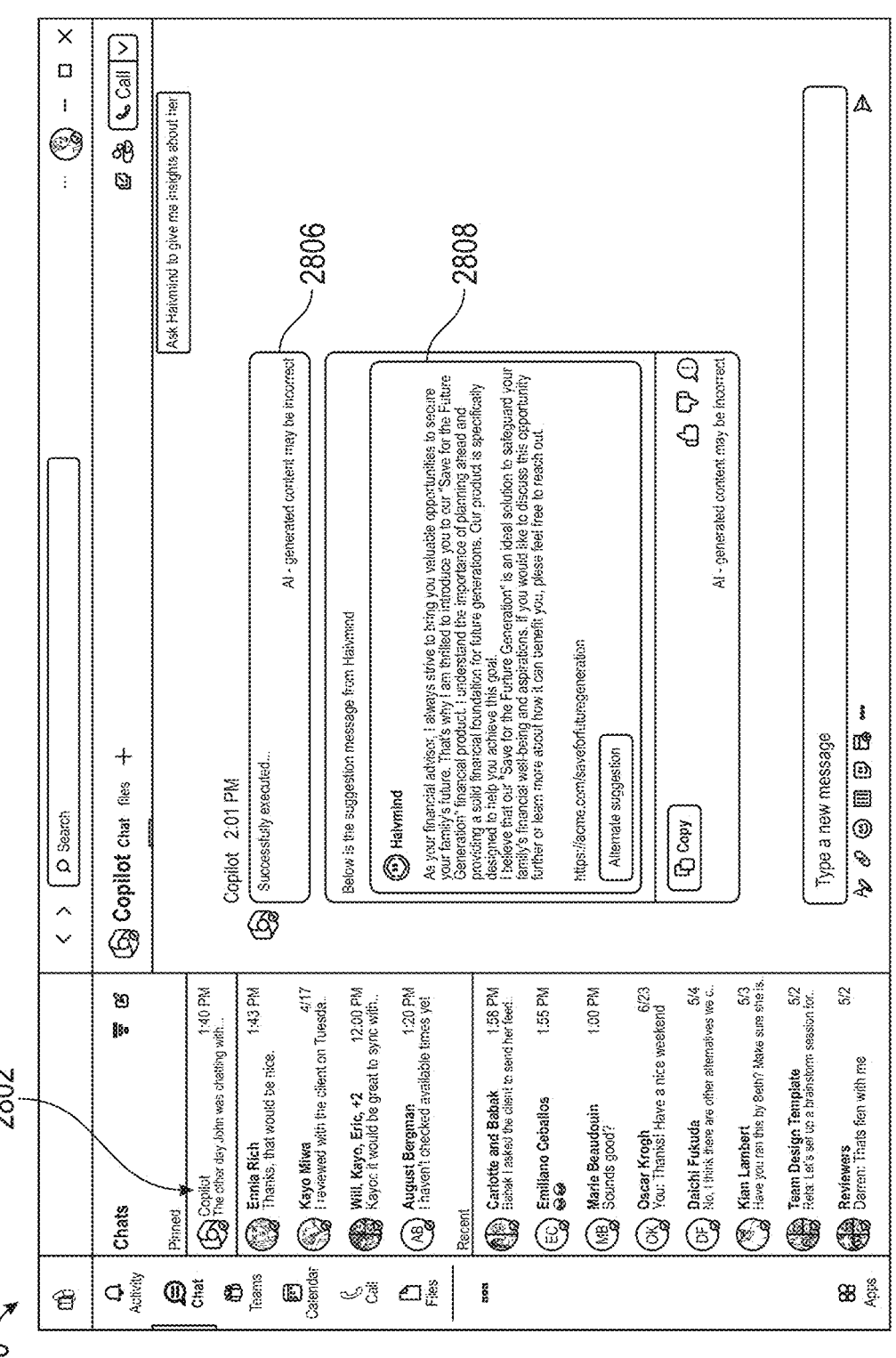

FIG. 28 illustrates exemplary graphical user interface 2800, in accordance with some embodiments. As illustrated, graphical user interface 2800 comprises graphical user interrace objects 2806 and 2808. Graphical user interface object 2806 may be updated from graphical user interface 2706 to indicate successful execution of a task after graphical user interface 2708 is selected to confirm the suggestion. Graphical user interface object 2908 may comprise the output of the task corresponding to the suggestion of graphical user interface object 2706 (e.g., suggested message based on Ennia's positive product reaction and wedding anniversary). The graphical user interface object 2908 may also include an option for an alternate suggestion. In response to selecting the option for the alternate suggestion, the chat window may be updated to include a new graphical user interface object that includes the alternate suggestion (generated using the methods described herein).

Figure 29:
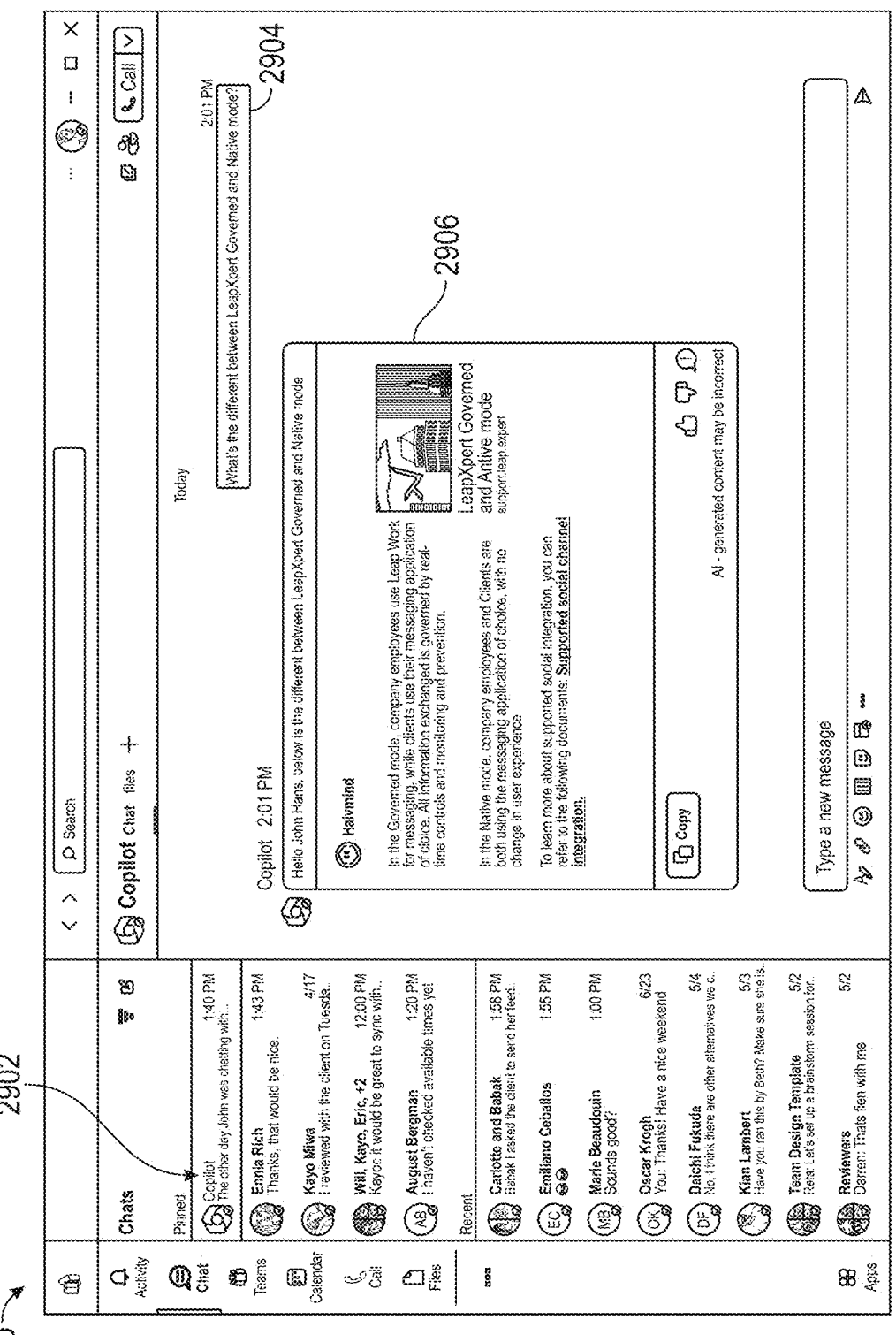

FIG. 29 illustrates exemplary graphical user interface 2900, in accordance with some embodiments. In some embodiments, the graphical user interface 2900 comprises a conversation with a personal assistant (Copilot) via a chat window similar to chat window 306. An internal user may send a message to the second personal assist for performing tasks.

For example, graphical user interface object 2904 comprises a message including a query. In response to receiving this message, the application identifies the analysis task as comprising a query, and the second personal assist may invoke the Haivmind software to instruct execution of the task. The analysis task may be executed as described with respect to FIGS. 1 and 2. The output of the task and a comment about the output may be displayed on graphical user interface object 2906, as illustrated.

FIG. 31 illustrates an exemplary process 3100 for sharing machine-learning-generated insights on a communication platform, in accordance with some embodiments. Process 3100 is performed, for example, using one or more electronic devices implementing a software platform. In some examples, process 3100 is performed using a client-server system, and the blocks of process 3100 are divided up in any manner between the server and one or more client devices. In some examples, process 3100 is performed using only one or more server devices or only one or more client devices. Thus, while portions of process 3100 are described herein as being performed by particular devices of a client-server system, it will be appreciated that process 3100 is not so limited. In process 3100, some blocks are, optionally, combined, the order of some blocks is, optionally, changed, and some blocks are, optionally, omitted. In some examples, additional steps may be performed in combination with the process 3100. Accordingly, the operations as illustrated (and described in greater detail below) are exemplary by nature and, as such, should not be viewed as limiting.

At block 3102, an exemplary system receives at least a portion of a conversation between the user and one or more conversation participants. In some embodiments, the system comprises one or more server devices implementing the backend system of a communication platform. The one or more server devices can communicate with a client application of the communication platform, which can be provided on a user device. The client application may be, for example, a mobile app, a desktop application, a web-based service, a web browser plug-in or extension, or the like. The client application can provide various user interfaces for the user to access and use the communication platform, such as FIGS. 32A-B as described herein.

The conversation may include an exchange of messages, a transcript of a phone call or a video call, etc. In some embodiments, the communication platform is a messaging application. In some embodiments, the communication platform is a central communication platform that has access to a user's various conversations across different messaging applications (e.g., iMessage, Slack, WeChat, WhatsApp), and the conversation may have occurred via one of the messaging applications.

At block 3104, the system generates, using one or more machine-learning models, an insight based on the conversation between the user and the one or more conversation participants. As described herein, the insight can be any information derived from messages in the conversation. For example, the insight may comprise a summary of the conversation or its participants, a sentiment analysis of the conversation or its participants, a recommendation based on the conversation, an action item based on the conversation, a response composition (e.g., a draft message) based on the conversation, a fact checking of the conversation, an analysis of the one or more conversation participants, or any combination thereof.

The insight can be generated using the techniques described herein. In some embodiments, the system constructs a plurality of embedding representations of a plurality of messages in the conversation and provide the plurality of embeddings to the one or more machine-learning models (e.g., LLMs) to generate the insight. In some embodiments, the system can provide the messages themselves to a machine learning model (e.g., LLM), along with a prompt, to generate the insight. The machine-learning models can be retrained iteratively over time.

In some embodiments, the system can continuously generate insights as the conversation is carried out over time. For example, at a first time, the conversation may include a first plurality of messages. The first plurality of messages may be a conversation session directed to one particular topic. The system can generate an insight based on the first plurality of messages. In some examples, the system can generate the insight after determining that the first plurality of messages belong to the same conversation session and that the session has ended. The determination can be made by analyzing the messages using machine-learning models or determining that no additional messages have been exchanged for a predefined time period. At a second time later than the first time, the conversation may additionally include a second plurality of messages. They system may generate a new insight based on the second plurality of messages (e.g., separately or in combination with the first plurality of messages).

At block 3106, the system causes display, within the user interface of the communication platform associated with the user, the insight. Additionally, the system can display other information associated with the conversation, such as time of conversation, conversation participants, the communication channel (e.g., the messaging app) on which the conversation is carried out.

At block 3108, the system receives a user request to share the insight with a contact on the communication platform. The contact is not the one or more conversation participants. In some embodiments, the user and the contact may belong to the same organization, while the conversation participants may be external to the organization. For example, the user may be an employee of a bank and has been communicating with an external client of the bank. The user may then share the insight from the one-on-one conversation with another employee in the bank, who is not part of the conversation.

As discussed above, the system may generate multiple insights for a single conversation. Thus, the user can choose to share only some or all of the insights for the conversation. In some examples, once an insight from a conversation is shared, subsequent insights generated for the same conversation can be automatically shared with the contact. In some examples, the subsequent insights are not shared by default.

Upon receiving the user request to share the insight, the system can check if the contact has permission to access the insight. To enforce the data sharing policies and data access requirements, an organization may need to set up one or more "ethical walls" between its business units. For example, in a financial institution, an ethical wall may be set up between the wealth management department and the investment banking department to prevent information from being shared between the two business units. This way, information about a client known to the wealth management is not communicated to the investment banking department, even if the investment banking department may also serve the same client in a different capacity. In some embodiments, the check is performed based on ethical walls of an organization, the relationship between the contact and the user, the relationship between the contact and the conversation participants, or any combination thereof. For example, the system may check if the user and the contact belong to the same department in the organization or related departments, if the conversation participant or affiliated organization is a client of the department, if the contact has been approved to work with that client, if the contact has been approved to work on a project mentioned in the conversation, etc. If the system determines that the contact has permission to access the insight, the system can proceed with block 3110. If the system determines that the contact does not have permission, the system can forego performing block 3110 and output an error message. Accordingly, the system manages dynamic permission checking (e.g., via the enforcement of ethical walls) in real time.

At block 3110, the system causes display, within a user interface of the communication platform associated with the contact, the insight. In some embodiments, the system does not display actual messages of the conversation. Exemplary user interfaces are provided herein with reference to FIGS. 33A-B. Accordingly, the contact can understand key information of the conversation (e.g., action items, sentiment analysis) in an efficient manner. At the same time, the contact is prevented from accessing the exact communication in the conversation, thus maintaining certain level of confidentiality of the conversation participants.

The system can enable collaboration between the user and the contact. For example, the system can cause display, within the user interface of the communication platform associated with the contact, one or more user controls for entering comments related to the shared insight. After the system receives a comment entered by the contact, it can cause display of the comment in association with the insight in both the user interfaces associated with the user and the contact. The user can enter a response to the comment (e.g., in the comment section). This way, the user and the contact can carry on a conversation regarding the insight by sharing comments in the communication platform.

In some embodiments, the collaboration (e.g., comments by the user and the contact discussing the shared insight) is not shared with the one or more conversation participants. For example, an external client having a conversation with the user would not know that an insight generated based on the conversation has been shared with the user's colleague. Accordingly, the system allows the user to easily share an insight and initiate a collaboration with an internal contact regarding the insight, without exposing the internal collaboration to the conversation participants. The user can review the collaboration and carry on with the conversation with the conversation participants separately.

In some embodiments, the system can generate collaboration insights and display (or cause display of) the collaboration insights in the comment section. The collaboration insights can be generated based on the comments by the user and the contact. A collaboration insight can be any information derived from the collaboration. For example, the collaboration insight may comprise a summary of the collaboration, a recommendation based on the conversation, an action item based on the conversation, a response composition (e.g., a draft message for the user to use in the conversation), etc. In some embodiments, the user can share the same insight with multiple contacts (e.g., from the same or different departments) and all of these contacts can exchange comments with each other in the common section.

Figures 32A, 32B:
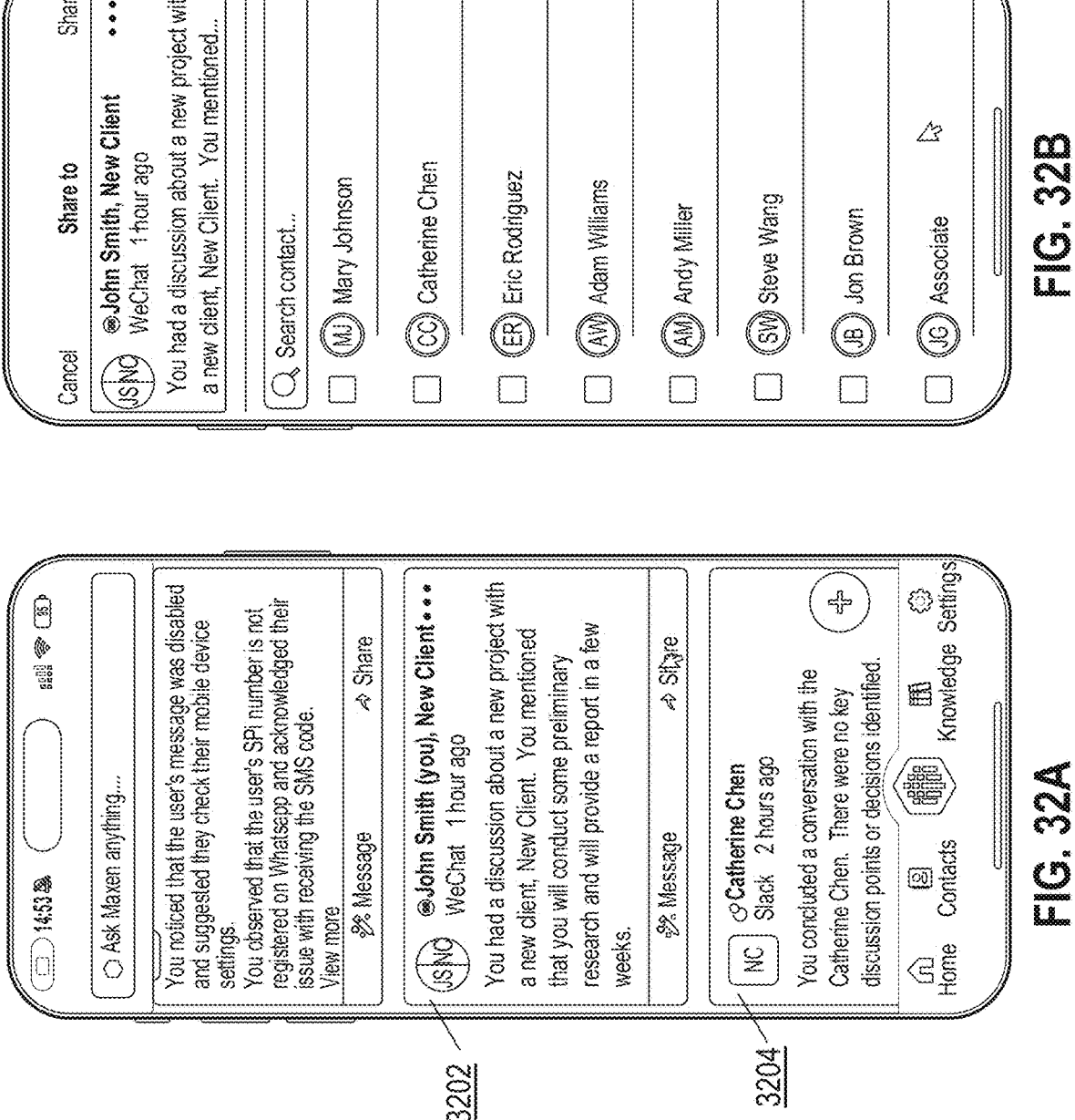
FIGS. 32A-32B illustrate an exemplary process 3100 for sharing machine-learning-generated insights on a communication platform, in accordance with some embodiments.

FIGS. 32A-B illustrate exemplary user interfaces of a communication platform associated with a user, in accordance with some embodiments. The communication platform provides a client application for a user, John Smith, to view insights from various communications across multiple communication channels (e.g., Slack, WhatsApp, WeChat, Microsoft Teams). As shown in the depicted example, the client application is a mobile app that can be provided on a user device. The client application shows a first insight 3202 of a conversation with New Client on WeChat, a second insight 3204 from a conversation with Catherine Chen on Slack, etc.

With reference to FIG. 32A, the user has selected to share the insight 3202. In response to the user selection, the client application displays a plurality of contacts that the user has on the communication platform. In the depicted example in FIG. 32B, a user's contact, Associate, is selected. For example, the user and Associate may belong to the same organization (e.g., employees with the same bank), while the conversation participant, New Client, may be an external client of the bank. The user may then share the insight from the one-on-one conversation with Associate in the bank, who is not part of the conversation and may not have been introduced to New Client.

Figures 33A, 33B:
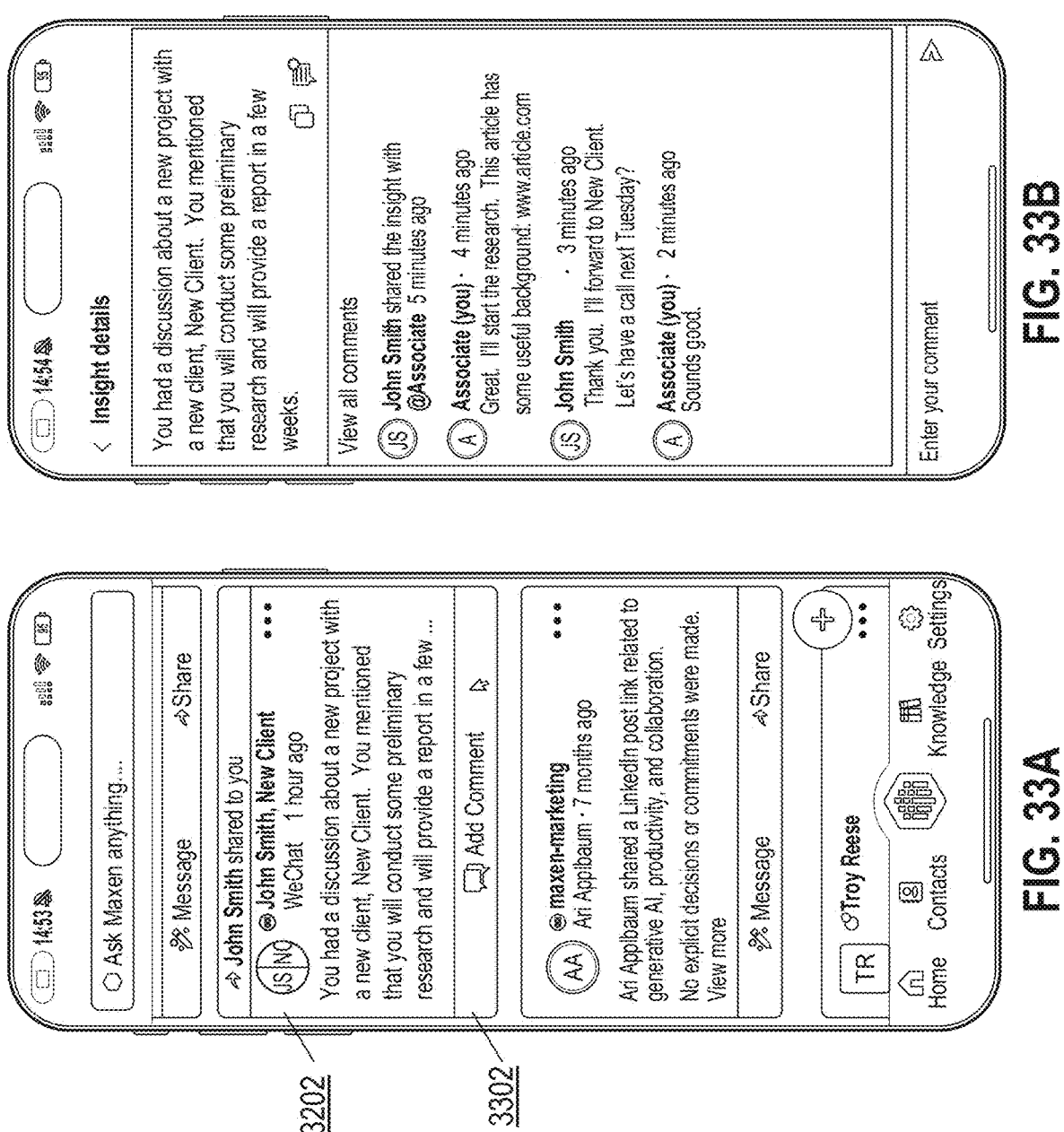
FIGS. 33A-33B illustrate exemplary user interfaces of the communication platform associated with the contact that user the has shared insights with, in accordance with some embodiments.

FIGS. 33A-B illustrate exemplary user interfaces of the communication platform associated with the contact that user the has shared insights with, in accordance with some embodiments. As shown, the shared insight 3202 is displayed in Associate's feed. Accordingly, Associate can understand key information of the conversation between John Smith and New Client in an efficient manner. At the same time, Associate is prevented from accessing the exact communication in the conversation, thus maintaining certain level of confidentiality of New Client.

The system can enable collaboration between John Smith and Associate. As shown, the client application displays a user interface control 3302 for entering comments related to the shared insight 3202. As shown in FIG. 33B, John Smith and Associate can collaborate regarding the shared insight by exchanging comments. As discussed above, the collaboration between John Smith and Associate may not be shared with New Client. Accordingly, the system allows John Smith to easily share an insight and initiate a collaboration with Associate regarding the insight, without exposing the internal collaboration to New Client. Instead, John Smith can review the collaboration (i.e., the comments) and carry on with the conversation with New Client separately.

In some embodiments (not depicted), the system can generate collaboration insights and display (or cause display of) the collaboration insights in the comment section. For example, the collaboration insight may comprise an action item (i.e., a meeting invitation including John Smith and Associate next Tuesday), a proposed response (e.g., a draft message for John Smith to share the article with New Client), etc.

As discussed, the system can continuously generate insights as the conversation is carried out over time. For example, as John Smith and New Client continues their conversation on WeChat, additional insights may be generated. The additional insights may be automatically shared and displayed to Associate, in some examples.

Figure 30:
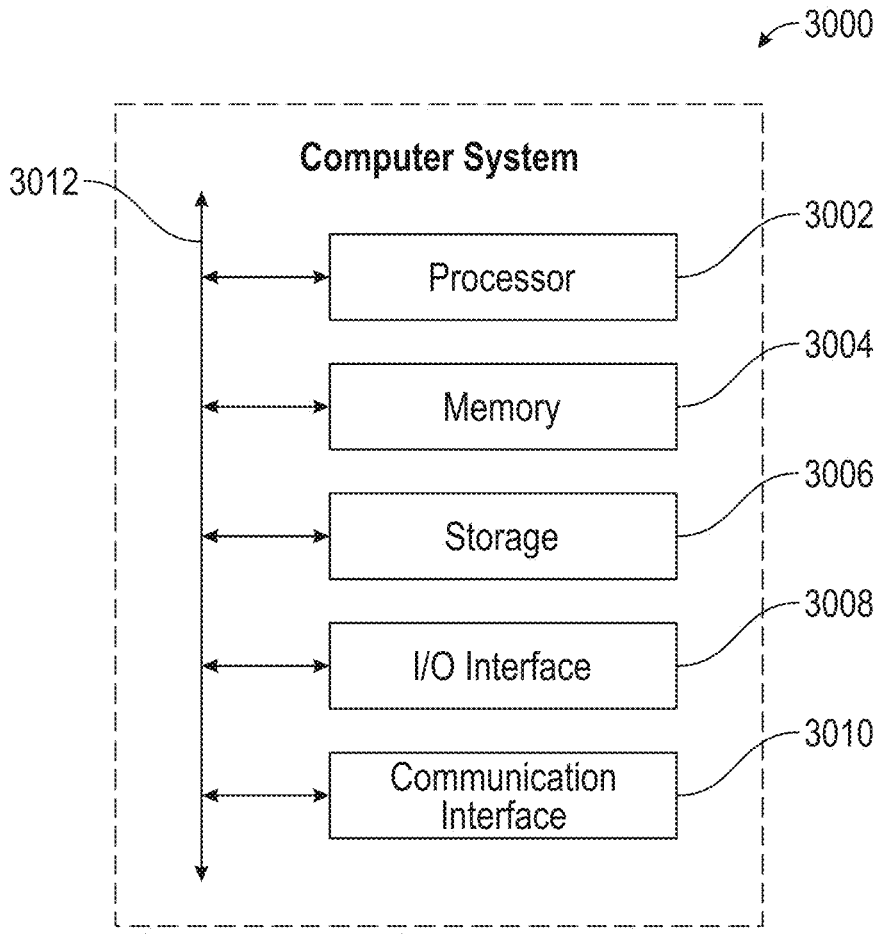
FIG. 30 illustrates an exemplary system, in accordance with some embodiments.

FIG. 30 illustrates an example computer system 3000. In some embodiments, a disclosed system comprises the computer system 3000. In particular embodiments, one or more computer systems 3000 perform one or more steps of one or more methods described or illustrated herein. In particular embodiments, one or more computer systems 3000 provide functionality described or illustrated herein. In particular embodiments, software running on one or more computer systems 3000 performs one or more steps of one or more methods described or illustrated herein or provides functionality described or illustrated herein. Particular embodiments include one or more portions of one or more computer systems 3000. Herein, reference to a computer system may encompass a computing device, and vice versa, where appropriate. Moreover, reference to a computer system may encompass one or more computer systems, where appropriate.

This disclosure contemplates any suitable number of computer systems 3000. This disclosure contemplates computer system 3000 taking any suitable physical form. As example and not by way of limitation, computer system 3000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 3000 may include one or more computer systems 3000; be unitary or distributed; span multiple locations; span multiple machines; span multiple data centers; or reside in a cloud, which may include one or more cloud components in one or more networks. Where appropriate, one or more computer systems 3000 may perform without substantial spatial or temporal limitation one or more steps of one or more methods described or illustrated herein. As an example and not by way of limitation, one or more computer systems 3000 may perform in real time or in batch mode one or more steps of one or more methods described or illustrated herein. One or more computer systems 3000 may perform at different times or at different locations one or more steps of one or more methods described or illustrated herein, where appropriate.

In particular embodiments, computer system 3000 includes a processor 3002, memory 3004, storage 3006, an input/output (I/O) interface 3008, a communication interface 3010, and a bus 3012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 3002 includes hardware for executing instructions, such as those making up a computer program. As an example and not by way of limitation, to execute instructions, processor 3002 may retrieve (or fetch) the instructions from an internal register, an internal cache, memory 3004, or storage 3006; decode and execute them; and then write one or more results to an internal register, an internal cache, memory 3004, or storage 3006. In particular embodiments, processor 3002 may include one or more internal caches for data, instructions, or addresses. This disclosure contemplates processor 3002 including any suitable number of any suitable internal caches, where appropriate. As an example and not by way of limitation, processor 3002 may include one or more instruction caches, one or more data caches, and one or more translation lookaside buffers (TLBs). Instructions in the instruction caches may be copies of instructions in memory 3004 or storage 3006, and the instruction caches may speed up retrieval of those instructions by processor 3002. Data in the data caches may be copies of data in memory 3004 or storage 3006 for instructions executing at processor 3002 to operate on; the results of previous instructions executed at processor 3002 for access by subsequent instructions executing at processor 3002 or for writing to memory 3004 or storage 3006; or other suitable data. The data caches may speed up read or write operations by processor 3002. The TLBs may speed up virtual-address translation for processor 3002. In particular embodiments, processor 3002 may include one or more internal registers for data, instructions, or addresses. This disclosure contemplates processor 3002 including any suitable number of any suitable internal registers, where appropriate. Where appropriate, processor 3002 may include one or more arithmetic logic units (ALUs); be a multi-core processor; or include one or more processors 3002. Although this disclosure describes and illustrates a particular processor, this disclosure contemplates any suitable processor.

In particular embodiments, memory 3004 includes main memory for storing instructions for processor 3002 to execute or data for processor 3002 to operate on. As an example and not by way of limitation, computer system 3000 may load instructions from storage 3006 or another source (such as, for example, another computer system 3000) to memory 3004. Processor 3002 may then load the instructions from memory 3004 to an internal register or internal cache. To execute the instructions, processor 3002 may retrieve the instructions from the internal register or internal cache and decode them. During or after execution of the instructions, processor 3002 may write one or more results (which may be intermediate or final results) to the internal register or internal cache. Processor 3002 may then write one or more of those results to memory 3004. In particular embodiments, processor 3002 executes only instructions in one or more internal registers or internal caches or in memory 3004 (as opposed to storage 3006 or elsewhere) and operates only on data in one or more internal registers or internal caches or in memory 3004 (as opposed to storage 3006 or elsewhere). One or more memory buses (which may each include an address bus and a data bus) may couple processor 3002 to memory 3004. Bus 3012 may include one or more memory buses, as described below. In particular embodiments, one or more memory management units (MMUs) reside between processor 3002 and memory 3004 and facilitate accesses to memory 3004 requested by processor 3002. In particular embodiments, memory 3004 includes random access memory (RAM). This RAM may be volatile memory, where appropriate, this RAM may be dynamic RAM (DRAM) or static RAM (SRAM). Moreover, where appropriate, this RAM may be single-ported or multi-ported RAM. This disclosure contemplates any suitable RAM. Memory 3004 may include one or more memories 3004, where appropriate. Although this disclosure describes and illustrates particular memory, this disclosure contemplates any suitable memory.

In particular embodiments, storage 3006 includes mass storage for data or instructions. As an example and not by way of limitation, storage 3006 may include a hard disk drive (HDD), a floppy disk drive, flash memory, an optical disc, a magneto-optical disc, magnetic tape, or a Universal Serial Bus (USB) drive or a combination of two or more of these. Storage 3006 may include removable or non-removable (or fixed) media, where appropriate. Storage 3006 may be internal or external to computer system 3000, where appropriate. In particular embodiments, storage 3006 is non-volatile, solid-state memory. In particular embodiments, storage 3006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 3006 taking any suitable physical form. Storage 3006 may include one or more storage control units facilitating communication between processor 3002 and storage 3006, where appropriate. Where appropriate, storage 3006 may include one or more storages 3006. Although this disclosure describes and illustrates particular storage, this disclosure contemplates any suitable storage.

In particular embodiments, I/O interface 3008 includes hardware, software, or both, providing one or more interfaces for communication between computer system 3000 and one or more I/O devices. Computer system 3000 may include one or more of these I/O devices, where appropriate. One or more of these I/O devices may enable communication between a person and computer system 3000. As an example and not by way of limitation, an I/O device may include a keyboard, keypad, microphone, monitor, mouse, printer, scanner, speaker, still camera, stylus, tablet, touch screen, trackball, video camera, sensors, magnetic detectors, another suitable I/O device or a combination of two or more of these. An I/O device may include one or more sensors. This disclosure contemplates any suitable I/O devices and any suitable I/O interfaces 3008 for them. Where appropriate, I/O interface 3008 may include one or more device or software drivers enabling processor 3002 to drive one or more of these I/O devices. I/O interface 3008 may include one or more I/O interfaces 3008, where appropriate. Although this disclosure describes and illustrates a particular I/O interface, this disclosure contemplates any suitable I/O interface.

In particular embodiments, communication interface 3010 includes hardware, software, or both providing one or more interfaces for communication (such as, for example, packet-based communication) between computer system 3000 and one or more other computer systems 3000 or one or more networks. As an example and not by way of limitation, communication interface 3010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 3010 for it. As an example and not by way of limitation, computer system 3000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 3000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 3000 may include any suitable communication interface 3010 for any of these networks, where appropriate. Communication interface 3010 may include one or more communication interfaces 3010, where appropriate. Although this disclosure describes and illustrates a particular communication interface, this disclosure contemplates any suitable communication interface.

In particular embodiments, bus 3012 includes hardware, software, or both coupling components of computer system 3000 to each other. As an example and not by way of limitation, bus 3012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 3012 may include one or more buses 3012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some embodiments, a non-transitory computer readable storage medium stores one or more programs, and the one or more programs includes instructions. When the instructions are executed by an electronic device (e.g., computer system 3000) with one or more processors and memory, the instructions cause the electronic device to perform the methods described with respect to FIGS. 1-29.

In some embodiments, a method for providing machine-learning-based analysis of communications in a central communication platform, comprises: receiving a plurality of messages for a plurality of internal users of an organization from a plurality of external users; constructing a plurality of embedding representations of the plurality of messages by converting each message of the plurality of messages into one or more embedding representations; storing the plurality of embeddings in an embedding database. In some embodiments, each embedding of the plurality of embeddings is associated with a corresponding sender identity or a corresponding recipient identity. In some embodiments, the method further comprises identifying an analysis task for an internal user of the organization. In some embodiments, the organization comprises a plurality of internal user groups in accordance with a plurality of ethical walls, and the internal user of the organization is associated with an internal user group of the plurality of internal user groups. In some embodiments, the method further comprises retrieving, based on the internal user group and one or more ethical walls of the plurality of ethical walls, a subset of embeddings from the stored plurality of embeddings; executing the analysis task by providing the retrieved subset of embeddings to a trained machine-learning model; and displaying a graphical user interface comprising one or more outputs based on the execution of the analysis task.

In some embodiments, the analysis task comprises authorship analysis for an external user of the plurality of external users.

In some embodiments, the method further comprises: receiving a current message from the external user; retrieving the subset of embeddings, wherein the subset of embeddings corresponds to previous messages from the external user to one or more internal users of the internal user group;

and executing the analysis task by: providing the retrieved subset of embeddings and the current message to the trained machine-learning model; and receiving, from the trained machine-learning model, an output indicative of a stylistic difference between the current message and the previous messages from the external user.

In some embodiments, the analysis task comprises a sentiment analysis for an external user of the plurality of external users.

In some embodiments, the method further comprises: retrieving the subset of embeddings, wherein the subset of embeddings corresponds to previous messages from the external user to one or more internal users of the internal user group; and executing the analysis task by: providing the retrieved subset of embeddings to the trained machine-learning model; and receiving, from the trained machine-learning model, the sentiment analysis of the external user.

In some embodiments, the analysis task comprises summarization.

In some embodiments, the method further comprises: receiving a current message from the external user; retrieving the subset of embeddings, wherein the subset of embeddings corresponds to previous messages from the external user to one or more internal users of the internal user group; and executing the analysis task by: providing the retrieved subset of embeddings and the current message to the trained machine-learning model; and receiving, from the trained machine-learning model, a summary of the current message.

In some embodiments, the analysis task comprises response composition.

In some embodiments, the method further comprises: receiving a current message from an external user; retrieving the subset of embeddings, wherein the subset of embeddings corresponds to previous messages from the external user to one or more internal users of the internal user group; and executing the analysis task by: providing the retrieved subset of embeddings and the current message to the trained machine-learning model; and receiving, from the trained machine-learning model, a composed message for responding to the current message.

In some embodiments, the analysis task comprises an action recommendation with respect to an external user.

In some embodiments, the method further comprises retrieving the subset of embeddings. In some embodiments, the subset of embeddings corresponds to previous messages from the external user to one or more internal users of the internal user group; and executing the analysis task by: providing the retrieved subset of embeddings to the trained machine-learning model; and receiving, from the trained machine-learning model, a recommended action with respect to the external user.

In some embodiments, the recommended action comprises suggesting a product or service to the external user or initiating a conversation with the external user.

In some embodiments, the analysis task comprises fact checking.

In some embodiments, the method further comprises: receiving a current message from an external user; retrieving the subset of embeddings, wherein the subset of embeddings corresponds to previous messages from the external user to one or more internal users of the internal user group; and executing the analysis task by: providing the retrieved subset of embeddings and the current message to the trained machine-learning model; and receiving, from the trained machine-learning model, a verification of the current message.

In some embodiments, the analysis task comprises product or service recommendation for an external user.

In some embodiments, the method further comprises: retrieving the subset of embeddings, wherein the subset of embeddings corresponds to previous messages from the external user to one or more internal users of the internal user group; and executing the analysis task by: providing the retrieved subset of embeddings to the trained machine-learning model; and receiving, from the trained machine-learning model, a product recommendation for the external user.

In some embodiments, the analysis task comprises an analysis of an external user.

In some embodiments, the method further comprises: retrieving the subset of embeddings, wherein the subset of embeddings corresponds to previous messages from the external user to one or more internal users of the internal user group; and executing the analysis task by: providing the retrieved subset of embeddings to the trained machine-learning model; and receiving, from the trained machine-learning model, the analysis of the external user.

In some embodiments, the analysis task is obtained based on a query of the internal user of the organization.

In some embodiments, the method further comprises: retrieving the subset of embeddings, wherein the subset of embeddings corresponds to previous messages to one or more internal users of the internal user group; and executing the analysis task by: providing the retrieved subset of embeddings to the trained machine-learning model; and receiving, from the trained machine-learning model, a response to the query of the internal user.

In some embodiments, the trained machine-learning model is selected from a plurality of machine learning models based on the identified task.

In some embodiments, the method further comprises receiving, from the internal user of the organization, one or more statements related to one or more external users of the plurality of external users; constructing one or more embedding representations of the one or more statements; and storing the one or more embeddings in the embedding database.

In some embodiments, the graphical user interface comprises a dashboard graphical user interface.

In some embodiments, the graphical user interface comprises a messaging graphical user interface.

In some embodiments, the graphical user interface comprises a chatbot graphical user interface.

In some embodiments, the plurality of messages comprises: a text message, an email message, a chat message, an audio message, or any combination thereof.

In some embodiments, a system comprises: a display; and one or more processors configured to communicate with the display and perform any of the above methods.

In some embodiments, A non-transitory computer-readable medium stores instructions that, when executed by one or more processors, cause the one or more processors to perform any of the above methods.

Those skilled in the art will recognize that the systems described herein are representative, and deviations from the explicilty disclosed embodiments are within the scope of the disclosure. For example, some embodiments include additional sensors or cameras, such as cameras covering other parts of the electromagnetic spectrum, can be devised using the same principles.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The invention claimed is:

1. A method for sharing machine-learning-generated insights on a communication platform, comprising:
  receiving at least a portion of a conversation between a user and one or more conversation participants,
  constructing a first plurality of embedding representations of a plurality of messages in the conversation, wherein the first plurality of embedding representations:
    is associated with permissions, wherein the permissions associated with the first plurality of embedding representations are based on one or more ethical wall within an organization, and
    comprises first vector representations generated by providing the plurality of messages to a self-supervised model;
  storing the first plurality of embedding representations in a database;
  providing, from the database, the first plurality of embedding representations to one or more machine-learning models;
  generating, using the one or more machine-learning models and the first plurality of embedding representations, a first insight based on the conversation between the user and the one or more conversation participants;
  causing display, within a user interface of the communication platform associated with the user, the first insight;
  receiving a user request to share the first insight with a contact on the communication platform, wherein the contact is not the one or more conversation participants;
  after receiving the user request to share the first insight with the contact, determining, according to the permissions associated with the first plurality of embedding representations, whether the contact has permission to access the first insight;
  in accordance with a determination that the contact has the permission to access the first insight, causing display, within a user interface of the communication platform associated with the contact, the first insight without displaying messages of the conversation;
  receiving, via a source different from the conversation, feedback from the user; and
  constructing a second plurality of embedding representations of the feedback comprising second vector representations generated by providing the feedback to the self-supervised model, wherein a second insight is generated based on the conversation between the user and the one or more conversation participants, and further based on the second plurality of embedding representations.

2. The method of claim 1, wherein the first insight comprises a summary of the conversation, a sentiment analysis of the conversation, a recommendation based on the conversation, an action item based on the conversation, a response composition based on the conversation, a fact checking of the conversation, an analysis of the one or more conversation participants, or any combination thereof.

3. The method of claim 1, further comprising:
  receiving a comment associated with the first insight from the contact; and
  causing display, within the user interface of the communication platform associated with the user, the comment in association with the first insight.

4. The method of claim 3, further comprising:
  receiving a response to the comment from the user; and
  causing display, within the user interface of the communication platform associated with the contact, the response to the comment.

5. The method of claim 4, wherein the comment associated with the first insight and the response to the comment are not shared with the one or more conversation participants.

6. The method of claim 4, further comprising: generating one or more additional insights based on the comment, the response to the comment, or any combination thereof.

7. The method of claim 1, wherein the first insight is generated based on a portion of the conversation.

8. The method of claim 1, wherein the one or more machine-learning models comprise a large language model.

9. The method of claim 1, wherein the communication platform is configured to provide insights of communications across separate messaging applications.

10. The method of claim 1, wherein the user and the contact of the user are internal to an organization.

11. The method of claim 10, wherein the one or more conversation participants are external to the organization.

12. The method of claim 1, wherein:
  orchestration logic determines the first plurality of embedding representations based on one or more ethical walls in an organization and an analysis task for determining the first insight, and
  the orchestration logic further determines the one or more machine-learning models based on the first plurality of embedding representations and the analysis task.

13. The method of claim 1, further comprises performing, using the one or more machine-learning models, one or more of an authorship analysis of the one or more conversation participants and a sentiment analysis of the one or more conversation participants.

14. A system for sharing machine-learning-generated insights on a communication platform, comprising:
  one or more processors,
  a memory, and
  one or more programs, wherein the one or more programs are stored in the memory and configured to be executed by the one or more processors, the one or more programs including instructions for:
    causing display, within a user interface of the communication platform associated with a user, a portion of a conversation between the user and one or more conversation participants,

constructing a first plurality of embedding representations of a plurality of messages in the conversation, wherein the first plurality of embedding representations:

is associated with permissions, wherein the permissions associated with the first plurality of embedding representations are based on one or more ethical wall within an organization, and comprises first vector representations generated by providing the plurality of messages to a self-supervised model;

storing the first plurality of embedding representations in a database;

providing, from the database, the first plurality of embedding representations to one or more machine-learning models;

generating, using the one or more machine-learning models and the first plurality of embedding representations, a first insight based on the conversation between the user and the one or more conversation participants;

causing display, within the user interface of the communication platform associated with the user, the first insight in association with the conversation;

receiving a user request to share the first insight with a contact on the communication platform, wherein the contact is not the one or more conversation participants;

after receiving the user request to share the first insight with the contact, determining, according to the permissions associated with the first plurality of embedding representations, whether the contact has permission to access the first insight;

in accordance with a determination that the contact has the permission to access the first insight, causing display, within a user interface of the communication platform associated with the contact, the first insight without displaying messages of the conversation;

receiving, via a source different from the conversation, feedback from the user; and constructing a second plurality of embedding representations of the feedback comprising second vector representations generated by providing the feedback to the self-supervised model, wherein a second insight is generated based on the conversation between the user and the one or more conversation participants, and further based on the second plurality of embedding representations.

15. A non-transitory computer-readable storage medium storing one or more programs for sharing machine-learning-generated insights on a communication platform, the one or more programs comprising instructions, which when executed by one or more processors of one or more electronic devices, cause the one or more electronic devices to:

cause display, within a user interface of the communication platform associated with a user, a portion of a conversation between the user and one or more conversation participants;

construct a first plurality of embedding representations of a plurality of messages in the conversation, wherein the first plurality of embedding representations:

is associated with permissions, wherein the permissions associated with the first plurality of embedding representations are based on one or more ethical wall within an organization, and comprises first vector representations generated by providing the plurality of messages to a self-supervised model;

store the first plurality of embedding representations in a database;

provide, from the database, the first plurality of embedding representations to one or more machine-learning models;

generate, using the one or more machine-learning models and the first plurality of embedding representations, a first insight based on the conversation between the user and the one or more conversation participants;

cause display, within the user interface of the communication platform associated with the user, the first insight in association with the conversation;

receive a user request to share the first insight with a contact on the communication platform, wherein the contact is not the one or more conversation participants;

after receiving the user request to share the first insight with the contact, determine, according to the permissions associated with the first plurality of embedding representations, whether the contact has permission to access the first insight;

in accordance with a determination that the contact has the permission to access the first insight, cause display, within a user interface of the communication platform associated with the contact, the first insight without displaying messages of the conversation;

receive, via a source different from the conversation, feedback from the user; and construct a second plurality of embedding representations of the feedback comprising second vector representations generated by providing the feedback to the self-supervised model, wherein a second insight is generated based on the conversation between the user and the one or more conversation participants, and further based on the second plurality of embedding representations.

16. The method of claim 1, further comprising:

receiving at least a portion of a second conversation between the user and the one or more conversation participants;

generating, using the one or more machine-learning models, an updated insight based on the second conversation between the user and the one or more conversation participants and further based on the first insight; and causing updating of the display, within the user interface of the communication platform associated with the contact, the updated insight without displaying messages of the first conversation and the second conversation.

* * * * *